US012786952B2

(12) United States Patent
Kuang et al.

(10) Patent No.: US 12,786,952 B2
(45) Date of Patent: Nov. 3, 2026

(54) PAGING METHOD AND COMMUNICATIONS APPARATUS

(71) Applicant: Huawei Technologies Co., Ltd., Shenzhen (CN)

(72) Inventors: Yiru Kuang, Beijing (CN); Haibo Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 318 days.

(21) Appl. No.: 18/424,142

(22) Filed: Jan. 26, 2024

(65) Prior Publication Data

US 2024/0172180 A1 May 23, 2024

Related U.S. Application Data

(63) Continuation of application No. PCT/CN2022/107430, filed on Jul. 22, 2022.

(30) Foreign Application Priority Data

| | | |
|---|---|---|
| Jul. 28, 2021 | (CN) | 202110857438.1 |
| Aug. 13, 2021 | (CN) | 202110931978.X |
| Sep. 30, 2021 | (CN) | 202111165249.4 |
| Nov. 27, 2021 | (CN) | 202111428227.2 |

(51) Int. Cl.
*H04W 68/02* (2009.01)
*H04W 52/02* (2009.01)

(52) U.S. Cl.
CPC ....... *H04W 68/02* (2013.01); *H04W 52/0219* (2013.01)

(58) Field of Classification Search
CPC .......................... H04W 68/02; H04W 52/0219
USPC .......................................................... 455/458
See application file for complete search history.

(56) References Cited

U.S. PATENT DOCUMENTS

| | | | | |
|---|---|---|---|---|
| 12,120,638 B2 * | 10/2024 | Nader | .................... | H04W 72/23 |
| 2006/0068813 A1 * | 3/2006 | Ku | ........................ | H04W 68/04 455/458 |
| 2022/0174644 A1 * | 6/2022 | Shi | ........................ | H04W 68/02 |

FOREIGN PATENT DOCUMENTS

| | | |
|---|---|---|
| EP | 4142385 A1 | 3/2023 |
| EP | 4221382 A1 | 8/2023 |
| EP | 4387351 A1 | 6/2024 |
| WO | 2020147122 A1 | 7/2020 |

(Continued)

OTHER PUBLICATIONS

3GPP TSG RAN WG2 Meeting #113e R2-2101301,"Network assigned subgrouping", Intel Corporation, E-Meeting, Jan. 25-Feb. 5, 2021,total 3 pages.

(Continued)

*Primary Examiner* — Qutbuddin Ghulamali
(74) *Attorney, Agent, or Firm* — Slater Matsil, LLP

(57) ABSTRACT

This application provides a paging method and a communications apparatus. In the method, a first access network device may determine, based on grouping capability information of a first terminal device and a grouping manner supported by the first access network device for use, a first manner for paging the first terminal device. When determining the first manner, the first access network device considers the grouping capability information of the first terminal device. In this way, the determined first manner is a grouping manner supported by the first terminal device.

20 Claims, 6 Drawing Sheets

(56) References Cited

FOREIGN PATENT DOCUMENTS

| | | | |
|---|---|---|---|
| WO | 2020206632 | A1 | 10/2020 |
| WO | 2021018531 | A1 | 2/2021 |
| WO | 2021062671 | A1 | 4/2021 |
| WO | 2022205355 | A1 | 10/2022 |

OTHER PUBLICATIONS

3GPP TS 38.300 V16.6.0 (Jun. 2021), 3rd Generation Partnership Project; Technical Specification Group Radio Access Network;NR; NR and NG-RAN Overall Description;Stage 2(Release 16), 152 pages.

3GPP TSG RAN WG2 Meeting #112e R2-2009274,"Paging enhancement using UE subgrouping", Intel Corporation,E-Meeting,Nov. 2-13, 2020,total 3 pages.

3GPP TS 38.304 V16.5.0 (Jun. 2021), 3rd Generation Partnership Project; Technical Specification Group Radio Access Network;NR;User Equipment (UE) procedures in Idle mode and RRC Inactive state(Release 16), 39 pages.

3GPP TSG-RAN WG2 #113 electronic R2-2100389,"[POST112-e][064][Pow17] Group Determination", Intel Corporation, Electronic Meeting, Jan. 25-Feb. 5, 2021,total 43 pages.

3GPP TS 38.331 V16.5.0 (Jun. 2021), 3rd Generation Partnership Project; Technical Specification Group Radio Access Network; NR;Radio Resource Control (RRC) protocol specification(Release 16), 959 pages.

3GPP TS 38.213 V16.6.0 (Jun. 2021), 3rd Generation Partnership Project; Technical Specification Group Radio Access Network;NR;Physical layer procedures for control(Release 16), 187 pages.

* cited by examiner

PAGING METHOD AND COMMUNICATIONS APPARATUS

CROSS-REFERENCE TO RELATED APPLICATIONS

This application is a continuation of International Application No. PCT/CN2022/107430, filed on Jul. 22, 2022, which claims priority to Chinese Patent Application No. 202110857438.1, filed on Jul. 28, 2021, Chinese Patent Application No. 202110931978.X, filed on Aug. 13, 2021, Chinese Patent Application No. 202111165249.4, filed on Sep. 30, 2021, and Chinese Patent Application No. 202111428227.2, filed on Nov. 27, 2021. All of the aforementioned applications are hereby incorporated by reference in their entireties.

TECHNICAL FIELD

This application relates to the communications field, and more specifically, to a paging method and a communications apparatus in the communications field.

BACKGROUND

In some communications mechanisms, a terminal device may cyclically wake up to receive a paging message, and be in a hibernation state at another time point, to reduce power consumption of the terminal device. If an access network device or a core network device needs to send downlink data to a terminal device, the access network device or the core network device sends a paging message. The paging message may include an identifier of the terminal device to be paged by the access network device or the core network device. If the core network device needs to page the terminal device, the core network device may send the paging message to the access network device, and the access network device sends the paging message. If there are a plurality of terminal devices, the plurality of terminal devices need to cyclically wake up to receive the paging message. The paging message is used to page a specific terminal device, but the plurality of terminal devices all need to wake up to receive the paging message. As a result, energy consumption of the terminal devices is high. After a terminal device receives the paging message, if the identifier included in the paging message is an identifier of the terminal device, the terminal device initiates a radio resource control (RRC) establishment request. In other words, regardless of which terminal device is paged by the access network device or the core network device, the plurality of terminal devices all need to wake up to receive the paging message. Only after receiving the paging message, the other terminal devices can find that the identifier included in the paging message is not identifiers of the other terminal devices. Consequently, power consumption of the terminal devices is high.

Based on the foregoing problem, a grouping mechanism is introduced. The core network device may group the plurality of terminal devices, or the access network device may group the plurality of terminal devices. When paging a terminal device, the core network device or the access network device may indicate a group number of the terminal device. The terminal device with the group number may wake up to receive the paging message, and a terminal device in another group may not wake up to receive the paging message. In this way, power consumption of the terminal device in the another group can be reduced. However, a paging error occurs when a grouping manner to be used by the terminal device is inconsistent with a grouping manner to be used by the access network device. Alternatively, a paging error occurs when a quantity of groups supported by the terminal device is inconsistent with a quantity of groups supported by the access network device.

SUMMARY

Embodiments of this application provide a paging method and a communications apparatus, to help avoid a paging error.

According to a first aspect, a paging method is provided. The method is applicable to a first access network device and includes: obtaining grouping capability information of a first terminal device; determining, based on a grouping manner supported by the first access network device for use and the grouping capability information of the first terminal device, a first target manner for paging the first terminal device; and paging the first terminal device in the first target manner.

In the foregoing solution, the first access network device can determine, based on the grouping capability information of the first terminal device and the grouping manner supported by the first access network device for use, the first target manner for paging the first terminal device. When determining the first target manner, the first access network device considers the grouping capability information of the first terminal device. In this way, the determined first target manner is a grouping manner supported by the first terminal device. Therefore, the first terminal device can also receive paging of the first access network device in the first target manner. This helps avoid a paging error.

Optionally, the paging the first terminal device in the first target manner includes: paging the first terminal device based on a group number corresponding to the first target manner. For example, the first target manner is a first grouping manner, and the first terminal device is paged based on a first group number corresponding to the first grouping manner. The first group number is a group number allocated by a core network device to the first terminal device. For another example, the first target manner is a second grouping manner, and the first terminal device is paged based on a second group number corresponding to the second grouping manner. The second group number is a group number obtained by the first access network device through calculation based on an identifier of the first terminal device. For still another example, the first target manner is a non-grouping manner, and the first terminal device is paged in the non-grouping manner. To be specific, the first access network device sends, on a paging occasion of the first terminal device, DCI that carries no group number of the first terminal device. The first terminal device receives the DCI on the paging occasion of the first terminal device, and receives, on a time-frequency resource indicated by the DCI, a paging message sent by the first access network device.

Optionally, the grouping capability information of the first terminal device indicates whether the first terminal device supports a grouping manner. If the grouping capability information of the first terminal device indicates that the first terminal device supports a grouping manner, it indicates that the first terminal device supports the first grouping manner and the second grouping manner. If the grouping capability information of the first terminal device indicates that the first terminal device supports no grouping manner, it indicates that the first terminal device supports neither the first grouping manner nor the second grouping manner.

Optionally, the first target manner is the first grouping manner, the second grouping manner, or the non-grouping manner.

Optionally, the grouping capability information indicates that the first terminal device supports the first grouping manner and/or the second grouping manner.

Optionally, the first grouping manner is a manner in which the core network device groups a plurality of terminal devices. Optionally, the first grouping manner may be a grouping manner controlled by the core network device, or the first grouping manner is a manner in which the core network device controls grouping. Optionally, the first grouping manner is a manner of performing grouping based on feature information of the plurality of terminal devices. After grouping the plurality of terminal devices, the core network device may notify each terminal device of a group number of each terminal device.

Optionally, the second grouping manner is a manner in which an access network device groups the plurality of terminal devices. Optionally, the second grouping manner may also be referred to as a grouping manner controlled by the access network device, or the second grouping manner is a manner in which the access network device controls grouping. Optionally, the second grouping manner may also be referred to as a manner of grouping based on identifiers of the terminal devices. The access network device may obtain a group number of each terminal device after calculating an identifier of each terminal device, and put terminal devices with a same group number into one group. Correspondingly, each terminal device may obtain the group number of each terminal device through calculation in a same calculation manner as that of the access network device based on the identifier of each terminal device.

Optionally, the grouping manner supported by the first access network device for use may be the first grouping manner and/or the second grouping manner.

Optionally, if the first target manner is the first grouping manner, the paging the first terminal device in the first target manner includes: paging the first terminal device based on the first group number corresponding to the first grouping manner. The first group number is the group number allocated by the core network device to the first terminal device.

Optionally, if the first target manner is the second grouping manner, the paging the first terminal device in the first target manner includes: paging the first terminal device based on the second group number corresponding to the second grouping manner. The second group number is obtained by the first access network device through calculation based on the identifier of the first terminal device.

In some possible implementations, before the determining, based on a grouping manner supported by the first access network device for use and the grouping capability information of the first terminal device, a first target manner for paging the first terminal device, the method further includes:

broadcasting the grouping manner supported by the first access network device for use.

In the foregoing solution, if the first access network device broadcasts the grouping manner supported by the first access network device for use, a cell within a coverage area of the first access network device can learn the grouping manner supported by the first access network device for use, and determine, based on the grouping manner supported by the first access network device for use and the grouping manner supported by the first terminal device for use, the first target manner for receiving the paging message. In this way, the first target manner in which the first access network device pages the first terminal device is the same as the first target manner in which the first terminal device receives paging of the first access network device.

In some possible implementations, the method further includes: receiving first indication information sent by the core network device, where the first indication information indicates whether the core network device supports the first grouping manner for use, and the first grouping manner is the manner in which the core network device groups the plurality of terminal devices; and determining, based on whether the core network device supports the first grouping manner for use indicated by the first indication information and a grouping manner supported by the first access network device, the grouping manner supported by the first access network device for use.

In the foregoing solution, the first grouping manner is the grouping manner controlled by the core network device. Therefore, the first access network device needs to determine, with reference to whether the core network device supports the first grouping manner and the grouping manner supported by the first access network device, the grouping manner supported by the first access network device for use.

Optionally, after the first access network device establishes a connection to the core network device, the core network device may send the first indication information to the first access network device.

In some possible implementations, the determining, based on whether the core network device supports the first grouping manner for use indicated by the first indication information and a grouping manner supported by the first access network device, the grouping manner supported by the first access network device for use includes:

if the first indication information indicates that the core network device supports the first grouping manner for use, and the grouping manner supported by the first access network device includes the first grouping manner, determining that the grouping manner supported by the first access network device for use is the first grouping manner.

In the foregoing solution, if the core network device supports the first grouping manner for use, and the grouping manner supported by the first access network device includes the first grouping manner, it is determined that the grouping manner supported by the first access network device for use is the first grouping manner.

Optionally, that the grouping manner supported by the first access network device includes the first grouping manner may be understood as that the grouping manner supported by the first access network device is the first grouping manner or the first grouping manner and the second grouping manner.

In some possible implementations, the determining, based on whether the core network device supports the first grouping manner for use indicated by the first indication information and a grouping manner supported by the first access network device, the grouping manner supported by the first access network device for use includes: if the first indication information indicates that the core network device supports the first grouping manner for use, and the first access network device supports the second grouping manner but does not support the first grouping manner, determining that the grouping manner supported by the first access network device for use is the second grouping manner.

In some possible implementations, the determining, based on whether the core network device supports the first grouping manner for use indicated by the first indication information and a grouping manner supported by the first access network device, the grouping manner supported by the first access network device for use includes: if the first indication information indicates that the core network device does not support the first grouping manner for use, and the grouping manner supported by the first access network device includes the second grouping manner, determining that the grouping manner supported by the first access network device for use is the second grouping manner.

Optionally, that the grouping manner supported by the first access network device includes the second grouping manner may be understood as that the grouping manner supported by the first access network device is the second grouping manner or the first grouping manner and the second grouping manner.

In some possible implementations, the determining, based on whether the core network device supports the first grouping manner for use indicated by the first indication information and a grouping manner supported by the first access network device, the grouping manner supported by the first access network device for use includes: if the first indication information indicates that the core network device supports the first grouping manner for use, and the grouping manner supported by the first access network device is the first grouping manner and the second grouping manner, determining that the grouping manner supported by the first access network device for use is the first grouping manner and the second grouping manner.

In some possible implementations, the determining, based on whether the core network device supports the first grouping manner for use indicated by the first indication information and a grouping manner supported by the first access network device, the grouping manner supported by the first access network device for use includes: if the first access network device supports neither the first grouping manner nor the second grouping manner, determining that the first access network device supports no grouping manner for use. In other words, in this case, the first indication information from the core network device is not referenced.

In some possible implementations, the method further includes: if the grouping manner supported by the first access network device for use is the first grouping manner or the first grouping manner and the second grouping manner, indicating, to the core network device, that the grouping manner supported by the first access network device for use includes the first grouping manner.

In the foregoing solution, after it is indicated, to the core network device, that the grouping manner supported by the first access network device for use includes the first grouping manner, the core network device may send the first group number of the to-be-paged first terminal device to the first access network device. This avoids a case that the core network device blindly sends the first group number to the first access network device without knowing whether the first access network device supports the first grouping manner, and consequently, the first group number may be discarded or ignored because the first access network device does not support the first grouping manner. Therefore, signaling overheads can be reduced.

In some possible implementations, the method further includes: receiving, from the core network device, the first group number of the first terminal device obtained after the core network device groups the plurality of terminal devices in the first grouping manner.

In some possible implementations, if it is indicated, to the core network device, that the grouping manner supported by the first access network device for use is the first grouping manner, the first group number of the first terminal device is received from the core network device. The first group number is the group number corresponding to the first grouping manner.

In some possible implementations, if the first target manner is the first grouping manner, the paging the first terminal device in the first target manner includes: paging the first terminal device based on the first group number corresponding to the first grouping manner.

In the foregoing solution, if the first access network device indicates, to the core network device, that the grouping manner supported by the first access network device for use is the first grouping manner, the first access network device can receive the first group number sent by the core network device. If the first target manner is the first grouping manner, the first access network device can page the first terminal device by using the first group number.

In some possible implementations, the method further includes: if the grouping manner supported by the first access network device for use is the second grouping manner or the first access network device supports no grouping manner for use, indicating, to the core network device, that the first access network device does not support the first grouping manner for use.

In the foregoing solution, after it is indicated, to the core network device, that the first access network device does not support the first grouping manner for use, the core network device may not send the first group number used to page the first terminal device. This can reduce signaling overheads.

In some possible implementations, if the grouping manner supported by the first access network device for use is the first grouping manner and the second grouping manner, the method further includes: indicating, to a terminal device in a target group, that a terminal device that supports the first target manner in the target group is to receive the paging message, where the target group is a group to which the first terminal device belongs.

In the foregoing solution, if the first access network device supports the first grouping manner and the second grouping manner for use, the first access network device broadcasts that the first access network device supports the first grouping manner and the second grouping manner for use. In a plurality of terminal devices within the coverage area of the first access network device, a terminal device supports the first grouping manner, and a terminal device supports the second grouping manner. Consequently, within the coverage area of the first access network device, a target manner determined by a terminal device is the first grouping manner, and a target manner determined by a terminal device is the second grouping manner. If a terminal device supports both the first grouping manner and the second grouping manner, the terminal device may determine, based on a priority of the first grouping manner and a priority of the second grouping manner, that a target manner is the first grouping manner. A group number of the terminal device whose target manner is the first grouping manner and that is determined within the coverage area of the first access network device is allocated by the core network device based on feature information of the terminal device. A group number of the terminal device whose target manner is the second grouping manner and that is determined within the coverage area of the first access network device is obtained by the terminal device through calculation based on an identifier of the terminal device. Consequently, the group number of the terminal device whose target manner is the second grouping manner may be the same as the group number of the terminal device whose target manner is the first grouping manner. In other words, a group of terminal devices may include a terminal device grouped in the first grouping manner and may also include a terminal device grouped in the second grouping manner. As a result, paging efficiency is reduced or power consumption of the terminal device may be affected. The first access network device can indicate, to the target group to which the first terminal device belongs, a terminal device whose target manner is the first target manner to receive the paging message. In this way, a terminal device whose target manner is not the first target manner in the target group does not receive the paging message. This avoids a case that the terminal device whose target manner is not the first target manner in the target group is also woken up because the first terminal device in the target group is paged, thereby reducing power consumption.

In some possible implementations, the method specifically includes: indicating, to the terminal device in the target group by using a wake-up signal or downlink control information DCI, that the terminal device whose target manner is the first target manner in the target group is to receive the paging message. The wake-up signal is used to wake up the first terminal device.

In the foregoing solution, for a first grouping paging mechanism, the first access network device can indicate, to the terminal device in the target group by using the wake-up signal, that the terminal device whose target manner is the first target manner in the target group is to receive the paging message. For a second grouping paging mechanism, the first access network device can indicate, by using the downlink control information (downlink control information, DCI) sent on the PO of the first terminal device, that the terminal device whose target manner is the first target manner in the target group is to receive the paging message.

It may be understood that the wake-up signal may be a WUS or a PEI.

In some possible implementations, the indicating, to the terminal device in the target group by using a wake-up signal or DCI, that the terminal device whose target manner is the first target manner in the target group is to receive the paging message includes:

indicating, to the terminal device in the target group by using second indication information included in the wake-up signal or the DCI, that the terminal device whose target manner is the first target manner in the target group is to receive the paging message, where the wake-up signal or the DCI includes a target group number corresponding to the first target manner, and the target group number corresponding to the first target manner is used to page the first terminal device.

In the foregoing solution, the wake-up signal or the DCI can include the second indication information. The second indication information indicates, to the terminal device in the target group, that the terminal device whose target manner is the first grouping manner in the target group is to receive the paging message. For example, the second indication information occupies one bit. If a value of the bit is 1, it indicates that the terminal device whose target manner is the first grouping manner in the target group is to receive the paging message, and a terminal device whose target manner is the second grouping manner in the target group is not to receive the paging message. Alternatively, if a value of the bit is 0, it indicates that a terminal device whose target manner is the second grouping manner in the target group to receive the paging message, and the terminal device whose target manner is the first grouping manner in the target group is not to receive the paging message.

Optionally, the first target manner is the first grouping manner, and the target group number is the first group number. If the first target manner is the second grouping manner, the target group number is the second group number.

In some possible implementations, the indicating, to the terminal device in the target group by using a wake-up signal, that the terminal device whose target manner is the first target manner in the target group is to receive the paging message includes:

indicating, to the terminal device in the target group by including a target group number corresponding to the first target manner in a target field in the wake-up signal, that the terminal device whose target manner is the first target manner in the target group is to receive the paging message, where the target group number corresponding to the first target manner is used to page the first terminal device.

The target field is a first field or a second field. The first field is a field corresponding to the first grouping manner. The second field is a field corresponding to the second grouping manner. The first target manner is the first grouping manner or the second grouping manner.

In the foregoing solution, different fields in the wake-up signal or the DCI are used to determine terminal devices in different grouping manners need to receive the paging message. For example, if the first target manner is the first grouping manner, the first terminal device obtains the first group number by parsing the first field, and a target manner determined by the first terminal device is the first grouping manner, the first terminal device receives the paging message. If a second terminal device does not obtain the first group number by parsing the second field, or obtains the first group number by parsing the first field, and a target manner determined by the second terminal device is the second grouping manner, the second terminal device does not receive the paging message. For another example, if the first target manner is the second grouping manner, the first terminal device obtains the first group number by parsing the second field, and a target manner determined by the first terminal device is the second grouping manner, the first terminal device receives the paging message. If a second terminal device does not obtain the first group number by parsing the first field, or obtains the first group number by parsing the second field, and a target manner determined by the second terminal device is the first grouping manner, the second terminal device does not receive the paging message.

It should be noted that a field in the wake-up signal is different from a field in the DCI. For ease of understanding and description, a same field is used for description in embodiment of this application.

In some possible implementations, the indicating, to the terminal device in the target group by using a wake-up signal, that the terminal device whose target manner is the first target manner in the target group is to receive the paging message includes:

indicating, to the terminal device in the target group by using the wake-up signal sent at a target resource location, that the terminal device whose target manner is the first target manner in the target group is to receive the paging message.

The target resource location is a first resource location or a second resource location. The first resource location is a resource location corresponding to the first grouping manner. The second resource location is a resource location corresponding to the second grouping manner. The first target manner is the first grouping manner or the second grouping manner.

In the foregoing solution, different resource locations at which the wake-up signal is sent are used to distinguish whether terminal devices in different grouping manners need to receive the paging message. For example, if the first target manner is the first grouping manner, the first terminal device receives the wake-up signal at the first resource location, and a target manner determined by the first terminal device is the first grouping manner, the first terminal device receives the paging message. If a second terminal device does not obtain the wake-up signal through parsing at the second resource location, or receives the wake-up signal at the first resource location, and a target manner determined by the second terminal device is the second grouping manner, the second terminal device does not receive the paging message. For another example, if the first target manner is the second grouping manner, the first terminal device receives the wake-up signal at the second resource location, and a target manner determined by the first terminal device is the second grouping manner, the first terminal device receives the paging message. If a second terminal device does not receive the wake-up signal at the first resource location, or receives the wake-up signal at the second resource location, and a target manner determined by the second terminal device is the first grouping manner, the second terminal device does not receive the paging message.

In some possible implementations, the indicating, to the terminal device in the target group by using a wake-up signal, that the terminal device whose target manner is the first target manner in the target group is to receive the paging message includes:

indicating, to the terminal device in the target group by scrambling the wake-up signal by using a target radio network temporary identifier, that the terminal device whose target manner is the first target manner in the target group is to receive the paging message, and a terminal device that does not support the first target manner in the target group is not to receive the paging message.

The target radio network temporary identifier is a first radio network temporary identifier or a second radio network temporary identifier. The first radio network temporary identifier is a radio network temporary identifier corresponding to the first grouping manner. The second radio network temporary identifier is a radio network temporary identifier corresponding to the second grouping manner. The first target manner is the first grouping manner or the second grouping manner.

In the foregoing solution, different radio network temporary identifiers are used to scramble the wake-up signal or the DCI, to distinguish whether terminal devices in different grouping manners need to receive the paging message. If the first access network device determines that the first target manner for paging the first terminal device is the first grouping manner, the first access network device may scramble the WUS or the DCI by using a first RNTI. When the first terminal device receives a WUS or DCI scrambled by using the first RNTI, because the first terminal device determines that the first target manner for receiving paging of the first access network device is the first grouping manner, the first terminal device may descramble the WUS based on the first RNTI, to determine that the first terminal device is to receive the paging message sent by the first access network device. Both the group number of the first terminal device and a group number of a second terminal device are the first group number, that is, both the first terminal device and the second terminal device are terminal devices in the target group. When the second terminal device receives a WUS or DCI scrambled by using the first RNTI, because the second terminal device determines that the first target manner of receiving paging of the first access network device is the second grouping manner, and because the second grouping manner corresponds to a second RNTI and does not correspond to the first RNTI, the second terminal device determines not to receive the paging message sent by the first access network device. Alternatively, a second terminal device may detect only a WUS or DCI scrambled by using a second RNTI, but does not detect the WUS or the DCI scrambled by using the first RNTI. When the second terminal does not receive the WUS or the DCI scrambled by using the second RNTI, or the received WUS or the DCI scrambled by using the second RNTI does not include the first group number, the second terminal device determines not to receive the paging message sent by the first access network device.

In some possible implementations, if the grouping manner supported by the first access network device for use is the first grouping manner and the second grouping manner, the paging the first terminal device in the first target manner includes:

paging the first terminal device by using a target group number corresponding to the first target manner.

The target group number falls within a first group number range or a second group number range. The first group number range is a group number range corresponding to the first grouping manner. The second group number range is a group number range corresponding to the second grouping manner. There is no intersection between the first group number range and the second group number range. The first target manner is the first grouping manner or the second grouping manner.

In the foregoing solution, different group number ranges are used to distinguish whether terminal devices in different grouping manners need to receive the paging message. When the core network device groups the plurality of terminal devices, the group number of each terminal device falls within the first group number range. When the first access network device groups the plurality of terminal devices, a group number of each terminal device falls within the second group number range. If the first access network device determines that the first target manner for paging the first terminal device is the first grouping manner, and the group number allocated by the core network device to the first terminal device is the first group number, the first access network device carries the first group number in a WUS or DCI. If the first access network device determines that the first target manner for paging the first terminal device is the second grouping manner, and a group number of the first terminal device obtained by the first access network device and the first terminal device through calculation based on the identifier of the first terminal device is the second group number, the first access network device carries the second group number in a WUS or DCI.

In some possible implementations, if the grouping manner supported by the first access network device for use is the first grouping manner and the second grouping manner, the method further includes: indicating a terminal device in a target group to receive the paging message. The target group is a group corresponding to the first target manner. A target group number corresponding to the target group is a group number corresponding to the first target manner to be used by the first access network device to page the first terminal device. A target manner of the terminal device included in the target group is the first target manner. Group numbers of terminal devices included in the target group are all the target group number. In other words, in some embodiments, the target group includes only terminal devices that have a same group number and are in a same target manner, and different target groups have a same group number and different target manners, or different target groups have different group numbers and different target manners. In some other embodiments, the target group includes terminal devices that have a same group number but are in different target manners, and different target groups have different group numbers.

In some possible implementations, the determining, based on a grouping manner supported by the first access network device for use and the grouping capability information of the first terminal device, a first target manner for paging the first terminal device includes:

if the grouping manner supported by the first access network device for use includes the first grouping manner, and the grouping capability information of the first terminal device indicates that the first terminal device supports the first grouping manner, determining that the first target manner for paging the first terminal device is the first grouping manner.

Optionally, that the grouping manner supported by the first access network device for use includes the first grouping manner may be understood as follows: The grouping manner supported by the first access network device for use is the first grouping manner or the first grouping manner and the second grouping manner.

In some possible implementations, the determining, based on a grouping manner supported by the first access network device for use and the grouping capability information of the first terminal device, a first target manner for paging the first terminal device includes: if the grouping manner supported by the first access network device for use is the first grouping manner, and the grouping capability information of the first terminal device indicates that the grouping manner supported by the first terminal device includes the first grouping manner, determining that the first target manner for paging the first terminal device is the first grouping manner.

Optionally, that the grouping capability information of the first terminal device indicates that the grouping manner supported by the first terminal device includes the first grouping manner may be understood as follows: The grouping capability information of the first terminal device indicates that the grouping manner supported by the first terminal device is the first grouping manner or the first grouping manner and the second grouping manner.

In some possible implementations, the determining, based on a grouping manner supported by the first access network device for use and the grouping capability information of the first terminal device, a first target manner for paging the first terminal device includes: if the grouping manner supported by the first access network device for use includes the second grouping manner, and the grouping capability information of the first terminal device indicates that the first terminal device supports the second grouping manner, determining that the first target manner for paging the first terminal device is the second grouping manner.

Optionally, that the grouping manner supported by the first access network device for use includes the second grouping manner may be understood as follows: The grouping manner supported by the first access network device for use is the second grouping manner or the first grouping manner and the second grouping manner.

In some possible implementations, the determining, based on a grouping manner supported by the first access network device for use and the grouping capability information of the first terminal device, a first target manner for paging the first terminal device includes: if the grouping manner supported by the first access network device for use is the second grouping manner, and the grouping capability information of the first terminal device indicates that the grouping manner supported by the first terminal device includes the second grouping manner, determining that the first target manner for paging the first terminal device is the second grouping manner.

Optionally, that the grouping capability information of the first terminal device indicates that the grouping manner supported by the first terminal device includes the second grouping manner may be understood as follows: The grouping capability information of the first terminal device indicates that the grouping manner supported by the first terminal device is the second grouping manner or the first grouping manner and the second grouping manner.

In some possible implementations, the determining, based on a grouping manner supported by the first access network device for use and the grouping capability information of the first terminal device, a first target manner for paging the first terminal device includes: if the grouping manner supported by the first access network device for use is the first grouping manner, and the grouping capability information of the first terminal device indicates that the first terminal device supports the second grouping manner but does not support the first grouping manner, determining that the first target manner for paging the first terminal device is the non-grouping manner.

In some possible implementations, the determining, based on a grouping manner supported by the first access network device for use and the grouping capability information of the first terminal device, a first target manner for paging the first terminal device includes: if the grouping manner supported by the first access network device for use is the second grouping manner, and the grouping capability information of the first terminal device indicates that the first terminal device supports the first grouping manner but does not support the second grouping manner, determining that the first target manner for paging the first terminal device is the non-grouping manner.

In some possible implementations, the determining, based on a grouping manner supported by the first access network device for use and the grouping capability information of the first terminal device, a first target manner for paging the first terminal device includes: if the grouping manner supported by the first access network device for use is the first grouping manner and the second grouping manner, and the grouping capability information of the first terminal device indicates that the first terminal device supports the first grouping manner and the second grouping manner, determining the first target manner based on the priority of the first grouping manner and the priority of the second grouping manner.

In some possible implementations, the determining the first target manner based on the priority of the first grouping manner and the priority of the second grouping manner includes:

determining the first grouping manner whose priority is higher than that of the second grouping manner as the first target manner.

In the foregoing solution, usually, the first grouping manner is grouping performed by the core network device based on the feature information of the terminal devices, and the second grouping manner is grouping randomly performed by the access network device. Therefore, the priority of the first grouping manner is higher than the priority of the second grouping manner.

In some possible implementations, the obtaining grouping capability information of a first terminal device includes: receiving the grouping capability information of the first terminal device from the second access network device or the core network device. The second access network device is an access network device that releases the first terminal device into a radio resource control RRC inactive state. The first access network device is an access network device that belongs to a same notification area NA as the second access network device.

Optionally, the first terminal device may send the grouping capability information of the first terminal device to the core network device by using the first access network device. Specifically, the first terminal device may first send the grouping capability information of the first terminal device to the first access network device. Then, the first access network device sends the grouping capability information of the first terminal device to the core network device. The core network device stores the grouping capability information of the first terminal device. When needing to page the first terminal device, the core network device may send the grouping capability information of the first terminal device to the first access network device.

Optionally, the first access network device may obtain the grouping capability information of the first terminal device from the second access network device. For example, the second access network device is the last serving access network device when the first terminal device is in an RRC connected state, and the first access network device is an access network device on which the first terminal device camps in the RRC inactive state. Therefore, the second access network device may send the grouping capability information of the first terminal device to the first access network device, so that, when paging the first terminal device, the first access network device determines the first target paging manner for paging based on the grouping capability information of the first terminal device.

In some possible implementations, the first group number that is for the first terminal device and that is obtained after the core network device groups the plurality of terminal devices in the first grouping manner is received from the second access network device. The second access network device is the access network device that releases the first terminal device into the radio resource control RRC inactive state. The first access network device is the access network device that belongs to the same notification area NA as the second access network device.

Optionally, the method further includes: receiving fourth indication information from the second access network device, where the fourth indication information indicates whether the first terminal device can use a grouping manner in the RRC inactive state. In this way, the first terminal device can determine, based on the fourth indication information and the grouping manner supported by the first access network device for use, the first target manner for receiving paging of the first access network device. The first access network device can determine, based on the fourth indication information and the grouping manner supported by the first access network device for use, the first target manner for paging the first terminal device. In other words, a policy used by the first access network device to determine to page the first terminal device is consistent with a policy used by the first terminal device to determine to receive paging. In this way, the first access network device and the first terminal device can use a consistent understanding. This can improve a paging probability, and can reduce power consumption.

According to a second aspect, a paging method is provided. The method is applicable to a first terminal device and includes: obtaining a grouping manner supported by a first access network device for use;

determining, based on the grouping manner supported by the first access network device for use and a grouping manner supported by the first terminal device, a first target manner to be used by the first terminal device to receive paging of the first access network device; and receiving a paging message of the first access network device in the first target manner.

In the foregoing solution, the first terminal device can determine, based on the grouping manner supported by the first terminal device and the grouping manner supported by the first access network device for use, the first target manner for receiving paging of the first access network device. When determining the first target manner, the first terminal device considers not only the grouping manner supported by the first terminal device but also the grouping manner supported by the first access network device for use. In this way, the determined first target manner is a grouping manner supported by the first access network device. Therefore, the first terminal device can also receive paging of the first access network device in the first target manner. This helps avoid a paging error.

In some possible implementations, the first target manner is a first grouping manner, a second grouping manner, or a non-grouping manner.

The first grouping manner is a grouping manner controlled by a core network device, and the second grouping manner is a grouping manner controlled by an access network device.

In some possible implementations, the obtaining a grouping manner supported by a first access network device for use includes: receiving the grouping manner supported by the first access network device for use broadcast by the first access network device.

In some possible implementations, the method further includes: learning, from the first access network device, that the first terminal device is to receive the paging message.

A group to which the first terminal device belongs is a target group. The target group includes a terminal device whose target manner is not the first target manner and a terminal device whose target manner is the first target manner. The terminal device whose target manner is the first target manner includes the first terminal device.

In some possible implementations, the learning, from the first access network device, that the first terminal device is to receive the paging message includes: determining, by receiving a wake-up signal or downlink control information DCI from the first access network device, that the first terminal device is to receive the paging message, where the wake-up signal is used to wake up the first terminal device.

In some possible implementations, the determining, by receiving a wake-up signal or downlink control information DCI from the first access network device, that the first terminal device is to receive the paging message includes: determining, by using second indication information included in the wake-up signal or the DCI received from the first access network device, that the first terminal device is to receive the paging message, where the wake-up signal or the DCI includes a target group number corresponding to the first target manner, and the target group number corresponding to the first target manner is used to receive the paging message of the first access network device.

In some possible implementations, the determining, by receiving a wake-up signal or DCI from the first access network device, that the first terminal device is to receive the paging message includes: determining, by using a target group number corresponding to the first target manner and carried in a target field included in the wake-up signal or the DCI, that the first terminal device is to receive the paging message, where the target group number corresponding to the first target manner is used to receive the paging message of the first access network device.

The target field is a first field or a second field. The first field is a field corresponding to the first grouping manner. The second field is a field corresponding to the second grouping manner. The first target manner is the first grouping manner or the second grouping manner.

In some possible implementations, the determining, by receiving a wake-up signal from the first access network device, that the first terminal device is to receive the paging message includes: determining, by receiving the wake-up signal from the first access network device at a target resource location, that the first terminal device is to receive the paging message.

The target resource location is a first resource location or a second resource location. The first resource location is a resource location corresponding to the first grouping manner. The second resource location is a resource location corresponding to the second grouping manner. The first target manner is the first grouping manner or the second grouping manner.

In some possible implementations, the determining, by receiving a wake-up signal from the first access network device, that the first terminal device is to receive the paging message includes: if the wake-up signal received from the first access network device is scrambled by using a target radio network temporary identifier, determining that the first terminal device is to receive the paging message.

The target radio network temporary identifier is a first radio network temporary identifier or a second radio network temporary identifier. The first radio network temporary identifier is a radio network temporary identifier corresponding to the first grouping manner. The second radio network temporary identifier is a radio network temporary identifier corresponding to the second grouping manner. The first target manner is the first grouping manner or the second grouping manner.

In some possible implementations, the receiving a paging message of the first access network device in the first target manner includes: receiving the paging message of the first access network device based on a target group number corresponding to the first target manner.

The target group number falls within a first group number range or a second group number range. The first group number range is a group number range corresponding to the first grouping manner. The second group number range is a group number range corresponding to the second grouping manner. There is no intersection between the first group number range and the second group number range. The first target manner is the first grouping manner or the second grouping manner.

In some possible implementations, the determining, based on the grouping manner supported by the first access network device for use and a grouping manner supported by the first terminal device, a first target manner to be used by the first terminal device to receive paging of the first access network device includes:

- if the grouping manner supported by the first access network device for use includes the first grouping manner, and the first terminal device can use the first grouping manner, determining that the first target manner to be used by the first terminal device to receive paging of the first access network device is the first grouping manner, where the first grouping manner is a manner in which the core network device groups a plurality of terminal devices; or
- if the grouping manner supported by the first access network device for use includes the second grouping manner, and the first terminal device can use the second grouping manner, determining that the first target manner to be used by the first terminal device to receive paging of the first access network device is the second grouping manner, where the second grouping manner is a manner in which the first access network device groups a plurality of terminal devices; or
- if the grouping manner supported by the first access network device for use is the first grouping manner, and the first terminal device can use the second grouping manner but cannot use the first grouping manner, determining that the first target manner to be used by the first terminal device to receive paging of the first access network device is the non-grouping manner; or
- if the grouping manner supported by the first access network device for use is the second grouping manner, and the first terminal device can use the first grouping manner but cannot use the second grouping manner, determining that the first target manner to be used by the first terminal device to receive paging of the first access network device is the non-grouping manner; or
- if the grouping manner supported by the first access network device for use is the first grouping manner and the second grouping manner, and the first terminal device can use the first grouping manner and the second grouping manner, determining the first target manner based on a priority of the first grouping manner and a priority of the second grouping manner.

A grouping manner that can be used by the first terminal device is determined based on the grouping manner supported by the first terminal device.

Optionally, in some embodiments, the grouping manner that can be used by the first terminal device is the grouping manner supported by the first terminal device. In some other embodiments, the grouping manner that can be used by the first terminal device is a grouping manner determined based on the grouping manner supported by the first terminal device and third indication information.

In some possible implementations, the determining the first target manner based on a priority of the first grouping manner and a priority of the second grouping manner includes:

- determining the first grouping manner whose priority is higher than that of the second grouping manner as the first target manner.

In some possible implementations, the method further includes: receiving the third indication information from a second access network device, where the third indication information indicates whether the first terminal device can use a grouping manner in a radio resource control RRC inactive state.

In the foregoing solution, the first terminal device can receive the third indication information from the second access network device. In this way, the first terminal device can refer to the third indication information when determining the first target manner.

In some possible implementations, the method further includes: if the third indication information indicates that the first terminal device cannot use the grouping manner in the RRC inactive state, skipping obtaining the grouping manner supported by the first access network device for use.

The obtaining a grouping manner supported by a first access network device for use includes: if the third indication information indicates that the first terminal device can use a grouping manner in the RRC inactive state, obtaining the grouping manner supported by the first access network device for use.

In the foregoing solution, if the third indication information indicates that the first terminal device can use a grouping manner in the RRC inactive state, the first terminal device can obtain the grouping manner supported by the first access network device for use, and then determine, based on the grouping manner supported by the first access network device for use and the grouping manner supported by the first terminal device, the first target manner for receiving paging of the first access network device. When the third indication information indicates that the first terminal device cannot use a grouping manner in the RRC inactive state, the first terminal device may not obtain the grouping manner supported by the first access network device. This can reduce signaling overheads.

In some possible implementations, the receiving the third indication information from a second access network device includes: receiving an RRC release message from the second access network device, where the RRC release message includes the third indication information, and the RRC release message is used to release the first terminal device from an RRC connected state to the RRC inactive state.

In the foregoing solution, when releasing the first terminal device, the second access network device can carry the third indication information in the RRC release message, so that the first terminal device can also determine, in the RRC inactive state based on the third indication information, the first target manner for receiving paging of the first access network device.

In some possible implementations, the receiving the third indication information from a second access network device includes: receiving a broadcast system message from the second access network device, where the system message includes the third indication information.

In the foregoing solution, when the first terminal device is within a coverage area of the second access network device, the first terminal device can receive the system message broadcast by the second access network device. The system message can carry the third indication information.

In some possible implementations, the third indication information specifically indicates that the first terminal device can use the first grouping manner and/or the second grouping manner in the RRC inactive state. The method further includes:

determining, as the grouping manner that can be used by the first terminal device, a grouping manner in which there is an intersection between the grouping manner supported by the first terminal device and a grouping manner indicated by the third indication information.

In some possible implementations, the method further includes: if the first terminal device supports the first grouping manner, or supports the first grouping manner and the second grouping manner, and the third indication information indicates that the first terminal device can use the first grouping manner in the RRC inactive state, determining that the first terminal device can use the first grouping manner.

In some possible implementations, the method further includes: if the first terminal device supports the second grouping manner, or supports the first grouping manner and the second grouping manner, and the third indication information indicates that the first terminal device can use the second grouping manner in the RRC inactive state, determining that the first terminal device can use the second grouping manner.

In some possible implementations, the method further includes: if the first terminal device supports the first grouping manner and the second grouping manner, and the third indication information indicates that the first terminal device can use the first grouping manner and the second grouping manner in the RRC inactive state, determining that the first terminal device can use the first grouping manner and the second grouping manner.

In some possible implementations, the method further includes: receiving fourth indication information from the second access network device, where the fourth indication information indicates whether the first terminal device can use a grouping manner in the RRC inactive state. The first terminal device can determine, based on the grouping manner supported by the first access network device for use and the fourth indication information, the first target manner for receiving paging of the first access network device. The first access network device can determine, based on the fourth indication information and the grouping manner supported by the first access network device for use, the first target manner for paging the first terminal device.

Optionally, the fourth indication information specifically indicates that the first terminal device can use the first grouping manner and/or the second grouping manner in the RRC inactive state.

It should be noted that, for other descriptions of the second aspect, refer to the descriptions of the first aspect. To avoid repetition, details are not described in this embodiment of this application.

According to a third aspect, a paging method is provided. The method is applicable to a second access network device and includes: generating third indication information based on a grouping manner supported by the second access network device for use, where the third indication information indicates whether a first terminal device can use a grouping manner in a radio resource control RRC inactive state; and sending the third indication information to the first terminal device.

In the foregoing solution, the second access network device can indicate whether the first terminal device can use a grouping manner in the RRC inactive state, or indicate a specific grouping manner that can be used. In this way, the first terminal device can determine, based on a grouping manner supported by the first terminal device and the third indication information, the grouping manner that can be used by the first terminal device.

Optionally, a first access network device determines, based on a grouping manner supported by the first access network device, grouping capability information and/or a first group number of the first terminal device that are/is received from the second access network device, and the grouping manner that is supported by the first terminal device and that is indicated by the grouping capability information of the first terminal device, a first target manner for paging the first terminal device. The first access network device may broadcast the grouping manner supported by the first access network device for use. The first terminal device may determine, based on the grouping manner supported by the first access network device for use and the grouping manner that can be used by the first terminal device, the first target manner for receiving paging of the first access network device. The first access network device determines, based on the grouping manner supported by the first access network device for use and the grouping capability information of the first terminal device, the first target manner for paging the first terminal device. In this way, the first target manner in which the first access network device pages the first terminal device can be consistent with a first target manner in which the first terminal device receives paging, to reduce power consumption.

Optionally, the second access network device supports different grouping manners for use. Capabilities that the second access network device can send, to the first access network device, information used for paging are also different. For example, if the second access network device supports a first grouping manner, the second access network device may send the grouping capability information of the first terminal device to the first access network device. For another example, if the second access network device supports a first grouping manner and a second grouping manner, or supports a first grouping manner, the second access network device may send the grouping capability information and the first group number of the first terminal device to the first access network device. For still another example, if the second access network device supports a first grouping manner, the second access network device may send the first group number to the first access network device, but does not send the grouping capability information of the first terminal device. In this way, the first access network device can determine, based on the grouping capability information and/or the first group number of the first terminal device that are/is received from the second access network device, the grouping manner supported by the first access network device for use, and the grouping manner that is supported by the first terminal device and that is indicated by the grouping capability information of the first terminal device, the first target manner for paging the first terminal device. The first terminal device can determine, based on the third indication information, the grouping manner supported by the first terminal device, and the grouping manner supported by the first access network device for use, the first paging manner for receiving paging of the first access network device.

Optionally, the method further includes: generating fourth indication information based on the grouping manner supported by the second access network device for use and the grouping manner that is supported by the first terminal device and that is indicated by the grouping capability information of the first terminal device. The fourth indication information indicates whether the first terminal device can use a grouping manner in the RRC inactive state. The second access network device may send the fourth indication information to the first terminal device and the first access network device. In this way, the first terminal device can determine, based on the fourth indication information and the grouping manner supported by the first access network device for use, the first target manner for receiving paging of the first access network device. The first access network device can determine, based on the fourth indication information and the grouping manner supported by the first access network device for use, the first target manner for paging the first terminal device. In other words, a policy used by the first access network device to determine to page the first terminal device is consistent with a policy used by the first terminal device to determine to receive paging. In this way, the first access network device and the first terminal device can use a consistent understanding. This can improve a paging probability, and can reduce power consumption.

Optionally, the fourth indication information specifically indicates that the first terminal device can use the first grouping manner and/or the second grouping manner in the RRC inactive state.

In some possible implementations, the sending the third indication information to the first terminal device includes: sending an RRC release message to the first terminal device in an RRC connected state. The RRC release message includes the third indication information. After receiving the RRC release message, the first terminal device enters the RRC inactive state from the RRC connected state.

In some possible implementations, the sending the third indication information to the first terminal device includes: broadcasting a system message. The system message includes the third indication information.

In some possible implementations, the third indication information specifically indicates that the first terminal device can use the first grouping manner and/or the second grouping manner in the RRC inactive state.

The second grouping manner is a grouping manner controlled by an access network device, and the first grouping manner is a grouping manner controlled by a core network device.

In some possible implementations, the generating third indication information based on a grouping manner supported by the second access network device for use includes:

- if the second access network device supports the second grouping manner for use, the generated third indication information specifically indicates that the first terminal device can use the second grouping manner in the RRC inactive state; or
- if the second access network device supports the first grouping manner for use, or supports the first grouping manner and the second grouping manner, the generated third indication information specifically indicates that the first terminal device can use the first grouping manner and the second grouping manner in the RRC inactive state.

In some possible implementations, the method further includes: receiving the grouping capability information of the first terminal device from the core network device, where the grouping capability information of the first terminal device indicates the grouping manner supported by the first terminal device; and

- determining, based on the grouping manner supported by the second access network device for use, whether to send the grouping capability information of the first terminal device to the first access network device, where the first access network device is an access network device that belongs to a same notification area NA as the second access network device.

In some possible implementations, the determining, based on the grouping manner supported by the second access network device for use, whether to send the grouping capability information of the first terminal device to the first access network device includes:

- if the grouping manner supported by the second access network device for use is the first grouping manner and/or the second grouping manner, determining to send the grouping capability information of the first terminal device to the first access network device, where the method further includes:
- sending the grouping capability information of the first terminal device to the first access network device; or if the second access network device supports no grouping manner for use, determining not to send the grouping capability information of the first terminal device to the first access network device.

In some possible implementations, the method further includes:

receiving the first group number of the first terminal device from the core network device, where the first group number is a group number corresponding to the first grouping manner; and determining, based on the grouping manner supported by the second access network device for use, whether to send the first group number of the first terminal device to the first access network device.

In some possible implementations, the determining, based on the grouping manner supported by the second access network device for use, whether to send the first group number of the first terminal device to the first access network device includes:

if the grouping manner supported by the second access network device for use includes the first grouping manner, sending the first group number of the first terminal device to the first access network device.

For descriptions of the third aspect, refer to the descriptions of the second aspect and the first aspect. To avoid repetition, details are not described in this embodiment of this application.

According to a fourth aspect, a paging method is provided. The method includes: sending first indication information to a first access network device. The first indication information indicates whether a core network device supports a first grouping manner. The first grouping manner is a grouping manner controlled by the core network device.

In the foregoing solution, the core network device can indicate, to the first access network device, whether the core network device supports the first grouping manner. This helps the first access network device determine, based on the indication of the core network device and a grouping manner supported by the first access network device, a grouping manner supported by the first access network device for use, thereby providing a possibility of paging a first terminal device in a grouping manner.

In some possible implementations, the method further includes: learning, from the first access network device, whether the first access network device supports the first grouping manner for use; and if it is learned from the first access network device that the first access network device supports the first grouping manner for use, sending, to the first access network device, a first group number of the first terminal device obtained after the core network device groups a plurality of terminal devices in the first grouping manner.

In some possible implementations, the method further includes: sending grouping capability information of the first terminal device to the first access network device.

According to a fifth aspect, a communications apparatus for paging is provided. The communications apparatus is configured to perform the method according to any possible implementation of the first aspect. Specifically, the communications apparatus may include a processing unit and a transceiver unit. The transceiver unit may communicate with the outside, and the processing unit is configured to process data. The transceiver unit may also be referred to as a communications interface or a communications unit.

The communications apparatus may be configured to perform an action performed by the first access network device in any possible implementation of the first aspect. In this case, the communications apparatus may be referred to as the first access network device. The transceiver unit is configured to perform a receiving or sending-related operation of the first access network device in any possible implementation of the first aspect. The processing unit is configured to perform a processing-related operation of the first access network device in any possible implementation of the first aspect.

According to a sixth aspect, a communications apparatus for paging is provided. The communications apparatus is configured to perform the method according to any possible implementation of the second aspect. Specifically, the communications apparatus may include a processing unit and a transceiver unit. The transceiver unit may communicate with the outside, and the processing unit is configured to process data. The transceiver unit may also be referred to as a communications interface or a communications unit.

The communications apparatus may be configured to perform an action performed by the first terminal device in any possible implementation of the second aspect. In this case, the communications apparatus may be referred to as the first terminal device. The transceiver unit is configured to perform a receiving or sending-related operation of the first terminal device in any possible implementation of the second aspect. The processing unit is configured to perform a processing-related operation of the first terminal device in any possible implementation of the second aspect.

According to a seventh aspect, a communications apparatus for paging is provided. The communications apparatus is configured to perform the method according to any possible implementation of the third aspect. Specifically, the communications apparatus may include a processing unit and a transceiver unit. The transceiver unit may communicate with the outside, and the processing unit is configured to process data. The transceiver unit may also be referred to as a communications interface or a communications unit.

The communications apparatus may be configured to perform an action performed by the second access network device in any possible implementation of the third aspect. In this case, the communications apparatus may be referred to as the second access network device. The transceiver unit is configured to perform a receiving or sending-related operation of the second access network device in any possible implementation of the third aspect. The processing unit is configured to perform a processing-related operation of the second access network device in any possible implementation of the third aspect.

According to an eighth aspect, a communications apparatus for paging is provided. The communications apparatus is configured to perform the method according to any possible implementation of the fourth aspect. Specifically, the communications apparatus may include a processing unit and a transceiver unit. The transceiver unit may communicate with the outside, and the processing unit is configured to process data. The transceiver unit may also be referred to as a communications interface or a communications unit.

The communications apparatus may be configured to perform an action performed by the core network device in any possible implementation of the fourth aspect. In this case, the communications apparatus may be referred to as the core network device. The transceiver unit is configured to perform a receiving or sending-related operation of the core network device in any possible implementation of the fourth aspect. The processing unit is configured to perform a processing-related operation of the core network device in any possible implementation of the fourth aspect.

According to a ninth aspect, a communications apparatus is provided. The communications apparatus includes a processor and a memory. The processor is coupled to the memory. The memory is configured to store a computer program or instructions. The processor is configured to execute the computer program or the instructions stored in the memory, so that the method according to any one of the first aspect or the possible implementations of the first aspect is performed.

For example, the processor is configured to execute the computer program or the instructions stored in the memory, to enable the communications apparatus to perform the method according to any one of the first aspect or the possible implementations of the first aspect.

Optionally, the communications apparatus includes one or more processors.

Optionally, the communications apparatus may further include a memory coupled to the processor.

Optionally, the communications apparatus includes one or more memories.

Optionally, the memory may be integrated with the processor, or the memory and the processor are disposed separately.

Optionally, the communications apparatus may further include a transceiver.

According to a tenth aspect, a communications apparatus is provided. The communications apparatus includes a processor and a memory. The processor is coupled to the memory. The memory is configured to store a computer program or instructions. The processor is configured to execute the computer program or the instructions stored in the memory, so that the method according to any one of the second aspect or the possible implementations of the second aspect is performed.

For example, the processor is configured to execute the computer program or the instructions stored in the memory, to enable the communications apparatus to perform the method according to any one of the second aspect or the possible implementations of the second aspect.

Optionally, the communications apparatus includes one or more processors.

Optionally, the communications apparatus may further include a memory coupled to the processor.

Optionally, the communications apparatus includes one or more memories.

Optionally, the memory may be integrated with the processor, or the memory and the processor are disposed separately.

Optionally, the communications apparatus may further include a transceiver.

According to an eleventh aspect, a communications apparatus is provided. The communications apparatus includes a processor and a memory. The processor is coupled to the memory. The memory is configured to store a computer program or instructions. The processor is configured to execute the computer program or the instructions stored in the memory, so that the method according to any one of the third aspect or the possible implementations of the second third is performed.

For example, the processor is configured to execute the computer program or the instructions stored in the memory, to enable the communications apparatus to perform the method according to any one of the third aspect or the possible implementations of the third aspect.

Optionally, the communications apparatus includes one or more processors.

Optionally, the communications apparatus may further include a memory coupled to the processor.

Optionally, the communications apparatus includes one or more memories.

Optionally, the memory may be integrated with the processor, or the memory and the processor are disposed separately.

Optionally, the communications apparatus may further include a transceiver.

According to a twelfth aspect, a communications apparatus is provided. The communications apparatus includes a processor and a memory. The processor is coupled to the memory. The memory is configured to store a computer program or instructions. The processor is configured to execute the computer program or the instructions stored in the memory, so that the method according to any one of the fourth aspect or the possible implementations of the fourth aspect is performed.

For example, the processor is configured to execute the computer program or the instructions stored in the memory, to enable the communications apparatus to perform the method according to any one of the fourth aspect or the possible implementations of the fourth aspect.

Optionally, the communications apparatus includes one or more processors.

Optionally, the communications apparatus may further include a memory coupled to the processor.

Optionally, the communications apparatus includes one or more memories.

Optionally, the memory may be integrated with the processor, or the memory and the processor are disposed separately.

Optionally, the communications apparatus may further include a transceiver.

According to a thirteenth aspect, a communications system is provided. The communications system includes communications apparatuses according to at least two of any one of the fifth aspect or the possible implementations of the fifth aspect to any one of the eighth aspect or the possible implementations of the eighth aspect. Alternatively, the communications system includes communications apparatuses according to at least two of any one of the ninth aspect or the possible implementations of the ninth aspect to any one of the twelfth aspect or the possible implementations of the twelfth aspect.

According to a fourteenth aspect, a computer-readable storage medium is provided. The computer-readable storage medium stores a computer program (which may also be referred to as instructions or code) used to implement the method according to any one of the aspects or the possible implementations of the aspects.

For example, when the computer program is executed by a computer, the computer is enabled to perform the method according to any one of the aspects or the possible implementations of the aspects. The computer may be a communications apparatus.

According to a fifteenth aspect, this application provides a chip, including a processor. The processor is configured to read and execute a computer program stored in a memory, to perform the method according to any one of the aspects or the possible implementations of the aspects.

Optionally, the chip further includes a memory, and the memory and the processor are connected through a circuit or a wire.

Further optionally, the chip further includes a communications interface.

According to a sixteenth aspect, this application provides a computer program product. The computer program product includes a computer program (which may also be referred to as instructions or code). When the computer program is executed by a computer, the computer is enabled to implement the method according to any one of the aspects or the possible implementations of the aspects.

DETAILED DESCRIPTION OF ILLUSTRATIVE EMBODIMENTS

The following describes the technical solutions in embodiments of this application with reference to the accompanying drawings in embodiments of this application.

The technical solutions in embodiments of this application may be applied to various communications system, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (new radio, NR) system.

Figure 1:
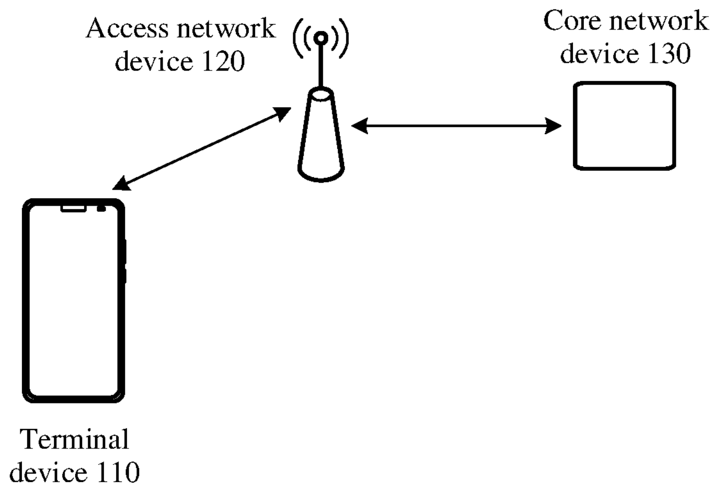
FIG. 1 is a schematic diagram of an architecture of a system according to an embodiment of this application.

FIG. 1 is a schematic diagram of an architecture of a system used in an embodiment of this application. As shown in FIG. 1, the system includes a terminal device 110, an access network device 120, and a core network device 130.

The terminal device 110 is also referred to as user equipment (UE), a mobile station (MS), a mobile terminal (MT), an access terminal, a subscriber unit, a subscriber station, a remote station, a remote terminal, a mobile device, a user terminal, a terminal, a wireless communications device, a user agent, a user communications apparatus, or the like.

The terminal device 110 may be a device that provides voice/data connectivity for a user, for example, a handheld device or a vehicle-mounted device that has a wireless connection function. Currently, examples of some terminal devices include a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communications function, a computing device or another processing device connected to a wireless modem, a vehicle-mounted device, a terminal device in a 5G network, a terminal device in a future evolved public land mobile network (PLMN), or the like. This is not limited in this application. For example, the terminal device 110 is configured to receive a paging message from the access network device 120.

The access network device 120 may also be referred to as a radio access network (RAN) or a radio access network device. The access network device 120 may be a transmission reception point (TRP), or may be an evolved NodeB (evolved NodeB, eNB, or eNodeB) in an LTE system, or may be a home NodeB (for example, a home evolved NodeB, a home NodeB, or an HNB), or a baseband unit (BBU), or may be a radio controller in a cloud radio access network (CRAN) scenario. Alternatively, the access network device 120 may be a relay station, an access point, a vehicle-mounted device, a wearable device, a network device in the 5G network, a network device in the future evolved PLMN network, or the like, or may be an access point (AP) in a WLAN, or may be a gNB in an NR system. The access network device 120 may alternatively be a city base station, a micro base station, a pico base station, a femto base station, or the like. This is not limited in this application. For example, the access network device 120 is configured to send the paging message used to page the terminal device 110.

In a network structure (which may be referred to as a CU-DU network architecture), the access network device 120 may include a centralized unit (CU) node, a distributed unit (DU) node, a radio access network (RAN) device including a CU node and a DU node, or a device including a control plane CU node (CU-CP node), a user plane CU node (CU-UP node), and a DU node. An interface between the CU and the DU is an F1 interface. The UE may be connected to the DU in the gNB. The CU indicates that the access network device is connected to the core network device through an interface (for example, an Ng interface). The CU processes a radio upper-layer protocol stack function, for example, a radio resource control (RRC) layer and a packet data convergence protocol (PDCP) layer. The DU processes a baseband processing physical layer and some protocol stack functions of Layer 2, for example, a radio link control (RLC) layer, a media access control (MAC) layer, and a physical layer (PHY).

The core network device 130 is configured to manage one or more access network devices 120. For example, the core network device 130 is configured to send, to the access network device 120, information used by the access network device to send the paging message. For example, the information includes an identifier of the terminal device 110 and a group number of the terminal device 110. For example, the core network device 130 may include at least one of a core network access and mobility management function (AMF), a user plane function (UPF) network element, a session management function (SMF) network element, a data network (DN), a unified data repository (UDR), or unified data management (UDM).

In some communications mechanisms, the terminal device 110 may cyclically wake up on a paging occasion (PO) to receive the paging message, and is in a hibernation state at another time point, to reduce power consumption of the terminal device 110. The PO of the terminal device 110 may be obtained through calculation based on the identifier of the terminal device 110. Specifically, the terminal device 110 first receives, on the paging occasion of the terminal device 110, downlink control information (DCI) indicating scheduling of the paging message. The downlink control information is downlink control information scrambled by a paging radio network temporary identifier (P-RNTI), and indicates a time-frequency resource location at which the paging message is sent. The downlink control information is transmitted on a physical downlink control channel (PDCCH). The paging message is transmitted on a physical downlink shared channel (PDSCH). If the DCI indicates the time-frequency resource location at which the paging message is sent, the terminal device 110 receives the paging message at the time-frequency location indicated by the DCI. If the access network device 120 or the core network device 130 needs to send downlink data to the terminal device 110, the access network device 120 or the core network device 130 sends the paging message at the time-frequency resource location indicated by the DCI. The paging message may include the identifier of the terminal device 110. If the core network device 130 needs to page the terminal device 110, the core network device 130 may send the paging message to the access network device 120, and the access network device 120 sends the paging message. If the access network device 120 needs to page the terminal device 110, the access network device 120 may send the paging message to the terminal device 110. If there are a plurality of terminal devices within a coverage area of the access network device 120, the plurality of terminal devices wake up on paging occasions (POs) of the plurality of terminal devices to receive the DCI. The plurality of terminal devices are in the sleep state except on the POs of the plurality of terminal devices. The PO is cyclic. The access network device 120 broadcasts a common paging cycle value of a cell, which is referred to as a default paging cycle. The terminal device 110 has a specific paging cycle value, which is referred to as a terminal device specific paging cycle (UE specific paging cycle). A paging cycle value actually used by the terminal device may be a smaller value of the default paging cycle and the UE specific paging cycle. A paging cycle value (for example, the default paging cycle or the UE specific paging cycle) defined in an existing standard includes 0.32 s, 0.64 s, 1.28 s, and 2.56 s. The access network device sends the DCI on the PO of the to-be-paged terminal device 110, and POs of some terminal devices are the same as the PO of the to-be-paged terminal device 110. Therefore, all these terminal devices may receive the DCI on the PO of the terminal device 110, and these terminal devices receive the paging messages at the time-frequency resource location indicated by the DCI. After the terminal device 110 receives the paging message, if an identifier included in the paging message is the identifier of the terminal device 110, the terminal device 110 initiates a radio resource control (RRC) establishment request. In other words, regardless of which terminal device is to be paged by the access network device 120 or the core network device 130, all terminal devices corresponding to the PO within the coverage area of the access network device need to wake up on the PO to receive the DCI, and receive the paging message at the time-frequency resource location indicated by the DCI. Only after receiving the paging message, the other terminal devices can find that the identifier included in the paging message is not identifiers of the other terminal devices. Consequently, power consumption of the terminal devices is high.

To reduce power consumption of a terminal device, in a possible implementation, the core network device 130 may group a plurality of terminal devices corresponding to one PO, to obtain a plurality of groups. One group of terminal devices corresponds to one group number, and the plurality of groups of terminal devices correspond to a plurality of group numbers. Grouping the plurality of terminal devices by the core network device 130 is also referred to as a first grouping manner. Optionally, the core network device 130 may perform grouping based on feature information of each terminal device, and put terminal devices with similar features into one group, for example, put terminal devices with a low paging probability into one group, and put terminal devices with a high paging probability into one group. The core network device 130 may notify each terminal device of a group number to which each terminal device belongs. Each terminal device may store the group number allocated by the core network device 130 to each terminal device. The plurality of terminal devices include the terminal device 110. In another possible implementation, the core network device 130 may allocate a paging probability to each terminal device. Optionally, the core network device 130 may allocate a finally used paging probability to each terminal device based on a paging probability feature of each terminal device. The terminal device 110 may determine a finally used group number based on a correspondence between the paging probability and a group number that are indicated by the access network device 120 and based on the finally used paging probability negotiated with the core network device 130. When needing to page the terminal device 110, the core network device 130 may send the group number of the terminal device 110 and the identifier of the terminal device 110 to the access network device 120. The access network device 120 pages the terminal device 110 based on the group number of the terminal device 110 and the identifier of the terminal device 110. A terminal device with a same group number as the terminal device 110 needs to wake up to receive the paging message, and a terminal device with a different group number from the terminal device 110 may not wake up to receive the paging message. In this way, power consumption of some terminal devices can be reduced.

To reduce power consumption of a terminal device, in another possible implementation, the access network device 120 may group a plurality of terminal devices, to obtain a plurality of groups. One group of terminal devices corresponds to one group number, and the plurality of groups of terminal devices correspond to a plurality of group numbers. Grouping the plurality of terminal devices by the access network device 120 is also referred to as a second grouping manner. Optionally, the access network device 120 may perform grouping based on an identifier of each terminal device. Specifically, the access network device 120 may obtain a group number through calculation based on the identifier of each terminal device, for example, perform a modulo operation on a quantity of groups by using the identifier of each terminal device. Each terminal device may alternatively obtain a group number of each terminal device through calculation in a same manner as that of calculating a group number by the access network device 120. The plurality of terminal devices include the terminal device 110. When the access network device 120 needs to page the terminal device 110, the access network device 120 pages the terminal device 110 based on the group number of the terminal device 110. A terminal device with a same group number as the terminal device 110 needs to wake up to receive the paging message, and a terminal device with a different group number from the terminal device 110 may not wake up to receive a paging message. In this way, power consumption of some terminal devices can be reduced.

Power consumption of the terminal device can be reduced by using the foregoing two grouping mechanisms. In a process of paging the terminal device 110 by using the foregoing two grouping mechanisms, first, the access network device 120 calculates the PO of the terminal device 110 based on the identifier of the terminal device 110. A manner of calculating the PO by the access network device 120 is consistent with a manner of calculating the PO by the terminal device 110. In the foregoing two grouping mechanisms, there may be two grouping paging mechanisms.

First Grouping Paging Mechanism

Figure 2:
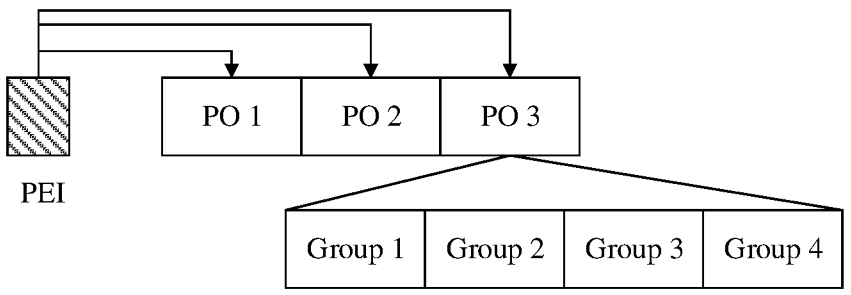
FIG. 2 is a schematic diagram of a PO and a group according to an embodiment of this application.

The access network device 120 may send a wake-up signal (WUS) at a time-frequency resource location of an offset that is before the PO of the terminal device 110. The WUS indicates whether a group of terminal devices on the PO receives the DCI, or the WUS indicates whether a group of terminal devices on a PO in a plurality of POs receives the DCI. The received DCI may be the DCI scrambled by the paging radio network temporary identifier. The group of terminal devices may be a group of terminal devices that is obtained after the access network device 120 performs grouping or a group of terminal devices that is obtained after the core network device 130 performs grouping. The WUS may also be referred to as a paging early indication (PEI). A location at which the WUS is sent may be stipulated in a protocol or configured by the access network device 120. Each terminal device may wake up at the location, at which the WUS is sent, to receive the WUS. Each terminal device determines, based on the indication of the WUS, whether the group of terminal devices on the PO in the plurality of POs receives the DCI. Each terminal device determines, based on the indication of the WUS, that a terminal device in the group indicated by the WUS needs to wake up on the PO to receive the DCI, and a terminal device in a group that is not indicated by the WUS continue to be in the hibernation state, and does not wake up on the PO. The WUS or the PEI may be DCI, a sequence, or a reference signal. For example, as shown in FIG. 2, the access network device 120 may send the PEI at an offset that is before a PO 1. The PEI includes a field or a bit to indicate whether a terminal device in a group on a subsequent PO receives the paging message. For example, the field or the bit included in the PEI is 12 bits or 16 bits. For example, the field or the bit is 12 bits. For example, the 12 bits are associated with three POs shown in FIG. 2, which are the PO 1, a PO 2, and a PO 3. Each PO supports four groups. FIG. 2 shows only four groups supported by the PO 3, which are a group 1, a group 2, a group 3, and a group 4. For example, the 12 bits are 0000 0000 0100. The first four bits 0000 indicate that four groups supported by the PO 1 do not receive the paging message, the middle four bits 0000 indicate that four groups supported by the PO 2 do not receive the paging message, and the last four bits moo indicate that a terminal device in the group 2 supported by the PO 3 is to receive the paging message. Alternatively, the 12 bits are associated with two POs, and each PO supports six groups. Optionally, a quantity of POs associated with the PEI and a quantity of groups on each PO may be configured by a network device, or may be predefined in a protocol. The terminal device 110 may calculate the PO based on the identifier of the terminal device 110, and receive the PEI at the offset that is before the PO. The terminal device 110 determines, based on a group on a PO indicated by the PEI, whether the PO indicated by the PEI is the PO obtained by the terminal device 110 through calculation. If the PO indicated by the PEI is the PO obtained by the terminal device 110 through calculation based on the identifier of the terminal device 110, the terminal device 110 further determines whether a group number on the PO indicated by the PEI is the group number allocated by the core network device 130 to the terminal device 110. If the group number on the PO indicated by the PEI is the group number allocated by the core network device 130 to the terminal device 110, the terminal device 110 wakes up on the PO to receive the DCI, and all terminal devices in a group with the terminal device 110 wake up on the PO to receive the DCI. All the terminal devices in the group with the terminal device 110 receive the paging message at the time-frequency resource location indicated by the DCI. If the paging message includes the identifier of the terminal device 110, the terminal device 110 initiates the RRC establishment request message. If the PO indicated by the PEI is not the PO obtained by the terminal device 110 through calculation based on the identifier of the terminal device 110, the terminal device continues to hibernate, and does not receive the downlink control information on the PO. Alternatively, if the PO indicated by the PEI is the PO obtained by the terminal device 110 through calculation based on the identifier of the terminal device 110, but the group number on the PO indicated by the PEI is not the group number to which the terminal device 110 belongs, the terminal device 110 continues to hibernate, does not wake up on the PO, and does not receive the DCI on the PO. In the first paging mechanism, the terminal device in the group corresponding to the group number wakes up on the PO to receive the DCI, and a terminal device in another group continues to be in the hibernation state. This can reduce power consumption of the terminal device in the another group.

Second Grouping Paging Mechanism

The access network device 120 may send the DCI on the PO of the terminal device 110. The DCI indicates the group number of the to-be-paged terminal device and the time-frequency resource location at which the paging message is sent. All terminal devices corresponding to the PO of the terminal device 110 need to wake up to receive the DCI. Each terminal device determines, based on the group number indicated by the DCI, whether each terminal device needs to receive the paging message. If the group number indicated by the DCI is consistent with group numbers of some terminal devices, these terminal devices need to receive the paging message at the time-frequency resource location indicated by the DCI, and then, determine, based on an identifier of the terminal device in the paging message, whether these terminal devices are paged. For example, a group number of a group to which the terminal device 110 belongs is 4, and the access network device 120 needs to page the terminal device 110. The access network device 120 calculates, based on the identifier of the terminal device 110, that the PO of the terminal device 110 is a PO 4. The access network device 120 sends the DCI on the PO 4. The DCI indicates the group number 4 and the time-frequency resource location at which the paging message is sent. After receiving the DCI, the terminal device 110, a terminal device 140, and a terminal device 150 determine that the group number 4 indicated by the DCI is the same as the group number of the terminal device 110. Therefore, the terminal device 110 receives the paging message at the time-frequency resource location indicated by the DCI. If both a group number of the terminal device 140 and the group number of the terminal device 110 are 4, the terminal device 140 is to receive the paging message at the time-frequency resource location indicated by the DCI. If a group number of the terminal device 150 is not 4, the terminal device 150 does not receive the paging message at the time-frequency resource location indicated by the DCI. In the second grouping paging mechanism, a terminal device in each group corresponding to the PO of the terminal device 110 wakes up on the PO to receive the DCI. The terminal device in the group corresponding to the group number of the to-be-paged terminal device 110 receives the paging message at the time-frequency resource location indicated by the DCI. A terminal device in another group enters the hibernation state again, and no longer receives the paging message. This can reduce power consumption of the terminal device in the another group.

In an actual application scenario, the access network device 120 may support the first grouping manner and/or the second grouping manner, and the terminal device 110 may also support the first grouping manner and/or the second grouping manner. Alternatively, the access network device 120 supports no grouping manner, and the terminal device 110 supports the first grouping manner and/or the second grouping manner. Alternatively, the terminal device 110 supports no grouping manner, and the access network device 120 supports the first grouping manner and/or the second grouping manner. As a result, a manner to be used by the access network device 120 to page the terminal device 110 may be inconsistent with a manner supported by the terminal device 110. Consequently, a paging success rate is reduced. For example, if the terminal device 110 supports no grouping manner, the terminal device 110 wakes up on each PO to attempt to receive the DCI, and the access network device 120 supports the first grouping manner and/or the second grouping manner, when paging the terminal device 110 based on the first paging mechanism, the access network device 120 sends the PEI at the offset that is before the PO. Because the terminal device 110 supports no grouping manner, the terminal device 110 does not receive the PEI. In other words, signaling sent by the access network device 120 to page the terminal device 110 in the first grouping manner or the second grouping manner cannot be received by the terminal device 110. This results in signaling waste. For another example, if the terminal device 110 supports the first grouping manner or the second grouping manner, and the access network device 120 supports no grouping manner, the access network device 120 cannot group the plurality of terminal devices either. If the core network device 130 sends the group number of the group to which the terminal device 110 belongs, the access network device 120 cannot parse the group number. Therefore, the access network device 120 does not page the terminal device 110 by using a grouping mechanism, and the access network device 120 does not send the PEI at the offset that is before the PO of the terminal device 110. However, the terminal device 110 supports the first grouping manner or the second grouping manner, for example, the terminal device 110 attempts, by using the first paging mechanism, to receive the PEI at the offset that is before the PO. Because the access network device 120 does not send the PEI, therefore, the terminal device 110 needs to wake up at the time-frequency resource location at which the PEI is sent. This increases power consumption of the terminal device 110. For still another example, the access network device 120 supports the first grouping manner, the terminal device 110 supports the second grouping manner, and the group number used by the access network device 120 to page the terminal device 110 is allocated by the core network device 130. The terminal device 110 does not support the first grouping manner. Therefore, the terminal device 110 cannot parse the group number allocated by the core network device 130 to the terminal device 110, and therefore cannot parse the group number carried in the PEI or the DCI when the access network device 120 pages the terminal device 110. Consequently, paging fails. In addition, the terminal device 110 supports the second grouping manner. The terminal device 110 obtains the group number of the terminal device 110 through calculation based on the identifier of the terminal device 110. The group number carried in the PEI or the DCI sent by the access network device 120 may be used to page another terminal device. However, the group number carried in the PEI or the DCI may be the group number obtained by the terminal device 110 through calculation based on the identifier of the terminal device 110. Therefore, the terminal device 110 mistakenly considers that the terminal device 110 needs to wake up to receive the paging message at the time-frequency resource location indicated by the DCI. The terminal device 110 receives the paging message at the time-frequency resource location indicated by the DCI. After receiving the paging message, the terminal device 110 finds that the identifier carried in the paging message is not of the terminal device 110. Consequently, power consumption is high. In other words, because a grouping manner supported by the terminal device 110 is inconsistent a grouping manner supported by the access network device 120, group numbers of different terminal devices may be the same in different grouping manners. When the access network device 120 pages one of the terminal devices, all terminal devices with a same group number wake up to receive the paging message. Consequently, power consumption is high.

Therefore, in this embodiment of this application, the access network device 120 may determine, based on grouping capability information supported by the terminal device 110 and the grouping manner supported by the access network device 120, the first target manner for paging the terminal device 110, and the access network device 120 pages the terminal device 110 in the first target manner. Correspondingly, the terminal device 110 may determine, based on the grouping manner supported by the access network device 120 and the grouping manner supported by the terminal device 110, a first target manner for receiving paging of the access network device 120. The terminal device 110 receives the paging message of the access network device 120 in the first target manner. In this way, the first target manner in which the access network device 120 pages the terminal device 110 can be consistent with the first target manner in which the terminal device 110 receives paging of the access network device 120. This can improve a paging success rate, and also reduces overheads.

The following describes a paging method in embodiments of this application with reference to the accompanying drawings. To avoid repetition, a number of a device is omitted. For example, in the following, a core network device may be the core network device 130 in FIG. 1, a first access network device may be the access network device 120 in FIG. 1, and a first terminal device may be the terminal device 110 in FIG. 1.

Figure 3:
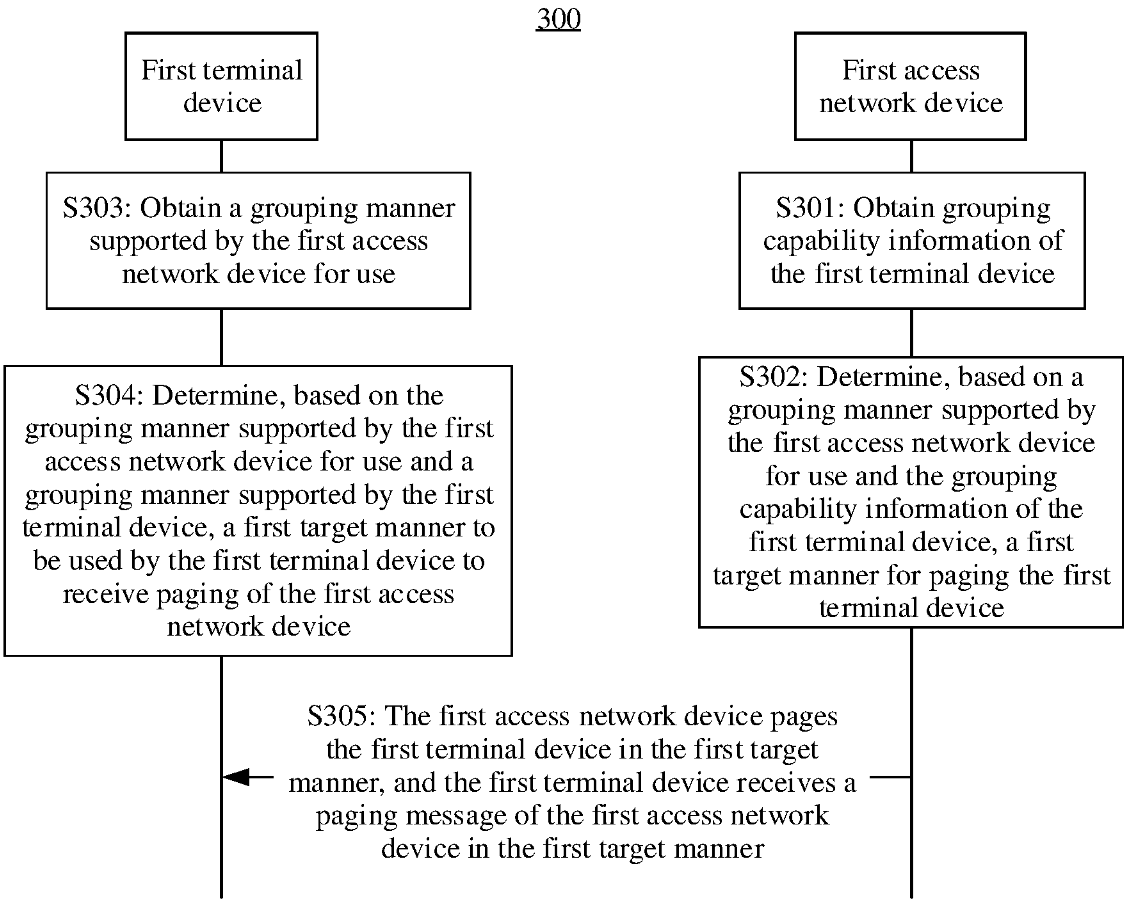
FIG. 3 is a schematic diagram of a paging method according to an embodiment of this application.

FIG. 3 shows a paging method 300 according to an embodiment of this application.

S301: A first access network device obtains grouping capability information of a first terminal device, where the grouping capability information indicates a grouping manner supported by the first terminal device.

Optionally, S301 includes: The first access network device obtains the grouping capability information of the first terminal device from a core network device. Optionally, the first terminal device may send the grouping capability information of the first terminal device to the core network device by using the first access network device. Specifically, the first terminal device may first send the grouping capability information of the first terminal device to the first access network device. Then, the access network device sends the grouping capability information of the first terminal device to the core network device. The core network device stores the grouping capability information of the first terminal device. When needing to page the first terminal device, the core network device may send the grouping capability information of the first terminal device to the first access network device. Optionally, when registering with the core network device, the first terminal device may send the grouping capability information of the first terminal device to the core network device. The core network device stores the grouping capability information of the first terminal device. Optionally, the first terminal device may send the grouping capability information of the first terminal device to the core network device by using a registration request message.

Optionally, S301 includes: The first access network device may obtain the grouping capability information of the first terminal device from a second access network device. For example, the second access network device is the last serving access network device when the first terminal device is in an RRC connected state, and the first access network device is an access network device on which the first terminal device camps in an RRC inactive (inactive) state. Therefore, the second access network device may send the grouping capability information of the first terminal device to the first access network device, so that, when paging the first terminal device, the first access network device determines a first target paging manner for paging based on the grouping capability information of the first terminal device.

Optionally, S301 includes: The first access network device may obtain the grouping capability information of the first terminal device from the first terminal device. For example, after the first terminal device accesses the first access network device, the first terminal device may send the grouping capability information of the first terminal device to the first access network device.

In an actual application scenario, different terminal devices have different versions, or different vendors have different terminal devices, or different terminal devices have different chip models, the different terminal devices support different grouping capabilities. A terminal device supports a grouping capability, a terminal device supports no grouping capability, a terminal device supports one grouping capability, and a terminal device supports two grouping capabilities. Therefore, the first access network device needs to learn the grouping capability information of the first terminal device, to determine the first target manner for paging the first terminal device.

Optionally, the grouping capability information of the first terminal device indicates whether the first terminal device supports a grouping manner. Optionally, the grouping capability information of the first terminal device indicates that the first terminal device supports the grouping manner, and may implicitly indicate that the first terminal device supports a first grouping manner and a second grouping manner. Optionally, the grouping capability information of the first terminal device indicates that the first terminal device supports no grouping manner, and indicates that the first terminal device supports neither a first grouping manner nor a second grouping manner.

Optionally, that the grouping capability information of the first terminal device indicates a grouping manner supported by the first terminal device is specifically as follows: The grouping capability information of the first terminal device indicates that the grouping manner supported by the first terminal device is the first grouping manner; or the grouping capability information of the first terminal device indicates that the grouping manner supported by the first terminal device is the second grouping manner; or the grouping capability information of the first terminal device indicates that the grouping manner supported by the first terminal device is the first grouping manner and the second grouping manner.

Optionally, the first grouping manner is a manner in which the core network device groups a plurality of terminal devices. After grouping the plurality of terminal devices, the core network device may notify each terminal device of a group number of each terminal device. Optionally, the first grouping manner may be referred to as a grouping manner controlled by the core network device. Optionally, the first grouping manner is a manner of performing grouping based on feature information of the plurality of terminal devices. Optionally, each terminal device sends feature information of each terminal device to the core network device. Optionally, each terminal device may send the feature information of each terminal device to the core network device by using a non-access stratum (non-access stratum, NAS) message. The NAS message carrying the feature information may be a registration request (Registration Request) message or a service request (Service Request) message. The core network device groups the terminal devices according to a rule based on the feature information of each terminal device. For example, the feature information of each terminal device may be a paging probability of each terminal device. Terminal devices with similar paging probabilities may be put into one group. A smaller paging probability indicates a smaller group number of a terminal device, and a larger paging probability indicates a larger group number of a terminal device. For example, the feature information of each terminal device may be a power consumption sensitivity of each terminal device, and terminal devices with similar sensitivities may be put into one group. A higher power consumption sensitivity indicates a smaller group number of a terminal device, and a lower power consumption sensitivity indicates a larger group number of a terminal device. For example, the feature information of each terminal device may include at least two of an RRC status of each terminal device, a paging probability of each terminal device, or a power consumption sensitivity of each terminal device. The core network device may group the terminal devices with reference to the at least two of the RRC status of each terminal device, the paging probability of each terminal device, or the power consumption sensitivity of each terminal device. In other words, when grouping the terminal devices, the core network device uses a specific rule. For example, the rule is that group numbers of terminal devices having similar feature information belong to one group. In this way, a group of terminal devices may wake up or be in a sleep state simultaneously based on the group number. This helps reduce power consumption.

Optionally, the second grouping manner is a manner in which an access network device (which may be any access network device, for example, may be the first access network device or the second access network device) groups a plurality of terminal devices. Optionally, the second grouping manner may also be referred to as a grouping manner controlled by the access network device. Optionally, the second grouping manner may also be referred to as a manner of grouping based on identifiers of the terminal devices. The access network device may obtain a group number of each terminal device after calculating an identifier of each terminal device, and put terminal devices with a same group number into one group. Correspondingly, each terminal device may obtain the group number of each terminal device through calculation in a same calculation manner as that of the access network device based on the identifier of each terminal device.

It may be understood that the first grouping manner is better than the second grouping manner. When grouping the plurality of terminal devices in the first grouping manner, the core network device considers the feature information of each terminal device. In this way, in a paging process, terminal devices with similar features or a same feature may wake up or be in the sleep state simultaneously. This helps globally control the terminal devices, and reduce a probability that the terminal device can be woken up incorrectly. However, when grouping the plurality of terminal devices in the second grouping manner, the access network device obtains, through calculation, the group number of each terminal device based on the identifier of each terminal device, which is randomized grouping. Terminal devices randomly put into a group may be continuously woken up because of a high-probability terminal device. This increases power consumption of the terminal device.

S302: The first access network device determines, based on a grouping manner supported by the first access network device for use and the grouping capability information of the first terminal device, the first target manner for paging the first terminal device.

Before S302, the first access network device determines, based on whether the core network device supports the first grouping manner for use and a grouping manner supported by the first access network device, the grouping manner supported by the first access network device for use. It should be noted that the grouping manner supported by the first access network device for use may be a grouping manner supported by one or more cells of the first access network device for use.

Optionally, the first access network device may receive first indication information sent by the core network device. The first indication information indicates whether the core network device supports the first grouping manner for use. The first access network device determines, based on whether the core network device supports the first grouping manner for use indicated by the first indication information and the grouping manner supported by the first access network device, the grouping manner supported by the first access network device for use. In other words, when determining the grouping manner supported by the first access network device for use, the first access network device may refer to whether the core network device supports the first grouping manner.

The following provides descriptions based on different cases in which the first access network device determines, based on the first indication information and the grouping manner supported by the first access network device, the grouping manner supported by the first access network device for use.

Case 1: If the first indication information indicates that the core network device supports the first grouping manner for use, and the grouping manner supported by the first access network device includes the first grouping manner, it is determined that the grouping manner supported by the first access network device for use is the first grouping manner.

In Case 1, if the first indication information indicates that the core network device supports the first grouping manner for use, and the grouping manner supported by the first access network device is the first grouping manner or the first grouping manner and the second grouping manner, it is determined that the grouping manner supported by the first access network device for use is the first grouping manner. In other words, if the first access network device supports both the first grouping manner and the second grouping manner, when the core network device supports the first grouping manner, the first grouping manner is preferably supported for use.

Case 2: If the first indication information indicates that the core network device supports the first grouping manner for use, and the grouping manner supported by the first access network device includes the second grouping manner but do not include the first grouping manner, it is determined that the grouping manner supported by the first access network device for use is the second grouping manner.

Case 3: If the first indication information indicates that the core network device does not support the first grouping manner for use, and the grouping manner supported by the first access network device includes the second grouping manner, it is determined that the grouping manner supported by the first access network device for use is the second grouping manner.

In Case 3, if the first indication information indicates that the core network device does not support the first grouping manner for use, and the grouping manner supported by the first access network device is the second grouping manner or the first grouping manner and the second grouping manner, it is determined that the grouping manner supported by the first access network device for use is the second grouping manner. In other words, if the first access network device supports both the first grouping manner and the second grouping manner, but because the core network device does not support the first grouping manner, the first access network device can support only the second grouping manner for use.

Case 4: If the first indication information indicates that the core network device supports the first grouping manner for use, and the grouping manner supported by the first access network device includes the first grouping manner and the second grouping manner, it is determined that the grouping manner supported by the first access network device for use is the first grouping manner and the second grouping manner.

Case 5: If the first access network device supports neither the first grouping manner nor the second grouping manner, it is determined that the first access network device supports no grouping manner for use.

In other words, in Case 5, if the first access network device supports neither the first grouping manner nor the second grouping manner, even if the core network device supports the first grouping manner, the first access network device cannot parse content related to the first grouping manner. Therefore, in this case, the first access network device can determine that no grouping manner is supported for use, without considering whether the core network device supports the first grouping manner.

Optionally, the core network device may not send the first indication information to the first access network device, to indicate whether the core network device supports the first grouping manner for use. Whether the core network device supports the first grouping manner for use may be stipulated in a protocol. Alternatively, if the first access network device can receive a group number that is obtained through grouping in the first grouping manner and that is sent by the core network device, it implicitly indicates that the core network device supports the first grouping manner for use. If the first access network device cannot receive a group number that is obtained through grouping in the first grouping manner and that is sent by the core network device, it implicitly indicates that the core network device does not support the first grouping manner for use. How the first access network device learns whether the core network device supports the first grouping manner is not limited in embodiments of this application.

In other words, it is determined, based on any one of the foregoing five cases, that the first access network device may support the first grouping manner for use, or support the second grouping manner for use, or support the first grouping manner and the second grouping manner for use, or support no grouping manner for use.

Optionally, after determining the grouping manner supported for use, the first access network device may broadcast the grouping manner supported for use. Optionally, the first access network device may further broadcast related configuration information of the grouping manner supported for use. For example, after the first access network device determines the first grouping manner supported for use, the first access network device may broadcast, by using a system message, the configuration information related to the first grouping manner and that the first access network device supports the first grouping manner for use. For example, the configuration information related to the first grouping manner may be a time-frequency resource location of a PEI. Optionally, the configuration information related to the first grouping manner may alternatively not include a time-frequency resource location of a PEI, and the time-frequency resource location of the PEI may be stipulated in a protocol. It should be noted that, after determining the grouping manner supported by the one or more cells of the first access network device for use, the first access network device may broadcast the grouping manner supported by the one or more cells for use, and optionally, may further broadcast related configuration information of the grouping manner supported by the one or more cells for use.

After determining the grouping manner supported by the first access network device for use, the first access network device may perform S302. The following describes S302 based on different cases.

Case A1: If the grouping manner supported by the first access network device for use includes the first grouping manner, and the grouping capability information of the first terminal device indicates that the first terminal device supports the first grouping manner, the first access network device determines that the first target manner for paging the first terminal device is the first grouping manner. Optionally, that the grouping manner supported by the first access network device for use includes the first grouping manner may be understood as that the grouping manner supported by the first access network device is the first grouping manner or the first grouping manner and the second grouping manner.

Optionally, Case A1 may alternatively be replaced with the following: If the grouping manner supported by the first access network device for use is the first grouping manner, and the grouping capability information of the first terminal device indicates that the first terminal device supports the first grouping manner and the second grouping manner, the first access network device determines that the first target manner for paging the first terminal device is the first grouping manner.

For example, the first access network device determines, based on Case 1, that the grouping manner supported by the first access network device for use is the first grouping manner. For another example, the first access network device determines, based on Case 4, that the grouping manner supported by the first access network device for use is the first grouping manner and the second grouping manner. In other words, the grouping manner supported by the first access network device for use includes the first grouping manner.

Case B1: If the grouping manner supported by the first access network device for use includes the second grouping manner, and the grouping capability information of the first terminal device indicates that the first terminal device supports the second grouping manner, it is determined that the first target manner for paging the first terminal device is the second grouping manner.

Optionally, that the grouping manner supported by the first access network device for use includes the second grouping manner may be understood as that the grouping manner supported by the first access network device is the second grouping manner or the first grouping manner and the second grouping manner.

Optionally, Case B1 may alternatively be replaced with the following: If the grouping manner supported by the first access network device for use is the second grouping manner, and the grouping capability information of the first terminal device indicates that the first terminal device supports the first grouping manner and the second grouping manner, it is determined that the first target manner for paging the first terminal device is the second grouping manner.

For example, the first access network device determines, based on Case 2 or Case 3, that the grouping manner supported by the first access network device for use is the second grouping manner. For another example, the first access network device determines, based on Case 4, that the grouping manner supported by the first access network device for use is the first grouping manner and the second grouping manner. In other words, the grouping manner supported by the first access network device for use includes the second grouping manner.

Case C1: If the grouping manner supported by the first access network device for use is the first grouping manner, and the grouping capability information of the first terminal device indicates that the first terminal device supports the second grouping manner but does not support the first grouping manner, it is determined that the first target manner for paging the first terminal device is a non-grouping manner. To be specific, no grouping paging mechanism is used, and a non-grouping paging mechanism is used.

For example, the first access network device determines, based on Case 1, that the grouping manner supported by the first access network device for use is the first grouping manner.

Case D1: If the grouping manner supported by the first access network device for use is the second grouping manner, and the grouping capability information of the first terminal device indicates that the first terminal device supports the first grouping manner but does not support the second grouping manner, it is determined that the first target manner for paging the first terminal device is a non-grouping manner.

For example, the first access network device determines, based on Case 2 or Case 3, that the grouping manner supported by the first access network device for use is the second grouping manner.

Case E1: If the grouping manner supported by the first access network device for use is the first grouping manner and the second grouping manner, and the grouping capability information of the first terminal device indicates that the first terminal device supports the first grouping manner and the second grouping manner, the first access network device determines the first target manner based on a priority of the first grouping manner and a priority of the second grouping manner.

For example, the first access network device determines, based on Case 4, that the grouping manner supported by the first access network device for use is the first grouping manner and the second grouping manner.

Optionally, that the first access network device determines the first target manner based on a priority of the first grouping manner and a priority of the second grouping manner includes:

if the priority of the first grouping manner is higher than the priority of the second grouping manner, the first grouping manner is determined as the first target manner. Optionally, that the priority of the first grouping manner is higher than the priority of the second grouping manner may be stipulated in a protocol. Optionally, the first access network device may determine that the priority of the first grouping manner is higher than the priority of the second grouping manner. Optionally, the first access network device may broadcast that the priority of the first grouping manner is higher than the priority of the second grouping manner. Certainly, the priority of the second grouping manner may alternatively be higher than the priority of the first grouping manner. In this case, the first access network device determines the second grouping manner as the first target manner.

Case F1: If the first access network device supports no grouping manner for use, that is, supports neither the first grouping manner nor the second grouping manner, the first access network device determines that the first target manner for paging the first terminal device is a non-grouping manner. In other words, in Case 5, if the first access network device determines that no grouping manner is supported for use, the first access network device determines that the first target manner for paging the first terminal device is the non-grouping manner, to be specific, the first terminal device is not paged by using a grouping paging mechanism.

Case G1: If the grouping capability information of the first terminal device indicates that the first terminal device supports no grouping manner, that is, the first terminal device supports neither the first grouping manner nor the second grouping manner, regardless of whether the first access network device supports the first grouping manner and/or the second grouping manner, the first access network device determines that the first target manner for paging the first terminal device is a non-grouping manner. To be specific, the first terminal device is not paged by using a grouping paging mechanism.

S303: The first terminal device obtains the grouping manner supported by the first access network device for use.

Specifically, after determining, in any manner in Case 1 to Case 5, the grouping manner supported by the first access network device for use, the first access network device may broadcast the grouping manner supported by the first access network device for use. For example, the grouping manner supported by the first access network device for use is broadcast by using a system message. After camping on the first access network device, the first terminal device may receive the system message broadcast by the first access network device, to obtain, from the system message, the grouping manner supported by the first access network device for use. For example, the first access network device may broadcast, by using the system message, that the first access network device supports the first grouping manner for use, or the first access network device supports the second grouping manner for use, or the first access network device supports the first grouping manner and the second grouping manner for use. Alternatively, the first access network device indicates, in the system message, that the first access network device supports no grouping manner. For example, the first access network device may implicitly indicate, by not carrying, in the system message, information related to the grouping manner supported by the first access network device for use, that the first access network device supports no grouping manner.

Optionally, the first access network device broadcasts whether the first access network device supports a grouping manner for use. The first terminal device obtains whether the first access network device supports a grouping manner for use. It may be understood that, if a grouping manner is supported for use, it indicates that both the first grouping manner and the second grouping manner are supported; or if no grouping manner is supported for use, it indicates that both the first grouping manner and the second grouping manner are not supported.

S304: The first terminal device determines, based on the grouping manner supported by the first access network device for use and the grouping manner supported by the first terminal device, a first target manner to be used by the first terminal device to receive paging of the first access network device.

After obtaining the grouping manner supported by the first access network device for use, the first terminal device may perform S304. The following describes S304 based on different cases.

Case A2: If the grouping manner supported by the first access network device for use includes the first grouping manner, and the first terminal device supports the first grouping manner, the first terminal device determines that the first target manner to be used by the first terminal device to receive paging of the first access network device is the first grouping manner.

Optionally, that the grouping manner supported by the first access network device for use includes the first grouping manner may be understood as that the grouping manner supported by the first access network device is the first grouping manner or the first grouping manner and the second grouping manner.

Optionally, Case A2 may alternatively be replaced with the following: If the grouping manner supported by the first access network device for use is the first grouping manner, and the first terminal device supports the first grouping manner and the second grouping manner, the first terminal device determines that the first target manner to be used by the first terminal device to receive paging of the first access network device is the first grouping manner.

Case A2 corresponds to Case A1. In other words, the first access network device and the first terminal device determine, by using a same policy, that both the first target manners are the first grouping manner. In this way, the first target manner in which the first access network device pages the first terminal device is the same as the first target manner in which the first terminal device determines to receive paging of the first terminal device.

Case B2: If the grouping manner supported by the first access network device for use includes the second grouping manner, and the first terminal device supports the second grouping manner, the first terminal device determines that the first target manner to be used by the first terminal device to receive paging of the first access network device is the second grouping manner.

Optionally, that the grouping manner supported by the first access network device for use includes the second grouping manner may be understood as that the grouping manner supported by the first access network device is the second grouping manner or the first grouping manner and the second grouping manner.

Optionally, Case B2 may alternatively be replaced with the following: If the grouping manner supported by the first access network device for use is the second grouping manner, and the first terminal device supports the first grouping manner and the second grouping manner, the first terminal device determines that the first target manner to be used by the first terminal device to receive paging of the first access network device is the second grouping manner.

Case B2 corresponds to Case B1. In other words, the first access network device and the first terminal device determine, by using a same policy, that both the first target manners are the second grouping manner. In this way, the first target manner in which the first access network device pages the first terminal device is the same as the first target manner in which the first terminal device determines to receive paging of the first terminal device.

Case C2: If the grouping manner supported by the first access network device for use is the first grouping manner, and the first terminal device supports the second grouping manner but does not support the first grouping manner, the first terminal device determines that the first target manner to be used by the first terminal device to receive paging of the first access network device is the non-grouping manner.

Case C2 corresponds to Case C1. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

Case D2: If the grouping manner supported by the first access network device for use is the second grouping manner, and the first terminal device supports the first grouping manner but does not support the second grouping manner, the first terminal device determines that the first target manner to be used by the first terminal device to receive paging of the first access network device is the non-grouping manner.

Case D2 corresponds to Case D1. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

Case E2: If the grouping manner supported by the first access network device for use is the first grouping manner and the second grouping manner, and the first terminal device supports the first grouping manner and the second grouping manner, the first terminal device determines, based on the priority of the first grouping manner and the priority of the second grouping manner, the first target manner for receiving paging of the first access network device.

Optionally, that the first terminal device determines, based on the priority of the first grouping manner and the priority of the second grouping manner, the first target manner for receiving paging of the first access network device includes: if the priority of the first grouping manner is higher than the priority of the second grouping manner, determining the first grouping manner as the first target manner. Optionally, that the priority of the first grouping manner is higher than the priority of the second grouping manner may be stipulated in the protocol. Optionally, the first access network device may broadcast that the priority of the first grouping manner is higher than the priority of the second grouping manner. Certainly, the priority of the second grouping manner may alternatively be higher than the priority of the first grouping manner. In this case, the first terminal device determines the second grouping manner as the first target manner.

Case E2 corresponds to Case E1. In other words, the first access network device and the first terminal device determine, by using a same policy, that both the first target manners are the first grouping manner. In this way, the first target manner in which the first access network device pages the first terminal device is the same as the first target manner in which the first terminal device determines to receive paging of the first terminal device.

Case F2: If the first access network device supports no grouping manner for use, that is, supports neither the first grouping manner nor the second grouping manner, the first terminal device determines that the first target manner to be used by the first terminal device to receive paging of the first access network device is the non-grouping manner.

Case F2 corresponds to Case F1. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

Case G2: If the first terminal device supports no grouping manner, that is, the first terminal device supports neither the first grouping manner nor the second grouping manner, the first terminal device determines that the first target manner to be used by the first terminal device to receive paging of the first access network device is the non-grouping manner.

Case G2 corresponds to Case G1. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

S305: The first access network device pages the first terminal device in the first target manner determined in S302, and the first terminal device receives a paging message of the first access network device in the first target manner determined in S304.

Optionally, if the first target manner determined by the first access network device in S302 is the first grouping manner, the first target manner determined by the first terminal device in S304 is the first grouping manner. In a first grouping paging mechanism, S305 includes: The first access network device sends a WUS at a time-frequency resource location of an offset that is before a PO. The WUS carries a first group number allocated by the core network device to the first terminal device. The first terminal device determines that the first group number carried in the WUS is a group number allocated by the core network device to the first terminal device. Therefore, the first terminal device needs to wake up on the PO of the first terminal device to receive DCI, and receive, at a time-frequency resource location indicated by the DCI, the paging message sent by the first access network device. If the paging message carries an identifier of the first terminal device, the first terminal device initiates a radio resource control (radio resource control, RRC) establishment request. If the PO of the first terminal device is the same as that of a second terminal device, the core network device allocates the first group number to both the first terminal device and the second terminal device. When the second terminal device receives the WUS, the first group number carried in the WUS is a group number allocated by the core network device to the second terminal device. Therefore, the second terminal device needs to wake up on the PO of the second terminal device to receive the DCI, and receive, at the time-frequency resource location indicated by the DCI, the paging message sent by the first access network device. If the paging message does not carry an identifier of the second terminal device, the second terminal device continues to be in the sleep state. A terminal device with another group number may also receive the WUS, and determine, based on the first group number carried in the WUS, that the terminal device in the another group does not need to wake up on a PO to receive the DCI. In other words, after receiving the WUS, the terminal device in the another group number continues to be in the sleep state. This can reduce overheads.

If the first target manner determined by the first access network device in S302 is the first grouping manner, the first target manner determined by the first terminal device in S304 is the first grouping manner. In a second grouping paging mechanism, S305 includes: The first access network device sends DCI on a PO of the first terminal device. The DCI carries a first group number allocated by the core network device to the first terminal device. The first terminal device determines that the first group number in the DCI is a group number allocated by the core network device to the first terminal device. Therefore, the first terminal device receives, at a time-frequency resource location indicated by the DCI, a paging message sent by the first access network device. If the paging message carries an identifier of the first terminal device, the first terminal device initiates an RRC establishment request. If the PO of the first terminal device is the same as that of a second terminal device, the core network device allocates the first group number to both the first terminal device and a second terminal device. When the second terminal device receives the DCI on the PO, the first group number carried in the DCI is a group number allocated by the core network device to the second terminal device. Therefore, the second terminal device needs to receive, at the time-frequency resource location indicated by the DCI, the paging message sent by the first access network device. If the paging message does not carry an identifier of the second terminal device, the second terminal device continues to be in the sleep state. A terminal device with another group number may wake up on a PO to receive the DCI. The terminal device with the another group number determines, based on the first group number carried in the DCI, that the group number is not a group number of the terminal device. Therefore, the terminal device does not receive the paging message at the time-frequency resource location indicated by the DCI, continues to be in the sleep state, and waits for arrival of a next PO.

Optionally, if the first target manner determined by the first access network device in S302 is the second grouping manner, the first target manner determined by the first terminal device in S304 is the second grouping manner. In a first grouping paging mechanism, S305 includes: The first access network device sends a WUS at a time-frequency resource location of an offset that is before a PO. The WUS carries a second group number obtained by the first access network device through calculation based on an identifier of the first terminal device. The first terminal device obtains the second group number of the first terminal device through calculation based on the identifier of the first terminal device. A calculation rule of the first access network device is consistent with a calculation rule of the first terminal device. The first terminal device determines, based on the second group number carried in the WUS, that the first terminal device needs to wake up on the PO of the first terminal device to receive DCI, and receive, at a time-frequency resource location indicated by the DCI, the paging message sent by the first access network device. If the paging message carries an identifier of the first terminal device, the first terminal device initiates an RRC establishment request. If a group number obtained by the first access network device through calculation based on the identifier of the first terminal device and a group number obtained through calculation based on an identifier of a second terminal device are the same, and are both the second group number, the group number obtained by the second terminal device through calculation based on the identifier of the second terminal device is also the second group number. When the second terminal device receives the WUS, and the WUS carries the second group number, the second terminal device needs to wake up on a PO of the second terminal device to receive DCI, and receive, at a time-frequency resource location indicated by the DCI, the paging message sent by the first access network device. If the paging message does not carry the identifier of the second terminal device, the second terminal device continues to be in the sleep state. A terminal device with another group number may also receive the WUS, and determine, based on the second group number carried in the WUS, that the terminal device in the another group does not need to wake up on a PO to receive the DCI. In other words, after receiving the WUS, the terminal device in the another group number continues to be in the sleep state. This can reduce overheads.

Optionally, if the first target manner determined by the first access network device in S302 is the second grouping manner, the first target manner determined by the first terminal device in S304 is the second grouping manner. In a second grouping paging mechanism, S305 includes: The first access network device sends DCI on a PO of the first terminal device. The DCI carries a second group number obtained by the first access network device through calculation based on an identifier of the first terminal device. The first terminal device obtains the second group number of the first terminal device through calculation based on the identifier of the first terminal device. A calculation rule of the first access network device is consistent with a calculation rule of the first terminal device. The first terminal device determines, based on the second group number carried in the DCI, that the first terminal device needs to receive, at a time-frequency resource location indicated by the DCI, the paging message sent by the first access network device. If the paging message carries the identifier of the first terminal device, the first terminal device initiates an RRC establishment request. If a group number obtained by the first access network device through calculation based on the identifier of the first terminal device and a group number obtained through calculation based on an identifier of a second terminal device are the same, and are both the second group number, the group number obtained by the second terminal device through calculation based on the identifier of the second terminal device is also the second group number. When the second terminal device receives the DCI, the second terminal device determines, based on the second group number carried in the DCI, that the second terminal device needs to receive, at the time-frequency resource location indicated by the DCI, the paging message sent by the first access network device. If the paging message does not carry the identifier of the second terminal device, the second terminal device continues to be in the sleep state. A terminal device with another group number may wake up on a PO to receive the DCI. The terminal device with the another group number determines, based on the second group number carried in the DCI, that the group number is not a group number of the terminal device. Therefore, the terminal device does not receive the paging message at the time-frequency resource location indicated by the DCI, continues to be in the sleep state, and waits for arrival of a next PO.

It should be noted that, in the method 300, there is no limitation on a sequence of S301 or S302 and S303 or S304. S301 or S302 may be performed at the same time as S303 or S304, or S301 or S302 may be performed before or after S303 or S304.

Therefore, in the method 300, the first access network device can determine, based on the grouping manner supported by the first access network device for use and the grouping manner supported by the first terminal device, the first target manner for paging the first terminal device. The first terminal device can determine, based on the grouping manner supported by the first access network device for use and the grouping manner supported by the first terminal device, the first target manner for receiving paging of the first access network device. A rule for determining the first target manner by the first access network device is the same as a rule for determining the first target manner by the first terminal device. Therefore, the first target manner determined by the first access network device is the same as the first target manner determined by the first terminal device. In other words, a manner in which the first access network device pages the first terminal device is the same as a manner in which the first terminal device receives paging. This can improve a paging success rate, and also reduce power consumption.

If the first access network device determines a grouping manner supported for use, the first access network device may broadcast that the first access network device determines the grouping manner supported for use. If a terminal device within a coverage area of the first access network device needs to receive paging in a grouping manner, the terminal device can use only the grouping manner that is supported by the first access network device for use and that is broadcast by the first access network device. For example, the first access network device determines the first grouping manner supported for use, the first access network device may broadcast that the first access network device supports the first grouping manner for use, and if the first terminal device supports the first grouping manner, the first terminal device receives paging in the first grouping manner. For another example, the first access network device determines the second grouping manner supported for use, the first access network device may broadcast that the first access network device supports the second grouping manner for use, and if the first terminal device supports the second grouping manner, the first terminal device receives paging in the first grouping manner. If the first access network device supports the first grouping manner and the second grouping manner for use, the first access network device broadcasts that the first access network device supports the first grouping manner and the second grouping manner for use. In a plurality of terminal devices within the coverage area of the first access network device, a terminal device supports the first grouping manner, and a terminal device supports the second grouping manner. Consequently, within the coverage area of the first access network device, a target manner determined by a terminal device is the first grouping manner, and a target manner determined by a terminal device is the second grouping manner. If a terminal device supports both the first grouping manner and the second grouping manner, the terminal device may determine, based on the priority of the first grouping manner and the priority of the second grouping manner, that a target manner is the first grouping manner. A group number of the terminal device whose target manner is the first grouping manner and that is determined within the coverage area of the first access network device is allocated by the core network device based on feature information of the terminal device. A group number of the terminal device whose target manner is the second grouping manner and that is determined within the coverage area of the first access network device is obtained by the terminal device through calculation based on an identifier of the terminal device. Consequently, the group number of the terminal device whose target manner is the second grouping manner may be the same as the group number of the terminal device whose target manner is the first grouping manner. In other words, a group of terminal devices may include a terminal device grouped in the first grouping manner and may also include a terminal device grouped in the second grouping manner. As a result, paging efficiency is reduced or power consumption of the terminal device may be affected. For example, the first terminal device and the first access network device determine that a target manner corresponding to the first terminal device is the first grouping manner, and the second terminal device and the first access network device determine that a target manner corresponding to the second terminal device is the second grouping manner. A paging probability of the first terminal device is lower, for example, is 1%. A group number allocated by the core network device to the first terminal device based on the paging probability of the first terminal device is 1. The first access network device obtains, through calculation based on the identifier of the second terminal device, that a group number of the second terminal device is also 1. In other words, the first terminal device and the second terminal device are in a group, and both group numbers are 1. However, the second terminal device may be a terminal device with a higher paging probability. For example, a paging probability of the second terminal device is 50%. Therefore, the first access network device frequently pages the second terminal device, and frequently sends the WUS or the DCI to attempt to page the second terminal device. In this case, all terminal devices whose group numbers are 1 need to wake up to receive the paging message at the time-frequency resource location indicated by the DCI. However, the first terminal device is a terminal device with a low paging probability and needs to wake up frequently to receive the paging message due to the second terminal device. Consequently, power consumption of the first terminal device is high. An original intention of a grouping mechanism is to reduce power consumption of a terminal device. In this case, power consumption of some terminal devices is increased due to the grouping mechanism. Therefore, in this case, if the first access network device broadcasts that the first grouping manner and the second grouping manner are supported for use, the first access network device further needs to indicate whether a target manner of a terminal device in a paged target group is the first target manner or a second target manner. For example, the first access network device indicates a terminal device whose target manner is the first target manner in the paged target group to receive the paging message. In this way, in the target group, the terminal device whose target manner is the first target manner receives the paging message, and a terminal device whose target manner is not the first target manner does not receive the paging message. If the first access network device needs to page the first terminal device, a group to which the first terminal device belongs is the target group. For example, with reference to the foregoing example, when needing to page the second terminal device, the first access network device indicates, in the DCI or the WUS, a terminal device whose target manner is the second grouping manner to receive the paging message. In this way, because the first target manner of the first terminal device whose group number is 1 is the first grouping manner rather than the second grouping manner, the first terminal device does not receive the paging message. This reduces power consumption of the first terminal device. Alternatively, similarly, the first access network device indicates a terminal device whose target manner is the second target manner in the paged target group to receive the paging message. In this way, in the target group, the terminal device whose target manner is the second target manner receives the paging message, and a terminal device whose target manner is not the second target manner does not receive the paging message. If the first access network device needs to page the first terminal device, a group to which the first terminal device belongs is the target group.

Optionally, after determining that the first terminal device needs to be paged, the first access network device may indicate, to a terminal device in the target group by using the WUS in the first grouping paging mechanism, that the terminal device whose target manner is the first target manner in the target group is to receive the paging message. The first target manner is the target manner of the first terminal device.

In the first grouping paging mechanism, the first access network device indicates, to the terminal device in the target group by using the WUS, that a terminal device whose target manner is the first target manner and/or a second target manner in the target group is to receive the paging message. The target group is a group to which the first terminal device belongs. In the target group, a target manner of a terminal device is the first target manner, and a target manner of a terminal device is not the first target manner. If the first target manner is the first grouping manner, the first access network device indicates, to the terminal device in the target group by using the WUS, that the terminal device whose target manner is the first grouping manner in the target group is to receive the paging message. If there is still the terminal device whose target manner is the second grouping manner in the target group, the terminal device does not receive the paging message. For example, for the first grouping paging mechanism, after receiving the WUS, the terminal device determines, based on the indication of the WUS, not to receive the DCI, and certainly do not receive the paging message at the time-frequency resource location indicated by the DCI. Only the terminal device whose target manner is the first grouping manner receives the DCI, and receives the paging message at the time-frequency resource location indicated by the DCI. Alternatively, similarly, if the first target manner is the second grouping manner, the first access network device indicates, to the terminal device in the target group by using the WUS, that the terminal device whose target manner is the second grouping manner in the target group is to receive the paging message. If there is still the terminal device whose target manner is the first grouping manner in the target group, the terminal device does not receive the paging message. Alternatively, if the first target manner is the first grouping manner and the second grouping manner, the first access network device indicates, to the terminal device in the target group by using the WUS, that the terminal device whose target manner is the first grouping manner and the second grouping manner in the target group is to receive the paging message.

In the first grouping paging mechanism, any one of the following manners may be used to indicate, to the terminal device in the target group, that the terminal device whose target manner is the first target manner in the target group is to receive the paging message.

Manner 1: The WUS includes second indication information, and the second indication information indicates a target manner in the target group. For example, the second indication information indicates that the terminal device whose target manner is the first target manner in the target group is to receive the paging message. For example, the second indication information occupies one bit. If a value of the bit is 1 or a first value, it indicates that the terminal device whose target manner is the first grouping manner in the target group is to receive the DCI, and the terminal device whose target manner is the second grouping manner in the target group is not to receive the DCI. Alternatively, if a value of the bit is 0 or a second value, it indicates that the terminal device whose target manner is the second grouping manner in the target group is to receive the DCI, and the terminal device whose target manner is the first grouping manner in the target group is not to receive the DCI.

In other words, if the first access network device pages the first terminal device by using the first grouping paging mechanism, in S305, the WUS may be sent. The WUS includes a target group number of the first terminal device (for example, if the first target manner is the first grouping manner, the target group number is the first group number, or if the first target manner is the second grouping manner, the target group number is the second group number, and the first group number is the same as the second group number in this embodiment) and the second indication information. If the first target manner is the first grouping manner, the second indication information indicates, to the terminal device in the target group, that the terminal device whose target manner is the first grouping manner is to receive the paging message. A terminal device that receives the WUS determines, based on the second indication information, that the terminal device whose target manner is the second grouping manner is not to receive the paging message, and the terminal device whose target manner is the first grouping manner is to receive the paging message. This can avoid power consumption caused when both the terminal device whose target manner is the first grouping manner and the terminal device whose target manner is the second grouping manner receive the paging message. If the first target manner is the second grouping manner, the second indication information indicates, to the terminal device in the target group, that the terminal device whose target manner is the second grouping manner is to receive the paging message. A terminal device that receives the WUS determines, based on the second indication information, that the terminal device whose target manner is the first grouping manner is not to receive the paging message, and the terminal device whose target manner is the second grouping manner is to receive the paging message. This can avoid power consumption caused when both the terminal device whose target manner is the first grouping manner and the terminal device whose target manner is the second grouping manner receive the paging message. In other words, if there is an intersection between a group number range corresponding to the first grouping manner and a group number range corresponding to the second grouping manner, a group number of the terminal device whose target manner is the first grouping manner is the same as a group number of a terminal device whose target manner is the second grouping manner, and the second indication information can distinguish between terminal devices that have a same group number and have different target manners.

It should be noted that the second indication information is only a one-bit indication, that is, can indicate only that the target manner is the first target manner or the second target manner. If a grouping manner corresponding to a currently paged terminal device includes the first grouping manner and the second grouping manner, the first access network device needs to send two WUSs. Second indication information included in one WUS indicates that the target manner in the target group is the first target manner, and second indication information included in the other WUS indicates that the target manner in the target group is the second target manner.

Manner 2: The WUS includes a first field and a second field, the first field is a field corresponding to a target manner that is the first grouping manner, and the second field is a field corresponding to a target manner that is the second grouping manner. If the first access network device needs to page the first terminal device, and the first target manner for paging the first terminal device is the first grouping manner, the first access network device includes, in the first field, the target group number used to page the first terminal device. If the first access network device needs to page the first terminal device, and the first target manner for paging the first terminal device is the second grouping manner, the first access network device includes, in the second field, the target group number used to page the first terminal device. Therefore, when needing to page the first terminal device, the first access network device first determines the first target manner, and selects a target field from the first field and the second field based on the first target manner.

If the first access network device determines that the first target manner for paging the first terminal device is the first grouping manner, the first access network device may include the first group number in the first field of the WUS. In other words, in this case, the target group number is the first group number, and the first group number is the group number allocated by the core network device to the first terminal device. When the first terminal device parses the first field to obtain the first group number, the first terminal device determines that the first target manner for receiving paging of the first access network device is the first grouping manner. Therefore, the first terminal device may determine, based on the first group number obtained by parsing the first field, that the first terminal device receives the DCI on the PO, and receives, on the time-frequency resource indicated by the DCI, the paging message sent by the first access network device. Both the group number of the first terminal device and the group number of the second terminal device are the first group number. The first group number of the second terminal device is obtained by the second terminal device through calculation based on the identifier of the second terminal device. When the second terminal device parses the first field to obtain the first group number, the second terminal device determines that the target manner for receiving paging of the first access network device is the second grouping manner. The second grouping manner corresponds to the second field and does not correspond to the first field. Therefore, the second terminal device determines not to receive the DCI on the PO, and does not receive, on the time-frequency resource indicated by the DCI, the paging message sent by the first access network device. Alternatively, the second terminal device may parse only the second field corresponding to the target manner that is the second grouping manner, and does not parse the first field corresponding to the target manner that is the first grouping manner. When the second terminal device does not obtain the first group number from the second field through parsing, the second terminal device determines not to receive the DCI on the PO, and does not receive, on the time-frequency resource indicated by the DCI, the paging message sent by the first access network device.

If the first access network device determines that the first target manner for paging the first terminal device is the second grouping manner, the first access network device may include the second group number in the second field of the WUS. In other words, in this case, the target group number is the second group number, and the second group number is the group number obtained by the first access network device and the first terminal device through calculation based on the identifier of the first terminal device. When the first terminal device parses the second field to obtain the second group number, the first terminal device determines that the first target manner for receiving paging of the first access network device is the second grouping manner. Therefore, the first terminal device may determine, based on the second group number obtained by parsing the second field, that the first access network device receives the DCI on the PO, and receives, on the time-frequency resource indicated by the DCI, the paging message sent by the first access network device. If both the group number of the first terminal device and the group number of the second terminal device are the second group number, the second group number of the second terminal device is allocated by the core network device to the second terminal device. When the second terminal device parses the second field to obtain the second group number, the second terminal device determines that the target manner for receiving paging of the first access network device is the first grouping manner. The first grouping manner corresponds to the first field and does not correspond to the second field. Therefore, the second terminal device determines not to receive the DCI on the PO, and does not receive, on the time-frequency resource indicated by the DCI, the paging message sent by the first access network device. Alternatively, the second terminal device may parse only the first field corresponding to the target manner that is the first grouping manner, and does not parse the second field corresponding to the target manner that is the second grouping manner. When the second terminal device does not obtain the second group number from the first field through parsing, the second terminal device determines not to receive the DCI on the PO, and does not receive, on the time-frequency resource indicated by the DCI, the paging message sent by the first access network device.

For example, the first field occupies the first eight predefined bits, the second field occupies the last eight predefined bits, and the two fields occupy 16 bits in total. Alternatively, the first field occupies the first four predefined bits, the second field occupies the last four predefined bits, and the two fields occupy eight bits in total. Optionally, the following manners are included.

(1) If a maximum quantity, supported in a protocol, of groups obtained in the first grouping manner and the second grouping manner is N, the first field occupies predefined N bits, the second field occupies predefined N bits, and the two fields occupy 2N bits in total.

(2) If a maximum quantity, supported in a protocol, of groups obtained in the first grouping manner and the second grouping manner is L, the first field occupies predefined M bits, the second field occupies predefined N bits, and the two fields occupy N bits in total. A value of L and a value of M may be predefined in the protocol (for example, L=M=N/2), or may be configured by a network. For example, the core network device interacts or negotiates with the access network device. In a possible manner, the core network device determines the value of L based on a value of N and sends the value of L to the access network device. The access network device determines, based on the value of N and the value of L, that the value of M is N−L. The access network device configures, for example, configure by using a broadcast message, one or more of N, M, and L for the terminal device. In another possible manner, the access network device determines the value of M based on a value of N and sends the value of M to the access network device. The core network device determines, based on the value of N and the value of M, that the value of L is N−M. The access network device configures, for example, configure by using broadcast information, one or more of N, M, and L for the terminal device.

Optionally, in a CU-DU network architecture, specifically, in a possible manner, the core network device determines the value of L based on the value of N and sends the value of L to a CU. The CU sends the value of L to a DU. The DU determines, based on the value of N and the value of L, that the value of M is N−L, and the DU configures, for example, configures by using the broadcast message, the one or more of N, M, and L for the terminal device. In another possible manner, a DU determines the value of M based on the value of N and sends the value of M to a CU. The CU sends the value of M to the core network device. The core network device determines, based on the value of N and the value of M, that the value of L is N−M. The DU configures, for example, configures by using the broadcast information, the one or more of N, M, and L for the terminal device.

(3) If a maximum quantity, supported by the cell, of groups obtained in the first grouping manner is N, and a maximum quantity, supported by the cell, of groups obtained in the second grouping manner is M, the first field occupies N predefined bits, the second field occupies M predefined bits, and the two fields occupy N+M bits in total.

(4) If a maximum quantity, supported by the cell, of groups obtained in the first grouping manner is N, a maximum quantity, supported by the cell, of groups obtained in the second grouping manner is M, and N is less than or equal to M, the first field occupies N predefined bits, the second field occupies M−N predefined bits, and the two fields occupy M bits in total.

(5) If a maximum quantity, supported by the cell, of groups obtained in the first grouping manner is N, a maximum quantity, supported by the cell, of groups obtained in the second grouping manner is M, and N is greater than M, the first field occupies L predefined bits (L is less than N and less than M), the second field occupies M−L predefined bits, and the two fields occupy M bits in total. A value of L may be predefined in a protocol (for example, L=M/2), or may be configured by a network. For example, the core network device interacts or negotiates with the access network device. In a possible manner, the core network device determines the value of L based on a value of M and sends the value of L to the access network device. The access network device determines M−L based on the value of M and the value of L. The access network device configures, for example, configures by using broadcast information, one or more of N, M, and L for the terminal device.

Optionally, in a CU-DU network architecture, specifically, in a possible manner, the core network device determines the value of L based on the value of M and sends the value of L to a CU. The CU sends the value of L to a DU. The DU determines M−L based on the value of M and the value of L, and the DU configures, for example, configures by using the broadcast information, the one or more of N, M, and L for the terminal device.

It should be noted that N, M, and L are integers greater than 0. The first field may be before or after the second field, and may be predefined in the protocol, or may be configured by the network. For example, the network device indicates a location of the first field and a location of the second field to the terminal device, that is, the first field may be before or after the second field. The network device may indicate the location by using broadcast information.

Optionally, it may be stipulated in the protocol that the first field included in the WUS corresponds to the first grouping manner, and the second field corresponds to the second grouping manner.

Manner 3: A first resource location at which the WUS is sent corresponds to the first grouping manner, and a second resource location at which the WUS is sent corresponds to the second grouping manner. The first access network device may implicitly indicate, by sending the WUS at the first resource location, the terminal device whose target manner is the first grouping manner to receive the paging message, and the terminal device whose target manner is the second grouping manner not to receive the paging message. The first access network device may implicitly indicate, by sending the WUS at the second resource location, the terminal device whose target manner is the second target manner to receive the paging message, and the terminal device whose target manner is the first grouping manner not to receive the paging message. Therefore, when needing to page the first terminal device, the first access network device first determines the first target manner, and selects a target resource from the first resource location and the second resource location based on the first target manner.

If the first access network device determines that the first target manner for paging the first terminal device is the first grouping manner, the first access network device may send the WUS at the first resource location. The WUS includes the first group number. In other words, in this case, the target group number is the first group number, and the first group number is the group number allocated by the core network device to the first terminal device. When the first terminal device receives the WUS at the first resource location, and parses the WUS to obtain the first group number, the first terminal device determines that the first target manner for receiving paging of the first access network device is the first grouping manner. Therefore, the first terminal device may determine, based on the fact that the WUS is received at the first resource location, that the first access network device receives the DCI on the PO, and receives, on the time-frequency resource indicated by the DCI, the paging message sent by the first access network device. Both the group number of the first terminal device and the group number of the second terminal device are the first group number. The first group number of the second terminal device is obtained by the second terminal device through calculation based on the identifier of the second terminal device. When the second terminal device receives the WUS at the first resource location, the second terminal device determines that the target manner for receiving paging of the first access network device is the second grouping manner. The second grouping manner corresponds to the second resource location and does not correspond to the first resource location. Therefore, the second terminal device determines not to receive the DCI on the PO, and does not receive, on the time-frequency resource indicated by the DCI, the paging message sent by the first access network device. Alternatively, the second terminal device may detect the WUS only at the second resource location, and does not detect the WUS at the first resource location. When the second terminal device does not receive the WUS at the second resource location or the received WUS does not include the first group number, the second terminal device determines not to receive the DCI on the PO, and does not receive, on the time-frequency resource indicated by the DCI, the paging message sent by the first access network device.

If the first access network device determines that the first target manner for paging the first terminal device is the second grouping manner, the first access network device may send the WUS at the second resource location. The WUS includes the second group number. In other words, in this case, the target group number is the second group number, and the second group number is the group number obtained by the first access network device and the first terminal device through calculation based on the identifier of the first terminal device. When the first terminal device receives the WUS at the second resource location, and parses the WUS to obtain the second group number, the first terminal device determines that the first target manner for receiving paging of the first access network device is the second grouping manner. Therefore, the first terminal device may determine, based on the fact that the WUS is received at the second resource location, that the first access network device receives the DCI on the PO, and receives, on the time-frequency resource indicated by the DCI, the paging message sent by the first access network device. Both the group number of the first terminal device and the group number of the second terminal device are the second group number. The second group number of the second terminal device is allocated by the core network device to the second terminal device. When the second terminal device receives the WUS at the second resource location, and parses the WUS to obtain the second group number, the second terminal device determines that the target manner for receiving paging of the first access network device is the first grouping manner. The first grouping manner corresponds to the first resource location and does not correspond to the second resource location. Therefore, the second terminal device determines not to receive the DCI on the PO, and does not receive, on the time-frequency resource indicated by the DCI, the paging message sent by the first access network device. Alternatively, the second terminal device may detect the WUS only at the first resource location, and does not detect the WUS at the second resource location. When the second terminal device does not receive the WUS at the first resource location or the received WUS does not include the second group number, the second terminal device determines not to receive the DCI on the PO, and does not receive, on the time-frequency resource indicated by the DCI, the paging message sent by the first access network device.

Optionally, it may be stipulated in the protocol that the first resource location included in the WUS corresponds to the first grouping manner, and the second resource location corresponds to the second grouping manner.

Manner 4: A first radio network temporary identifier (radio network temporary identity, RNTI) used to scrambling the WUS corresponds to the first grouping manner, and a second RNTI used to scrambling the WUS corresponds to the second grouping manner. The first access network device may implicitly indicate, by scrambling the WUS by using the first RNTI, the terminal device whose target manner is the first grouping manner to receive the paging message, and the terminal device whose target manner is the second grouping manner not to receive the paging message. The first access network device may implicitly indicate, by scrambling the WUS by using the second RNTI, the terminal device whose target manner is the second target manner to receive the paging message, and the terminal device whose target manner is the first grouping manner not to receive the paging message. Therefore, when needing to page the first terminal device, the first access network device first determines the first target manner, and selects, based on the first target manner, a target RNTI from the first RNTI and the second RNTI to scramble the WUS.

If the first access network device determines that the first target manner for paging the first terminal device is the first grouping manner, the first access network device may scramble the WUS by using the first RNTI. The WUS includes the first group number. In other words, in this case, the target group number is the first group number, and the first group number is the group number allocated by the core network device to the first terminal device. When the first terminal device receives a WUS scrambled by using the first RNTI, and parses the WUS to obtain the first group number, the first terminal device determines that the first target manner for receiving paging of the first access network device is the first grouping manner. Therefore, the first terminal device may determine, based on the WUS scrambled by using the first RNTI, that the first access network device receives the DCI on the PO, and receives, on the time-frequency resource indicated by the DCI, the paging message sent by the first access network device. Both the group number of the first terminal device and the group number of the second terminal device are the first group number. The first group number of the second terminal device is obtained by the second terminal device through calculation based on the identifier of the second terminal device. When the second terminal device receives the WUS scrambled by using the first RNTI, the second terminal device determines that the target manner for receiving paging of the first access network device is the second grouping manner. The second grouping manner corresponds to the second RNTI and does not correspond to the first RNTI. Therefore, the second terminal device determines not to receive the DCI on the PO, and does not receive, on the time-frequency resource indicated by the DCI, the paging message sent by the first access network device. Alternatively, the second terminal device may detect only a WUS scrambled by using the second RNTI, but does not detect a WUS scrambled by using the first RNTI. When the second terminal does not receive the WUS scrambled by using the second RNTI or the received WUS scrambled by using the second RNTI does not include the first group number, the second terminal device determines not to receive the DCI on the PO, or receive, on the time-frequency resource indicated by the DCI, the paging message sent by the first access network device.

If the first access network device determines that the first target manner for paging the first terminal device is the second grouping manner, the first access network device may scramble the WUS by using the second RNTI. The WUS includes the second group number. In other words, in this case, the target group number is the second group number, and the second group number is the group number obtained by the first access network device and the first terminal device through calculation based on the identifier of the first terminal device. When the first terminal device descrambles the WUS by using the second RNTI, and parses the WUS to obtain the second group number, the first terminal device determines that the first target manner for receiving paging of the first access network device is the second grouping manner. Therefore, the first terminal device may determine, based on the WUS descrambled by using the second RNTI, that the first access network device receives the DCI on the PO, and receives, on the time-frequency resource indicated by the DCI, the paging message sent by the first access network device. Both the group number of the first terminal device and the group number of the second terminal device are the second group number. The second group number of the second terminal device is allocated by the core network device to the second terminal device. When the second terminal device descrambles the WUS by using the second RNTI, and parses the WUS to obtain the second group number, the second terminal device determines that the target manner for receiving paging of the first access network device is the first grouping manner. The first grouping manner corresponds to the first RNTI and does not correspond to the second RNTI. Therefore, the second terminal device determines not to receive the DCI on the PO, and does not receive, on the time-frequency resource indicated by the DCI, the paging message sent by the first access network device. Alternatively, the second terminal device may detect only a WUS scrambled by using the first RNTI, but does not detect a WUS scrambled by using the second RNTI. When the second terminal does not receive the WUS scrambled by using the first RNTI or the received WUS scrambled by using the first RNTI does not include the second group number, the second terminal device determines not to receive the DCI on the PO, or receive, on the time-frequency resource indicated by the DCI, the paging message sent by the first access network device.

Optionally, it may be stipulated in a protocol that the first RNTI used to scramble the WUS corresponds to the first grouping manner, and the second RNTI corresponds to the second grouping manner.

Manner 5: It is stipulated that the first grouping manner corresponds to a first group number range, the second grouping manner corresponds to a second group number range, and there is no intersection between the first group number range and the second group number range. For example, the first group number range is [1, 6], and the second group number range is [7, 8]. In other words, when the core network device groups the plurality of terminal devices, the group number of each terminal device falls within the first group number range. When the first access network device groups the plurality of terminal devices, the group number of each terminal device falls within the second group number range. In other words, the group number of each terminal device obtained by the first access network device through calculation based on the identifier of each terminal device falls within the second group number range. If the first access network device determines that the first target manner for paging the first terminal device is the first grouping manner, and the group number allocated by the core network device to the first terminal device is the first group number, the first access network device carries the first group number in the WUS. If the first access network device determines that the first target manner for paging the first terminal device is the second grouping manner, and the group number of the first terminal device obtained by the first access network device and the first terminal device through calculation based on the identifier of the first terminal device is the second group number, the first access network device carries the second group number in the WUS.

Optionally, if a value of the first group number range is less than a value of the second group number range, special processing needs to be performed to implement the foregoing "the group number of each terminal device obtained by the first access network device through calculation based on the identifier of each terminal device falls within the second group number range". To be specific, a group number that is of each terminal device and that actually corresponds to the second grouping manner is obtained only when a maximum value in the first group number range is added to the group number obtained through direct calculation based on the identifier of each terminal device. In other words, the first group number range is [1, N], the second group number range is [N+1, M], a value obtained through direct calculation based on the identifier of the terminal device is L (a value obtained through a modulo/remainder operation is L or L−1), and an actual group number of the terminal device in the second grouping manner is L+N. For example, the first group number range is [1, 6], the second group number range is [7, 8], the value obtained through direction calculation based on the identifier of the terminal device is 2 (the value obtained through the modulo operation is 2 or i), and the actual group number of the terminal device in the second grouping manner is 8. If a value of the first group number range is greater than a value of the second group number range, no special processing needs to be performed to implement the foregoing "the group number of each terminal device obtained by the first access network device through calculation based on the identifier of each terminal device falls within the second group number range". To be specific, the group number obtained through direct calculation based on the identifier of each terminal device is a group number that is of each terminal device and that actually corresponds to the second grouping manner. For example, the second group number range is [1, 2], the first group number range is [3, 8], the value obtained through direct calculation based on the identifier of the terminal device is 2 (a value obtained through a modulo/remainder operation is 2 or i), and an actual group number of the terminal device in the second grouping manner is 2. However, special processing needs to be performed to implement the foregoing "when the core network device groups the plurality of terminal devices, the group number of each terminal device falls within the first group number range". In other words, the core network device performs grouping based on the first group number range. For example, the second group number range is [1, 2], the first group number range is [3, 8], and the core network device allocates the group number to the terminal device in the group number range [3, 8]. Alternatively, the core network device still performs grouping based on a quantity of groups supported by the core network device. For example, if a quantity of groups supported by the core network device or the first grouping manner is 6, the core network device allocates the group number to the terminal device in a group number range [1, 6]. However, special processing needs to be performed on a group number that indicates the first grouping manner and that is carried in the WUS. To be specific, the group number that indicates the first grouping manner and that is carried in the WUS is the group number allocated by the core network device plus a quantity of groups supported by the second grouping manner. For example, the quantity of groups supported by the second grouping manner is 2, the second group number range is [1, 2], the quantity of groups supported by the first grouping manner is 6, and a group number range allocated by the core network device is [1, 6]. However, the group number range that indicates the first grouping manner and that is carried in the WUS is [3, 8]. For example, if the group number allocated by the core network device is 3, a group number that indicates a third group allocated by the core network device and that is carried in the WUS is 3+2=5. It should be noted that the value of the first group number range may be less than that of the second group number range, or may be greater than that of the second group number range, which may be predefined in a protocol. For example, the value of the first group number range is greater than that of the second group number range, or may be configured by the network. For example, the network device indicates the first group number range and/or the second group number range, or the network device indicates whether the first group number range is less or greater than the second group number range.

Optionally, it may be stipulated in the protocol that the first group number range corresponds to the first grouping manner, and the second group number range corresponds to the second grouping manner. Optionally, the first access network device and the core network device may negotiate the first group number range and the second group number range. For example, the core network device may determine, based on a total group number range, the first group number range corresponding to the first grouping manner, and send the determined first group number range to the first access network device. The first access network device determines, based on the total group number range and the first group number range sent by the network device, the second group number range corresponding to the second grouping manner. Alternatively, the first access network device may determine, based on a total group number range, the second group number range corresponding to the second grouping manner, and send the determined second group number range to the core network device. The core network device determines, based on the total group number range and the first group number range sent by the first access network device, the first group number range corresponding to the first grouping manner. Optionally, the first access network device indicates the first group number range and/or the second group number range to the terminal device, and the first access network device may perform the indication to the terminal device by using broadcast information.

Optionally, in a CU-DU network architecture, specifically, the core network device may determine, based on the total group number range, the first group number range corresponding to the first grouping manner, and send the determined first group number range to a CU. The CU sends the first group number range to a DU. The DU determines, based on the total group number range and the first group number range sent by the CU, the second group number range corresponding to the second grouping manner. Alternatively, a DU may determine, based on the total group number range, the second group number range corresponding to the second grouping manner. The DU sends the second group number range to a CU. The CU sends the second group number range to the core network device. The core network device determines, based on the total group number range and the first group number range sent by the DU, the first group number range corresponding to the first grouping manner. Alternatively, the core network device may send, to a CU, the quantity of groups supported by the core network device or the first grouping manner. The CU sends, to a DU, the quantity of groups supported by the core network device or the first grouping manner. The DU determines, based on the quantity of groups supported by the core network device or the first grouping manner and the quantity of groups supported by the second grouping manner, the group number that indicates the first grouping manner and that is carried in the WUS.

Optionally, at least two of Manner 1 to Manner 5 may be combined. In other words, the first access network device may indicate, to the terminal device in the target group in two or more manners, that the terminal device that supports the first target manner in the target group is to receive the paging message.

In the second grouping paging mechanism, the first access network device indicates, to the terminal device in the target group by using the DCI, that a terminal device whose target manner is the first target manner and/or a second target manner in the target group is to receive the paging message. The target group is a group to which the first terminal device belongs. In the target group, a target manner of a terminal device is the first target manner, and a target manner of a terminal device is not the first target manner. If the first target manner is the first grouping manner, the first access network device indicates, to the terminal device in the target group by using the DCI, that the terminal device whose target manner is the first grouping manner in the target group is to receive the paging message. If there is still the terminal device whose target manner is the second grouping manner in the target group, the terminal device does not receive the paging message. For example, for the second grouping paging mechanism, when receiving the DCI, the terminal devices do not receive the paging message at the time-frequency resource location indicated by the DCI, and only the terminal device whose target manner is the first grouping manner receives the DCI, and receives the paging message at the time-frequency resource location indicated by the DCI. Alternatively, similarly, if the first target manner is the second grouping manner, the first access network device indicates, to the terminal device in the target group by using the DCI, that the terminal device whose target manner is the second grouping manner in the target group is to receive the paging message. If there is still the terminal device whose target manner is the first grouping manner in the target group, the terminal device does not receive the paging message. Alternatively, if the first target manner is the first target manner and the second grouping manner, the first access network device indicates, to the terminal device in the target group by using the DCI, that the terminal device whose target manner is the first target manner and the second grouping manner in the target group is to receive the paging message.

In the second grouping paging mechanism, any one of the following manners may be used to indicate, to the terminal device in the target group, that the terminal device whose target manner is the first target manner in the target group is to receive the paging message.

Manner 1: The DCI includes second indication information, and the second indication information indicates a target manner in the target group. For example, the second indication information indicates that the terminal device whose target manner is the first target manner in the target group is to receive the paging message. For example, the second indication information occupies one bit. If a value of the bit is 1 or a first value, it indicates that the terminal device whose target manner is the first grouping manner in the target group is to receive the paging message on the time-frequency domain resource indicated by the DCI, and the terminal device whose target manner is the second grouping manner in the target group is not to receive the paging message on the time-frequency domain resource indicated by the DCI. Alternatively, if a value of the bit is 0 or a second value, it indicates that the terminal device whose target manner is the second grouping manner in the target group is to receive the paging message on the time-frequency domain resource indicated by the DCI, and the terminal device whose target manner is the first grouping manner in the target group is not to receive the paging message on the time-frequency domain resource indicated by the DCI.

In other words, if the first access network device pages the first terminal device by using the second grouping paging mechanism, in S305, the DCI may be sent. The DCI includes a target group number of the first terminal device (for example, if the first target manner is the first grouping manner, the target group number is the first group number, or if the first target manner is the second grouping manner, the target group number is the second group number, and the first group number is the same as the second group number in this embodiment) and the second indication information. If the first target manner is the first grouping manner, the second indication information indicates, to the terminal device in the target group, that the terminal device whose target manner is the first grouping manner is to receive the paging message. A terminal device that receives the DCI determines, based on the second indication information in the DCI, that the terminal device whose target manner is the second grouping manner is not to receive the paging message, and the terminal device whose target manner is the first grouping manner is to receive the paging message. This can avoid power consumption caused when both the terminal device whose target manner is the first grouping manner and the terminal device whose target manner is the second grouping manner receive the paging message. If the first target manner is the second grouping manner, the second indication information indicates, to the terminal device in the target group, that the terminal device whose target manner is the second grouping manner is to receive the paging message. A terminal device that receives the DCI determines, based on the second indication information, that the terminal device whose target manner is the first grouping manner is not to receive the paging message, and the terminal device whose target manner is the second grouping manner is to receive the paging message. This can avoid power consumption caused when both the terminal device whose target manner is the first grouping manner and the terminal device whose target manner is the second grouping manner receive the paging message. In other words, if there is an intersection between a group number range corresponding to the first grouping manner and a group number range corresponding to the second grouping manner, a group number of the terminal device whose target manner is the first grouping manner is the same as a group number of a terminal device whose target manner is the second grouping manner, and the second indication information can distinguish between terminal devices that have a same group number and have different target manners.

It should be noted that the second indication information is only a one-bit indication, that is, can indicate only that the target manner is the first target manner or the second target manner. If a grouping manner corresponding to a currently paged terminal device includes the first grouping manner and the second grouping manner, the first access network device needs to send two pieces of DCI. Second indication information included in one piece of DCI indicates that the target manner in the target group is the first target manner, and second indication information included in the other piece of DCI indicates that the target manner in the target group is the second target manner.

It may be understood that the second indication information in the first grouping paging mechanism may be different from the second indication information in the second grouping paging mechanism.

Manner 2: The DCI includes a first field and a second field, the first field is a field corresponding to a target manner that is the first grouping manner, and the second field is a field corresponding to a target manner that is the second grouping manner. If the first access network device needs to page the first terminal device, and the first target manner for paging the first terminal device is the first grouping manner, the first access network device includes, in the first field, the target group number used to page the first terminal device. If the first access network device needs to page the first terminal device, and the first target manner for paging the first terminal device is the second grouping manner, the first access network device includes, in the second field, the target group number used to page the first terminal device. Therefore, when needing to page the first terminal device, the first access network device first determines the first target manner, and selects a target field from the first field and the second field based on the first target manner.

If the first access network device determines that the first target manner for paging the first terminal device is the first grouping manner, the first access network device may include the first group number in the first field of the DCI. In other words, in this case, the target group number is the first group number, and the first group number is the group number allocated by the core network device to the first terminal device. When the first terminal device parses the first field to obtain the first group number, the first terminal device determines that the first target manner for receiving paging of the first access network device is the first grouping manner. Therefore, the first terminal device may determine, based on the first group number obtained by parsing the first field, that the first access network device receives, on the time-frequency resource indicated by the DCI, the paging message sent by the first access network device. Both the group number of the first terminal device and the group number of the second terminal device are the first group number. The first group number of the second terminal device is obtained by the second terminal device through calculation based on the identifier of the second terminal device. When the second terminal device parses the first field to obtain the first group number, the second terminal device determines that the target manner for receiving paging of the first access network device is the second grouping manner. The second grouping manner corresponds to the second field and does not correspond to the first field. Therefore, the second terminal device determines not to receive, on the time-frequency resource indicated by the DCI, the paging message sent by the first access network device. Alternatively, the second terminal device may parse only the second field corresponding to the target manner that is the second grouping manner, and does not parse the first field corresponding to the target manner that is the first grouping manner. When the second terminal device does not obtain the first group number from the second field through parsing, the second terminal device determines not to receive, on the time-frequency resource indicated by the DCI, the paging message sent by the first access network device.

If the first access network device determines that the first target manner for paging the first terminal device is the second grouping manner, the first access network device may include the second group number in the second field of the DCI. In other words, in this case, the target group number is the second group number, and the second group number is the group number obtained by the first access network device and the first terminal device through calculation based on the identifier of the first terminal device. When the first terminal device parses the second field to obtain the second group number, the first terminal device determines that the first target manner for receiving paging of the first access network device is the second grouping manner. Therefore, the first terminal device may determine, based on the second group number obtained by parsing the second field, that the first access network device receives, on the time-frequency resource indicated by the DCI, the paging message sent by the first access network device. Both the group number of the first terminal device and the group number of the second terminal device are the second group number. The second group number of the second terminal device is allocated by the core network device to the second terminal device. When the second terminal device parses the second field to obtain the second group number, the second terminal device determines that the target manner for receiving paging of the first access network device is the first grouping manner. The first grouping manner corresponds to the first field and does not correspond to the second field. Therefore, the second terminal device determines not to receive, on the time-frequency resource indicated by the DCI, the paging message sent by the first access network device. Alternatively, the second terminal device may parse only the first field corresponding to the target manner that is the first grouping manner, and does not parse the second field corresponding to the target manner that is the second grouping manner. When the second terminal device does not obtain the second group number from the first field through parsing, the second terminal device determines not to receive, on the time-frequency resource indicated by the DCI, the paging message sent by the first access network device.

For example, the first field occupies the first eight predefined bits, the second field occupies the last eight predefined bits, the first field and the second field are adjacent, and the two fields occupy 16 bits in total. Alternatively, the first field occupies the first four predefined bits, the second field occupies the last four predefined bits, and the two fields occupy eight bits in total. Optionally, the following manners are included.

(1) If a maximum quantity, supported in a protocol, of groups obtained in the first grouping manner and the second grouping manner is N, the first field occupies predefined N bits, the second field occupies predefined N bits, and the two fields occupy 2N bits in total.

(2) If a maximum quantity, supported in a protocol, of groups obtained in the first grouping manner and the second grouping manner is L, the first field occupies predefined M bits, the second field occupies predefined N bits, and the two fields occupy N bits in total. A value of L and a value of M may be predefined in the protocol (for example, L=M=N/2), or may be configured by a network. For example, the core network device interacts or negotiates with the access network device. In a possible manner, the core network device determines the value of L based on a value of N and sends the value of L to the access network device. The access network device determines, based on the value of N and the value of L, that the value of M is N−L. The access network device configures, for example, configure by using a broadcast message, one or more of N, M, and L for the terminal device. In another possible manner, the access network device determines the value of M based on a value of N and sends the value of M to the access network device. The core network device determines, based on the value of N and the value of M, that the value of L is N−M. The access network device configures, for example, configure by using broadcast information, one or more of N, M, and L for the terminal device.

Optionally, in a CU-DU network architecture, specifically, in a possible manner, the core network device determines the value of L based on the value of N and sends the value of L to a CU. The CU sends the value of L to a DU. The DU determines, based on the value of N and the value of L, that the value of M is N−L, and the DU configures, for example, configures by using the broadcast message, the one or more of N, M, and L for the terminal device. In another possible manner, a DU determines the value of M based on the value of N and sends the value of M to a CU. The CU sends the value of M to the core network device. The core network device determines, based on the value of N and the value of M, that the value of L is N−M. The DU configures, for example, configures by using the broadcast information, the one or more of N, M, and L for the terminal device.

(3) If a maximum quantity, supported by the cell, of groups obtained in the first grouping manner is N, and a maximum quantity, supported by the cell, of groups obtained in the second grouping manner is M, the first field occupies N predefined bits, the second field occupies M predefined bits, and the two fields occupy N+M bits in total.

(4) If a maximum quantity, supported by the cell, of groups obtained in the first grouping manner is N, a maximum quantity, supported by the cell, of groups obtained in the second grouping manner is M, and N is less than or equal to M, the first field occupies N predefined bits, the second field occupies M−N predefined bits, and the two fields occupy M bits in total.

(5) If a maximum quantity, supported by the cell, of groups obtained in the first grouping manner is N, a maximum quantity, supported by the cell, of groups obtained in the second grouping manner is M, and N is greater than M, the first field occupies L predefined bits (L is less than N and less than M), the second field occupies M−L predefined bits, and the two fields occupy M bits in total. A value of L may be predefined in a protocol (for example, L=M/2), or may be configured by a network. For example, the core network device interacts or negotiates with the access network device. In a possible manner, the core network device determines the value of L based on a value of M and sends the value of L to the access network device. The access network device determines M−L based on the value of M and the value of L. The access network device configures, for example, configures by using broadcast information, one or more of N, M, and L for the terminal device.

Optionally, in a CU-DU network architecture, specifically, in a possible manner, the core network device determines the value of L based on the value of M and sends the value of L to a CU. The CU sends the value of L to a DU. The DU determines M−L based on the value of M and the value of L, and the DU configures, for example, configures by using the broadcast information, the one or more of N, M, and L for the terminal device.

It should be noted that N, M, and L are integers greater than 0. The first field may be before or after the second field, and may be predefined in the protocol, or may be configured by the network. For example, the network device indicates a location of the first field and a location of the second field to the terminal device, that is, the first field may be before or after the second field. The network device may indicate the location by using broadcast information. Optionally, it may be stipulated in the protocol that the first field included in the DCI corresponds to the first grouping manner, and the second field corresponds to the second grouping manner.

It may be understood that the first field in the first grouping paging mechanism may be different from the first field in the second grouping paging mechanism. The second field in the first grouping paging mechanism may be different from the second field in the second grouping paging mechanism.

Manner 3: A first RNTI used to scramble the DCI corresponds to the first grouping manner, and a second RNTI used to scramble the DCI corresponds to the second grouping manner. The first access network device may implicitly indicate, by scrambling the DCI by using the first RNTI, the terminal device whose target manner is the first grouping manner to receive the paging message, and the terminal device whose target manner is the second grouping manner not to receive the paging message. The first access network device may implicitly indicate, by scrambling the DCI by using the second RNTI, the terminal device whose target manner is the second target manner to receive the paging message, and the terminal device whose target manner is the first grouping manner not to receive the paging message. Therefore, when needing to page the first terminal device, the first access network device first determines the first target manner, and selects, based on the first target manner, a target RNTI from the first RNTI and the second RNTI to scramble the DCI.

If the first access network device determines that the first target manner for paging the first terminal device is the first grouping manner, the first access network device may scramble the DCI by using the first RNTI. The DCI includes the first group number. In other words, in this case, the target group number is the first group number, and the first group number is the group number allocated by the core network device to the first terminal device. When the first terminal device receives DCI scrambled by using the first RNTI, and parses the DCI to obtain the first group number, the first terminal device determines that the first target manner for receiving paging of the first access network device is the first grouping manner. Therefore, the first terminal device may determine, based on the DCI scrambled by using the first RNTI, that the first access network device receives, on the time-frequency resource indicated by the DCI, the paging message sent by the first access network device. Both the group number of the first terminal device and the group number of the second terminal device are the first group number. The first group number of the second terminal device is obtained by the second terminal device through calculation based on the identifier of the second terminal device. When the second terminal device receives the DCI scrambled by using the first RNTI, the second terminal device determines that the target manner for receiving paging of the first access network device is the second grouping manner. The second grouping manner corresponds to the second RNTI and does not correspond to the first RNTI. Therefore, the second terminal device determines not to receive, on the time-frequency resource indicated by the DCI, the paging message sent by the first access network device. Alternatively, the second terminal device may detect only DCI scrambled by using the second RNTI, but does not detect DCI scrambled by using the first RNTI. When the second terminal does not receive the DCI scrambled by using the second RNTI or the received DCI scrambled by using the second RNTI does not include the first group number, the second terminal device determines not to receive, on the time-frequency resource indicated by the DCI, the paging message sent by the first access network device.

If the first access network device determines that the first target manner for paging the first terminal device is the second grouping manner, the first access network device may scramble the DCI by using the second RNTI. The DCI includes the second group number. In other words, in this case, the target group number is the second group number, and the second group number is the group number obtained by the first access network device and the first terminal device through calculation based on the identifier of the first terminal device. When the first terminal device descrambles the DCI by using the second RNTI, and parses the DCI to obtain the second group number, the first terminal device determines that the first target manner for receiving paging of the first access network device is the second grouping manner. Therefore, the first terminal device may determine, based on the DCI descrambled by using the second RNTI, that the first access network device receives, on the time-frequency resource indicated by the DCI, the paging message sent by the first access network device. Both the group number of the first terminal device and the group number of the second terminal device are the second group number. The second group number of the second terminal device is allocated by the core network device to the second terminal device. When the second terminal device descrambles the DCI by using the second RNTI, and parses the DCI to obtain the second group number, the second terminal device determines that the target manner for receiving paging of the first access network device is the first grouping manner. The first grouping manner corresponds to the first RNTI and does not correspond to the second RNTI. Therefore, the second terminal device determines not to receive, on the time-frequency resource indicated by the DCI, the paging message sent by the first access network device. Alternatively, the second terminal device may detect only DCI scrambled by using the first RNTI, but does not detect DCI scrambled by using the second RNTI. When the second terminal does not receive the DCI scrambled by using the first RNTI or the received DCI scrambled by using the first RNTI does not include the second group number, the second terminal device determines not to receive, on the time-frequency resource indicated by the DCI, the paging message sent by the first access network device.

Optionally, it may be stipulated in a protocol that the first RNTI used to scramble the DCI corresponds to the first grouping manner, and the second RNTI corresponds to the second grouping manner.

Manner 4: It is stipulated that the first grouping manner corresponds to a first group number range, the second grouping manner corresponds to a second group number range, and there is no intersection between the first group number range and the second group number range. For example, the first group number range is [1, 6], and the second group number range is [7, 8]. In other words, when the core network device groups the plurality of terminal devices, the group number of each terminal device falls within the first group number range. When the first access network device groups the plurality of terminal devices, the group number of each terminal device falls within the second group number range. In other words, the group number of each terminal device obtained by the first access network device through calculation based on the identifier of each terminal device falls within the second group number range. If the first access network device determines that the first target manner for paging the first terminal device is the first grouping manner, and the group number allocated by the core network device to the first terminal device is the first group number, the first access network device carries the first group number in the DCI. If the first access network device determines that the first target manner for paging the first terminal device is the second grouping manner, and the group number of the first terminal device obtained by the first access network device and the first terminal device through calculation based on the identifier of the first terminal device is the second group number, the first access network device carries the second group number in the WUS.

Optionally, if a value of the first group number range is less than a value of the second group number range, special processing needs to be performed to implement the foregoing "the group number of each terminal device obtained by the first access network device through calculation based on the identifier of each terminal device falls within the second group number range". To be specific, a group number that is of each terminal device and that actually corresponds to the second grouping manner is obtained only when a maximum value in the first group number range is added to the group number obtained through direct calculation based on the identifier of each terminal device. In other words, the first group number range is [1, N], the second group number range is [N+1, M], a value obtained through direct calculation based on the identifier of the terminal device is L (a value obtained through a modulo/remainder operation is L or L−1), and an actual group number of the terminal device in the second grouping manner is L+N. For example, the first group number range is [1, 6], the second group number range is [7, 8], the value obtained through direction calculation based on the identifier of the terminal device is 2 (the value obtained through the modulo operation is 2 or 1), and the actual group number of the terminal device in the second grouping manner is 8. If a value of the first group number range is greater than a value of the second group number range, no special processing needs to be performed to implement the foregoing "the group number of each terminal device obtained by the first access network device through calculation based on the identifier of each terminal device falls within the second group number range". To be specific, the group number obtained through direct calculation based on the identifier of each terminal device is a group number that is of each terminal device and that actually corresponds to the second grouping manner. For example, the second group number range is [1, 2], the first group number range is [3, 8], the value obtained through direct calculation based on the identifier of the terminal device is 2 (a value obtained through a modulo/remainder operation is 2 or 1), and an actual group number of the terminal device in the second grouping manner is 2. However, special processing needs to be performed to implement the foregoing "when the core network device groups the plurality of terminal devices, the group number of each terminal device falls within the first group number range". In other words, the core network device performs grouping based on the first group number range. For example, the second group number range is [1, 2], the first group number range is [3, 8], and the core network device allocates the group number to the terminal device in the group number range [3, 8]. Alternatively, the core network device still performs grouping based on a quantity of groups supported by the core network device. For example, if a quantity of groups supported by the core network device or the first grouping manner is 6, the core network device allocates the group number to the terminal device in a group number range [1, 6]. However, special processing needs to be performed on a group number that indicates the first grouping manner and that is carried in the WUS. To be specific, the group number that indicates the first grouping manner and that is carried in the WUS is the group number allocated by the core network device plus a quantity of groups supported by the second grouping manner. For example, the quantity of groups supported by the second grouping manner is 2, the second group number range is [1, 2], the quantity of groups supported by the first grouping manner is 6, and a group number range allocated by the core network device is [1, 6]. However, the group number range that indicates the first grouping manner and that is carried in the WUS is [3, 8]. For example, if the group number allocated by the core network device is 3, a group number that indicates a third group allocated by the core network device and that is carried in the WUS is 3+2=5. It should be noted that the value of the first group number range may be less than that of the second group number range, or may be greater than that of the second group number range, which may be predefined in a protocol. For example, the value of the first group number range is greater than that of the second group number range, or may be configured by the network. For example, the network device indicates the first group number range and/or the second group number range, or the network device indicates whether the first group number range is less or greater than the second group number range.

Optionally, it may be stipulated in the protocol that the first group number range corresponds to the first grouping manner, and the second group number range corresponds to the second grouping manner. Optionally, the first access network device and the core network device may negotiate the first group number range and the second group number range. For example, the core network device may determine, based on a total group number range, the first group number range corresponding to the first grouping manner, and send the determined first group number range to the first access network device. The first access network device determines, based on the total group number range and the first group number range sent by the core network, the second group number range corresponding to the second grouping manner. Alternatively, the first access network device may determine, based on a total group number range, the second group number range corresponding to the second grouping manner, and send the determined second group number range to the core network device. The core network device determines, based on the total group number range and the first group number range sent by the first access network device, the first group number range corresponding to the first grouping manner. Optionally, the first access network device indicates the first group number range and/or the second group number range to the terminal device, and the first access network device may perform the indication to the terminal device by using broadcast information.

Optionally, in a CU-DU network architecture, specifically, the core network device may determine, based on the total group number range, the first group number range corresponding to the first grouping manner, and send the determined first group number range to a CU. The CU sends the first group number range to a DU. The DU determines, based on the total group number range and the first group number range sent by the CU, the second group number range corresponding to the second grouping manner. Alternatively, a DU may determine, based on the total group number range, the second group number range corresponding to the second grouping manner. The DU sends the second group number range to a CU. The CU sends the second group number range to the core network device. The core network device determines, based on the total group number range and the first group number range sent by the first access network device, the first group number range corresponding to the first grouping manner. Alternatively, the core network device may send, to a CU, the quantity of groups supported by the core network device or the first grouping manner. The CU sends, to a DU, the quantity of groups supported by the core network device or the first grouping manner. The DU determines, based on the quantity of groups supported by the core network device or the first grouping manner and the quantity of groups supported by the second grouping manner, the group number that indicates the first grouping manner and that is carried in the WUS.

Optionally, at least two of Manner 1 to Manner 4 may be combined. In other words, the first access network device may indicate, to the terminal device in the target group in two or more manners, that the terminal device that supports the first target manner in the target group is to receive the paging message.

In the foregoing embodiment, the first terminal device may be in the RRC inactive state or the RRC connected state. When the first terminal device is in the RRC connected state, the second access network device may release the first terminal device from the RRC connected state into the RRC inactive state. After the first terminal device enters the RRC inactive state, an access network device on which the first terminal device currently camps may be the first access network device. When the first terminal device is in the RRC inactive state, if downlink data of the first terminal device needs to be sent, the first terminal device needs to be paged. In this case, the last access network device (namely, the second access network device) on which the first terminal device in the RRC connected state needs to initiate paging, to page the first terminal device. If the second access network device needs to page the first terminal device, because the first terminal device has moved to the coverage area of the first access network device, the second access network device may fail to page the first terminal device only within a coverage area of the second access network device. The second access network device may send information used for paging to a plurality of access network devices that are in a same notification area (notification area, NA) as the second access network device. The plurality of access network devices include the first access network device, and the first access network device pages the first terminal device based on the information used for paging. The information used for paging may include the grouping capability information of the first terminal device, or include the grouping capability information of the first terminal device and the first group number allocated by the core network device to the first terminal device. The grouping capability information of the first terminal device may be information sent by the core network device to the second access network device. If the second access network device supports a grouping capability, the second access network device may send the information used for paging to the first access network device in the same NA. If the second access network device supports no grouping capability, the second access network device may not identify the information used for paging of the core network device, and therefore cannot send the information used for paging to the first access network device in the same NA. Consequently, the first access network device cannot page the first terminal device by using a grouping paging mechanism. After the first terminal device camps on the first access network device, according to the descriptions of the method 300, the first terminal device may receive the grouping manner that is supported by the first access network device for use and that is broadcast by the first access network device. Therefore, the first terminal device may determine, based on the grouping manner supported by the first terminal device and the grouping manner supported by the first access network device for use, the first target manner for receiving paging of the first access network device. In this way, the first terminal device receives the paging message from the first access network device in the grouping manner, but the first access network device cannot page the first terminal device in a grouping manner. Consequently, the first terminal device and the first access network device have different understandings of paging. As a result, the first terminal device misses listening to the paging message of the first terminal device. For example, if the first grouping paging mechanism is used, the first terminal device attempts to receive the PEI at the offset that is before the PO of the first terminal device. However, the first access network device cannot send, in the grouping manner, the PEI at a 1st offset that is before the PO of the first terminal device. Consequently, the PEI received by the first terminal device does not indicate that the group to which the first terminal device belongs needs to be woken up and further receive the paging message. As a result, the first terminal device does not wake up on the PO to receive the DCI, but the first access network device may send the DCI on the PO. Therefore, the first terminal device misses listening to the paging message. Therefore, in the paging method provided in this embodiment of this application, the second access network device may indicate, to the first terminal device, whether the first terminal device can use a grouping manner in the RRC inactive state.

Figure 4A:
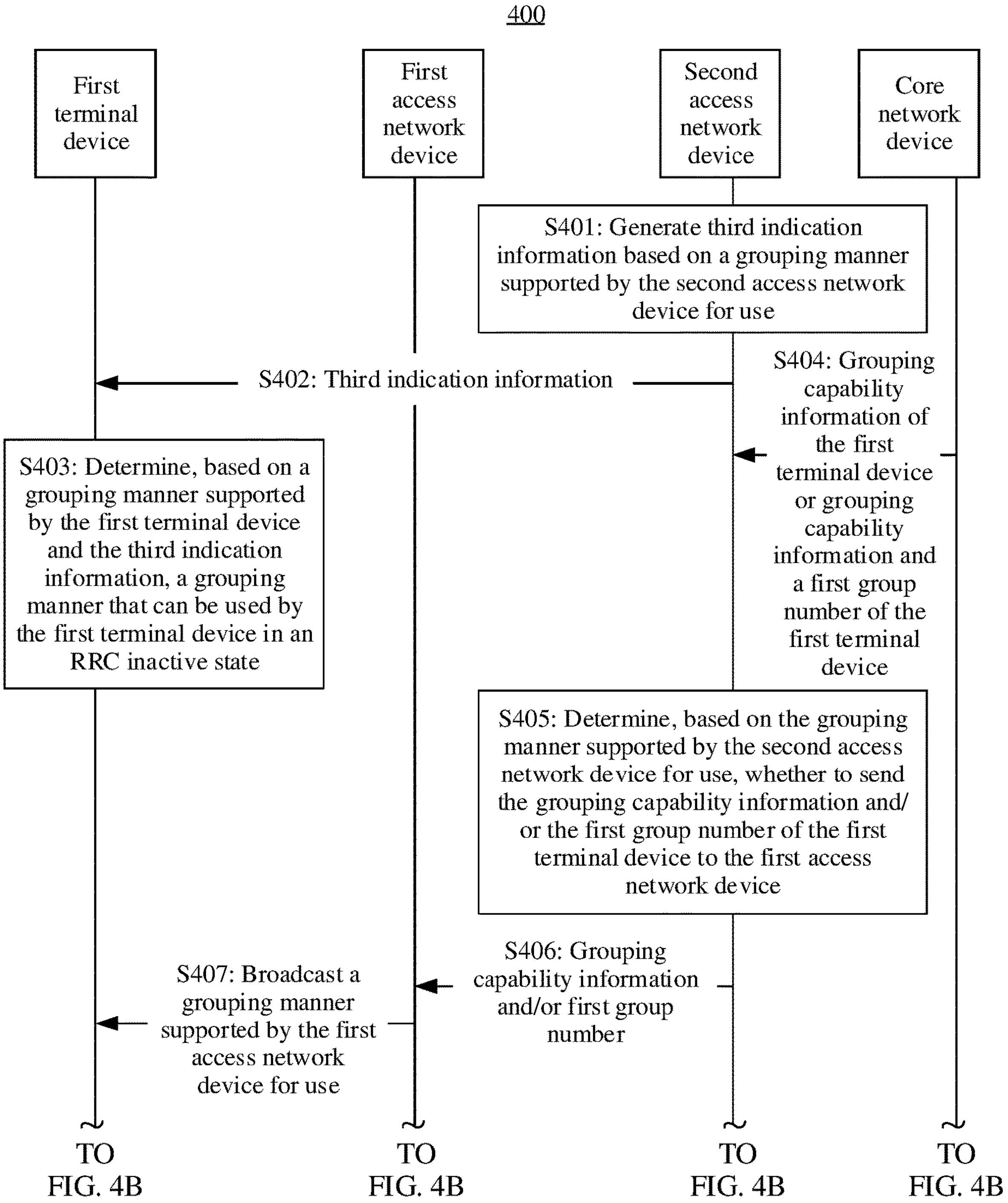
FIG. 4A and FIG. 4B are a schematic diagram of another paging method according to an embodiment of this application.
Figure 4B:
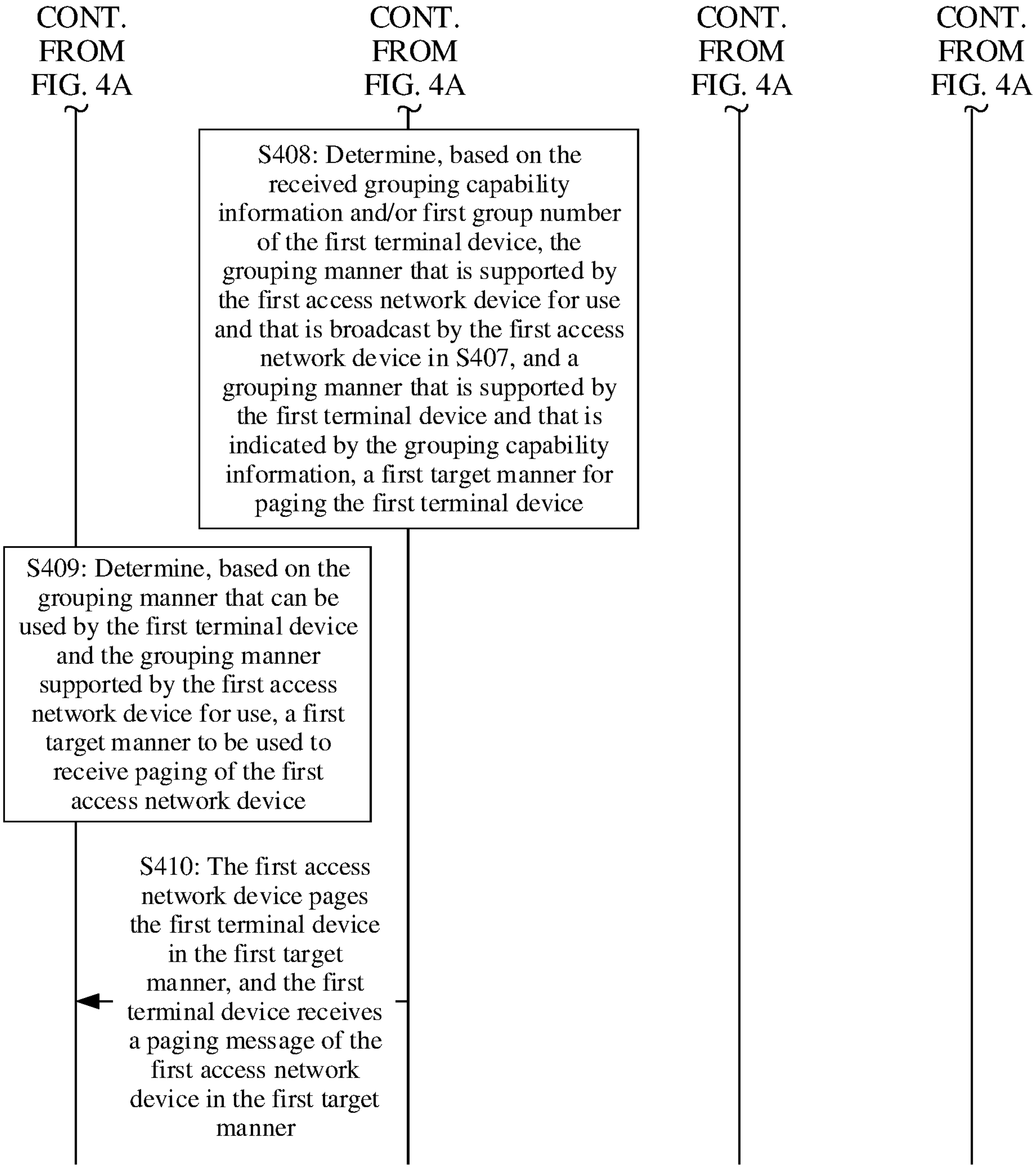

With reference to FIG. 4A and FIG. 4B, the following describes a paging method 400 provided in an embodiment of this application. The method 400 includes the following steps.

S401: A second access network device generates third indication information based on a grouping manner supported by the second access network device for use, where the third indication information indicates whether a first terminal device can use a grouping manner in an RRC inactive state.

Optionally, the third indication information specifically indicates that the first terminal device can use a first grouping manner and/or a second grouping manner in the RRC inactive state. In other words, in a possible implementation, the third indication information may indicate that the first terminal device can use a grouping manner or cannot use a grouping manner in the RRC inactive state. In another possible implementation, the third indication information may indicate that a grouping manner that can be used by the first terminal device in the RRC inactive state is specifically the first grouping manner and/or the second grouping manner. Optionally, if the second access network device does not send the third indication information, it is considered by default that the second access network device implicitly indicates that the first terminal device cannot use a grouping manner in the RRC inactive state. Optionally, if the second access network device sends the third indication information, but the third indication information indicates neither the first grouping manner nor the second grouping manner, it is determined that the first terminal device cannot use a grouping manner in the RRC inactive state.

Optionally, the third indication information indicates whether the second access network device supports a grouping manner, or the third indication information specifically indicates that the second access network device supports the first grouping manner and/or the second grouping manner.

It may be understood that, for the first grouping manner and the second grouping manner in the method 400, refer to the descriptions of the first grouping manner and the second grouping manner in the method 300. To avoid repetition, details are not described in this embodiment of this application.

Optionally, the third indication information specifically indicates that the first terminal device can use the first grouping manner and/or the second grouping manner in the RRC inactive state. S401 includes: If the second access network device supports the second grouping manner for use, the generated third indication information specifically indicates that the first terminal device can use the second grouping manner in the RRC inactive state. In other words, if the second access network device supports the second grouping manner for use, it indicates that the second access network device can send, to a first access network device, grouping capability information of the first terminal device from a core network device, but does not send a first group number allocated by the core network device to the first terminal device. Therefore, the first access network device cannot page the first terminal device in the first grouping manner either, and the first terminal device cannot receive a paging message of the first access network device in the first grouping manner either. Therefore, the third indication information indicates that the first terminal device can use the second grouping manner but cannot use the first grouping manner in the RRC inactive state.

Optionally, the third indication information specifically indicates that the first terminal device can use the first grouping manner and/or the second grouping manner in the RRC inactive state. S401 includes: If the second access network device supports the first grouping manner for use, or supports the first grouping manner and the second grouping manner, the generated third indication information specifically indicates that the first terminal device can use the first grouping manner and the second grouping manner in the RRC inactive state. In other words, if a grouping manner supported by the second access network device includes the first grouping manner, it indicates that the second access network device can send, to a first access network device, grouping capability information of the first terminal device from a core network device and a first group number allocated by the core network device to the first terminal device. Therefore, the first access network device may page the first terminal device in the first grouping manner or the second grouping manner, and the first terminal device may receive a paging message of the first access network device in the first grouping manner or the second grouping manner. Therefore, the third indication information indicates that the first terminal device can use the second grouping manner and the first grouping manner in the RRC inactive state.

Optionally, the third indication information specifically indicates that the first terminal device can use the first grouping manner and/or the second grouping manner in the RRC inactive state. S401 includes: If the second access network device supports the first grouping manner for use, or supports the first grouping manner and the second grouping manner, the generated third indication information specifically indicates that the first terminal device can use the first grouping manner in the RRC inactive state. In other words, if a grouping manner supported by the second access network device includes the first grouping manner, it indicates that the second access network device can send, to a first access network device, grouping capability information of the first terminal device from a core network device and a first group number allocated by the core network device to the first terminal device. Therefore, the first access network device may page the first terminal device in the first grouping manner or the second grouping manner, and the first terminal device may receive a paging message of the first access network device in the first grouping manner or the second grouping manner. However, a priority of the first grouping manner is higher than a priority of the second grouping manner, and the second access network device determines to enable the first terminal device use only the first grouping manner. Therefore, the third indication information indicates that the first terminal device can use the first grouping manner in the RRC inactive state.

S402: The second access network device sends the third indication information to the first terminal device, and the first terminal device receives the third indication information from the second access network device.

Optionally, in Manner 1, S402 includes: The second access network device broadcasts a system message. The system message includes the third indication information. After receiving the system message, the first terminal device obtains the third indication information in the system message. In other words, in this manner, the first terminal device can receive the system message broadcast by the second access network device. In other words, if the first terminal device is in the RRC inactive state or an RRC connected state, but is within a coverage area of the second access network device, the first terminal device may receive the system message broadcast by the second access network device.

Optionally, in Manner 2, in S402, the first terminal device is in an RRC connected state. When the first terminal device has no data transmission requirement within a preset time period, the second access network device may carry the third indication information in an RRC release message. After receiving the RRC release message, the first terminal device enters the RRC inactive state from the RRC connected state.

Optionally, in Manner 3, in an alternative manner of S402, the second access network device may broadcast, in a system message, the grouping manner supported by the second access network device for use. Before moving into a coverage area of the first access network device, the first terminal device can receive, within a coverage area of the second access network device, the grouping manner that is supported by the second access network device for use and that is broadcast by the second access network device. In this case, the first terminal device can determine, based on the grouping manner supported by the second access network device for use, the grouping manner that can be used by the first terminal device in the RRC inactive state. Specifically, if the grouping manner supported by the second access network device for use is the first grouping manner or the first grouping manner and the second grouping manner, the grouping manner that can be used by the first terminal device in the RRC inactive state is the first grouping manner and the second grouping manner. If the grouping manner supported by the second access network device for use is the second grouping manner, the grouping manner that can be used by the first terminal device in the RRC inactive state is the second grouping manner. In other words, in this manner, the second access network device may not send the third indication information to specially indicate the grouping manner that can be used by the first terminal device in the RRC inactive state, but the first terminal device can determine, by using a grouping manner that is supported by the first access network device for use and that is broadcast in the system message, the grouping manner that can be used by the first terminal device in the RRC inactive state.

It should be noted that, in Manner 3 of S402, although the new third indication information is not introduced to specially indicate the grouping manner that can be used by the first terminal device in the RRC inactive state, signaling overheads can be reduced. However, the grouping manner that is supported by the second access network device for use and that is broadcast by the second access network device in the system message is not necessarily the grouping manner supported by the second access network device. For example, the second access network device broadcasts, in the system message, that the second grouping manner is supported for use. However, the second access network device may support the first grouping manner and the second grouping manner. Because the second access network device determines that the second grouping manner is currently supported for use, in this case, the second access network device can still send, to the first access network device, the grouping capability information of the first terminal device from the core network device and the first group number allocated by the core network device to the first terminal device. Therefore, the first access network device may page the first terminal device in the first grouping manner or the second grouping manner, and the first terminal device may receive the paging message of the first access network device in the first grouping manner or the second grouping manner. In this case, there is a problem that information obtained by the first terminal device is incomplete or is inconsistent with a case actually supported by the second access network device. In addition, in Manner 1 or Manner 3 of S402, the grouping manner that is supported by the second access network device for use and that is broadcast in the system message may change. The grouping manner that can be used by the first terminal device in the RRC inactive state and that is determined by the first terminal device by using the system message may be outdated information. The second access network device does not know when information stored in the first terminal device is broadcast in the system message. Therefore, there is still a problem that a grouping manner to be used by the second access network device to page the first terminal device is inconsistent with the grouping manner. In Manner 2 of S402, this problem can be effectively resolved. The grouping manner that can be used by the first terminal device in the RRC inactive state is configured by the second access network device for the first terminal device by using a dedicated message (the RRC release message). Therefore, both the second access network device and the first terminal device can clearly understand the grouping manner that can be used by the first terminal device in the RRC inactive state, and no problem of inconsistent understandings occurs. In other words, in Manner 1 and Manner 3, the grouping manner that is supported by the second access network device for use and that is included in the system message broadcast by the second access network device may be an outdated grouping manner supported by the second access network device for use. The grouping manner supported by the second access network device for use may change in different scenarios. Therefore, the third indication information in the RRC release message in Manner 2 is used to clearly indicate the grouping manner that can be used by the first terminal device in the RRC inactive state. This can avoid the inconsistent understandings caused by a non-real-time problem.

S403: The first terminal device determines, based on a grouping manner supported by the first terminal device and the third indication information, the grouping manner that can be used by the first terminal device in the RRC inactive state.

The following describes S403 based on different cases.

Case 1: S403 includes: if the first terminal device supports the first grouping manner, or supports the first grouping manner and the second grouping manner, and the third indication information indicates that the first terminal device can use the first grouping manner in the RRC inactive state, determining that the first terminal device can use the first grouping manner.

Case 2: S403 includes: if the first terminal device supports the second grouping manner, or supports the first grouping manner and the second grouping manner, and the third indication information indicates that the first terminal device can use the second grouping manner in the RRC inactive state, determining that the first terminal device can use the second grouping manner.

Case 3: S403 includes: if the first terminal device supports the first grouping manner and the second grouping manner, and the third indication information indicates that the first terminal device can use the first grouping manner and the second grouping manner in the RRC inactive state, determining that the first terminal device can use the first grouping manner and the second grouping manner.

Case 4: S403 includes: if the first terminal device supports neither the first grouping manner nor the second grouping manner, even if the third indication information indicates that the first terminal device can use a grouping manner or can use the first grouping manner and/or the second grouping manner in the RRC inactive state, determining that the first terminal device can use neither the first grouping manner nor the second grouping manner.

Case 5: S403 includes: if the first terminal device supports the first grouping manner and/or the second grouping manner, and the third indication information indicates that the first terminal device cannot use a grouping manner in the RRC inactive state, determining that the first terminal device can use neither the first grouping manner nor the second grouping manner.

Case 6: S403 includes: if the first terminal device supports the first grouping manner, and the third indication information indicates that the first terminal device can use a grouping manner in the RRC inactive state, determining that the first terminal device can use the first grouping manner.

Case 7: S403 includes: if the first terminal device supports the second grouping manner, and the third indication information indicates that the first terminal device can use a grouping manner in the RRC inactive state, determining that the first terminal device can use the second grouping manner.

Case 8: S403 includes: if the first terminal device supports the first grouping manner and the second grouping manner, and the third indication information indicates that the first terminal device can use a grouping manner in the RRC inactive state, determining that the first terminal device can use the first grouping manner and the second grouping manner.

Case 9: S403 includes: if the third indication information indicates that the grouping manner that can be used by the first terminal device in the RRC inactive state is inconsistent with the grouping manner supported by the first terminal device, determining that the first terminal device can use neither the first grouping manner nor the second grouping manner. For example, if the third indication information indicates that the grouping manner that can be used by the first terminal device in the RRC inactive state is the first grouping manner, and the grouping manner supported by the first terminal device is the second grouping manner, it is determined that the first terminal device can use neither the first grouping manner nor the second grouping manner. For another example, if the third indication information indicates that the grouping manner that can be used by the first terminal device in the RRC inactive state is the second grouping manner, and the grouping manner supported by the first terminal device is the first grouping manner, it is determined that the first terminal device can use neither the first grouping manner nor the second grouping manner.

Optionally, if the third indication information indicates that the first terminal device cannot use the grouping manner, S403 may not be performed, and/or S408 may not be performed either. To be specific, the first terminal device does not obtain the grouping manner supported by the first access network device for use either. If the third indication information indicates that the first terminal device can use the first grouping manner and/or the second grouping manner, S403 may be performed, and S408 may also be performed either. To be specific, the first terminal device obtains the grouping manner supported by the first access network device for use.

S404: The core network device sends the grouping capability information of the first terminal device to the second access network device, and the second access network device receives the grouping capability information of the first terminal device sent by the core network device. Alternatively, the core network device sends, to the second access network device, the grouping capability information of the first terminal device and the first group number allocated by the core network device to the first terminal device, and the second access network device receives the grouping capability information and the first group number of the first terminal device that are sent by the core network device.

Optionally, the core network device may send the grouping capability information of the first terminal device to the second access network device by using core network assistance information for RRC Inactive IE (Core Network Assistance Information for RRC INACTIVE IE), or may send, to the second access network device by using core network assistance information for RRC Inactive IE (Core Network Assistance Information for RRC INACTIVE IE), the grouping capability information of the first terminal device and the first group number allocated by the core network device to the first terminal device.

S405: The second access network device determines, based on the grouping manner supported by the second access network device for use, whether to send the grouping capability information and/or the first group number of the first terminal device to the first access network device.

Optionally, S405 includes: if the grouping manner supported by the second access network device for use is the second grouping manner, determining to send the grouping capability information of the first terminal device to the first access network device, and not to send the first group number. In other words, in this case, the third indication information may indicate that the first terminal device can use the second grouping manner in the RRC inactive state.

Optionally, S405 includes: if the grouping manner supported by the second access network device for use is the first grouping manner or the first grouping manner and the second grouping manner, determining to send the first group number and the grouping capability information of the first terminal device to the first access network device. In other words, in this case, the third indication information may indicate that the first terminal device can use the first grouping manner and the second grouping manner in the RRC inactive state, or the third indication information may indicate that the first terminal device can use a grouping manner in the RRC inactive state. In this case, it is considered by default that the first terminal device can use the first grouping manner and the second grouping manner in the RRC inactive state.

Optionally, S405 includes: if the grouping manner supported by the second access network device for use is the first grouping manner, determining to send the first group number to the first access network device, and not to send the grouping capability information of the first terminal device. In other words, in this case, the third indication information may indicate that the first terminal device can use the first grouping manner in the RRC inactive state. In other words, the grouping manner that can be used by the first terminal device in the RRC inactive state and that is indicated by the third indication information sent by the second access network device and the grouping manner supported by the second access network device for use are consistent, and are both the first grouping manner.

Optionally, S405 includes: if the second access network device supports a grouping manner for use, determining to send the grouping capability information and the first group number of the first terminal device to the first access network device. In other words, in this case, the third indication information may indicate that the first terminal device can use a grouping manner in the RRC inactive state. In other words, if the second access network device supports a grouping manner for use, the third indication information indicates that the first terminal device can use a grouping manner in the RRC inactive state.

S406: The second access network device sends the grouping capability information and/or the first group number of the first terminal device to the first access network device.

Optionally, in S406, the grouping capability information of the first terminal device may be sent by using the paging message between the access network devices, or the grouping capability information and the first group number of the first terminal device may be sent by using the paging message between the access network devices.

S407: The first access network device broadcasts the grouping manner supported by the first access network device for use, and the first terminal device obtains the grouping manner supported by the first access network device for use.

Specifically, the first terminal device is within the coverage area of the second access network device when being in the RRC connected state. When the first terminal device enters the RRC inactive state from the RRC connected state, the first terminal device is within the coverage area of the first access network device. Therefore, the first terminal device can obtain the grouping manner supported by the first access network device for use.

Optionally, for that the first access network device determines the grouping manner supported by the first access network device for use in S407, refer to Case 1 to Case 5 that are described in S302.

Specifically, for S407, refer to the descriptions of S303. To avoid repetition, details are not described in this embodiment of this application.

In an alternative manner of S407, the first access network device broadcasts whether the first access network device supports a grouping manner for use. The first terminal device obtains whether the first access network device supports a grouping manner for use. It may be understood that, if a grouping manner is supported for use, it indicates that both the first grouping manner and the second grouping manner are supported; or if no grouping manner is supported for use, it indicates that both the first grouping manner and the second grouping manner are not supported.

S408: The first access network device determines, based on the received grouping capability information and/or the first group number of the first terminal device, the grouping manner that is supported by the first access network device for use and that is broadcast by the first access network device in S407, and a grouping manner that is supported by the first terminal device and that is indicated by the grouping capability information, a first target manner for paging the first terminal device.

The following describes S408 based on different cases.

Case 1: S408 includes: if the first access network device receives the grouping capability information of the first terminal device, determining that the first access network device can page the first terminal device in the second grouping manner. If the grouping capability information of the first terminal device indicates that the grouping manner supported by the first terminal device includes the second grouping manner, and the grouping manner supported by the first access network device for use includes the second grouping manner, the first access network device determines that the first target manner for paging the first terminal device is the second grouping manner.

Optionally, that the grouping capability information of the first terminal device indicates that the grouping manner supported by the first terminal device includes the second grouping manner may be understood as follows: The grouping capability information of the first terminal device indicates that the grouping manner supported by the first terminal device is the second grouping manner, or the grouping capability information of the first terminal device indicates that the grouping manner supported by the first terminal device is the first grouping manner and the second grouping manner.

Optionally, that the grouping manner supported by the first access network device for use includes the second grouping manner may be understood as follows: The grouping manner supported by the first access network device for use is the second grouping manner, or the grouping manner supported by the first access network device for use is the first grouping manner and the second grouping manner.

Case 2: S408 includes: if the first access network device receives the grouping capability information of the first terminal device, determining that the first access network device can page the first terminal device in the second grouping manner. If the grouping capability information of the first terminal device indicates that the grouping manner supported by the first terminal device does not include the second grouping manner, or the grouping manner supported by the first access network device for use does not include the second grouping manner, the first access network device determines that the first target manner for paging the first terminal device is a non-grouping manner.

Case 3: S408 includes: if the first access network device receives the grouping capability information and the first group number of the first terminal device, determining that the first access network device can page the first terminal device in the first grouping manner and the second grouping manner. If the grouping capability information of the first terminal device indicates that the grouping manner supported by the first terminal device is the first grouping manner, and the grouping manner supported by the first access network device for use includes the first grouping manner, the first access network device determines that the first target manner for paging the first terminal device is the first grouping manner. Alternatively, if the grouping capability information of the first terminal device indicates that the grouping manner supported by the first terminal device includes the first grouping manner, and the grouping manner supported by the first access network device for use is the first grouping manner, the first access network device determines that the first target manner for paging the first terminal device is the first grouping manner.

Optionally, that the grouping manner supported by the first access network device for use includes the first grouping manner may be understood as follows: The grouping manner supported by the first access network device for use is the first grouping manner, or the grouping manner supported by the first access network device for use is the first grouping manner and the second grouping manner.

Optionally, that the grouping capability information of the first terminal device indicates that the grouping manner supported by the first terminal device includes the first grouping manner may be understood as follows: The grouping capability information of the first terminal device indicates that the grouping manner supported by the first terminal device is the first grouping manner, or the grouping capability information of the first terminal device indicates that the grouping manner supported by the first terminal device for use is the first grouping manner and the second grouping manner.

Case 4: S408 includes: if the first access network device receives the grouping capability information and the first group number of the first terminal device, determining that the first access network device can page the first terminal device in the first grouping manner and the second grouping manner. If the grouping capability information of the first terminal device indicates that the grouping manner supported by the first terminal device is the second grouping manner, and the grouping manner supported by the first access network device for use includes the second grouping manner, the first access network device determines that the first target manner for paging the first terminal device is the second grouping manner. Alternatively, if the grouping capability information of the first terminal device indicates that the grouping manner supported by the first terminal device includes the second grouping manner, and the grouping manner supported by the first access network device for use is the second grouping manner, the first access network device determines that the first target manner for paging the first terminal device is the second grouping manner.

Optionally, that the grouping manner supported by the first access network device for use includes the second grouping manner may be understood as follows: The grouping manner supported by the first access network device for use is the second grouping manner, or the grouping manner supported by the first access network device for use is the first grouping manner and the second grouping manner.

Optionally, that the grouping capability information of the first terminal device indicates that the grouping manner supported by the first terminal device includes the second grouping manner may be understood as follows: The grouping capability information of the first terminal device indicates that the grouping manner supported by the first terminal device is the second grouping manner, or the grouping capability information of the first terminal device indicates that the grouping manner supported by the first terminal device for use is the first grouping manner and the second grouping manner.

Case 5: S408 includes: if the first access network device receives the grouping capability information and the first group number of the first terminal device, determining that the first access network device can page the first terminal device in the first grouping manner and the second grouping manner. If the grouping capability information of the first terminal device indicates that the first terminal device supports the first grouping manner but does not support the second grouping manner, and the first access network device supports no the first grouping manner for use and supports the second grouping manner for use, the first access network device determines that the first target manner for paging the first terminal device is a non-grouping manner. Alternatively, if the grouping capability information of the first terminal device indicates that the first terminal device does not support the first grouping manner but supports the second grouping manner, and the first access network device supports the first grouping manner for use but does not support the second grouping manner for use, the first access network device determines that the first target manner for paging the first terminal device is a non-grouping manner. Alternatively, if the grouping capability information of the first terminal device indicates that the first terminal device supports neither the first grouping manner nor the second grouping manner, or the first access network device supports neither the first grouping manner nor the second grouping manner, the first access network device determines that the first target manner for paging the first terminal device is a non-grouping manner.

Case 6: S408 includes: if the first access network device receives the grouping capability information and the first group number of the first terminal device, determining that the first access network device can page the first terminal device in the first grouping manner and the second grouping manner. If the grouping capability information of the first terminal device indicates that the grouping manner supported by the first terminal device is the first grouping manner and the second grouping manner, and the grouping manner supported by the first access network device for use include the first grouping manner and the second grouping manner, the first access network device determines that the first target manner for paging the first terminal device is a grouping manner with a higher priority in the first grouping manner and the second grouping manner. For example, if a priority of the first grouping manner is higher than a priority of the second grouping manner, the first target manner is the first grouping manner.

Case 7: S408 includes: if the first access network device receives the first group number, determining that the first access network device can page the first terminal device in the first grouping manner. If the grouping capability information of the first terminal device indicates that the grouping manner supported by the first terminal device includes the first grouping manner, and the grouping manner supported by the first access network device for use includes the first grouping manner, the first access network device determines that the first target manner for paging the first terminal device is the first grouping manner.

Optionally, that the grouping capability information of the first terminal device indicates that the grouping manner supported by the first terminal device includes the first grouping manner may be understood as follows: The grouping capability information of the first terminal device indicates that the grouping manner supported by the first terminal device is the first grouping manner, or the grouping capability information of the first terminal device indicates that the grouping manner supported by the first terminal device is the first grouping manner and the second grouping manner.

Optionally, that the grouping manner supported by the first access network device for use includes the first grouping manner may be understood as follows: The grouping manner supported by the first access network device for use is the first grouping manner, or the grouping manner supported by the first access network device for use is the first grouping manner and the second grouping manner.

Case 8: S408 includes: if the first access network device receives the first group number, determining that the first access network device can page the first terminal device in the first grouping manner. If the grouping capability information of the first terminal device indicates that the grouping manner supported by the first terminal device does not include the first grouping manner, or the grouping manner supported by the first access network device for use does not include the first grouping manner, the first access network device determines that the first target manner for paging the first terminal device is a non-grouping manner.

In other words, in the foregoing eight cases, if the first access network device receives the grouping capability information of the first terminal device, the first access network device can page the first terminal device in the second grouping manner. If both the grouping manner that is supported by the first terminal device and that is indicated by the grouping capability information of the first terminal device and the grouping manner supported by the first access network device for use include the second grouping manner, the first target manner in which the first access network device pages the first terminal device is the second grouping manner. If the grouping manner that is supported by the first terminal device and that is indicated by the grouping capability information of the first terminal device or the grouping manner supported by the first access network device for use does not include the second grouping manner, the first target manner in which the first access network device pages the first terminal device is the non-grouping manner. If the first access network device receives the grouping capability information and the first group number of the first terminal device, it is determined that the first access network device can page the first terminal device in the first grouping manner and the second grouping manner. If there is an intersection between the grouping manner that is supported by the first terminal device and that is indicated by the grouping capability information of the first terminal device, the grouping manner supported by the first access network device for use, and first grouping manner, the first target manner in which the first access network device pages the first terminal device is the first grouping manner. If there is an intersection between the grouping manner that is supported by the first terminal device and that is indicated by the grouping capability information of the first terminal device, the grouping manner supported by the first access network device for use, and the second grouping manner, the first target manner in which the first access network device pages the first terminal device is the second grouping manner. If there is an intersection between the grouping manner that is supported by the first terminal device and that is indicated by the grouping capability information of the first terminal device, the grouping manner supported by the first access network device for use, and each of the first grouping manner and the second grouping manner, the first target manner in which the first access network device pages the first terminal device is the grouping manner with the higher priority in the first grouping manner and the second grouping manner, for example, is the first grouping manner. If there is no intersection between the grouping manner that is supported by the first terminal device and that is indicated by the grouping capability information of the first terminal device, the grouping manner supported by the first access network device for use, and each of the first grouping manner and the second grouping manner, the first target manner in which the first access network device pages the first terminal device is the non-grouping manner. If the first access network device receives the first group number of the first terminal device, the first access network device can page the first terminal device in the first grouping manner. If both the grouping manner that is supported by the first terminal device and that is indicated by the grouping capability information of the first terminal device and the grouping manner supported by the first access network device for use include the first grouping manner, the first target manner in which the first access network device pages the first terminal device is the first grouping manner. If the grouping manner that is supported by the first terminal device and that is indicated by the grouping capability information of the first terminal device or the grouping manner supported by the first access network device for use does not include the first grouping manner, the first target manner in which the first access network device pages the first terminal device is the non-grouping manner.

S409: The first terminal device determines, based on the grouping manner that can be used by the first terminal device in S403 and the grouping manner that is supported by the first access network device for use and that is obtained in S407, a first target manner for receiving paging of the first access network device.

After obtaining the grouping manner supported by the first access network device for use, the first terminal device may perform S409. The following describes S409 based on different cases.

Case 1: S409 includes: If the grouping manner that can be used by the first terminal device is the first grouping manner, and the grouping manner supported by the first access network device for use includes the first grouping manner, the first terminal device determines that the first target manner for receiving paging of the first access network device is the first grouping manner.

Optionally, that the grouping manner supported by the first access network device for use includes the first grouping manner may be understood as follows: The grouping manner supported by the first access network device for use is the first grouping manner, or the grouping manner supported by the first access network device for use is the first grouping manner and the second grouping manner.

Case 2: S409 includes: If the grouping manner that can be used by the first terminal device is the second grouping manner, and the grouping manner supported by the first access network device for use includes the second grouping manner, the first access network device determines that the first target manner for paging the first terminal device is the second grouping manner.

Optionally, that the grouping manner supported by the first access network device for use includes the second grouping manner may be understood as follows: The grouping manner supported by the first access network device for use is the second grouping manner, or the grouping manner supported by the first access network device for use is the first grouping manner and the second grouping manner.

Case 3: S409 includes: If the grouping manner that can be used by the first terminal device is the first grouping manner and the second grouping manner, and the grouping manner supported by the first access network device for use is the first grouping manner, the first terminal device determines that the first target manner for receiving paging of the first access network device is the first grouping manner.

Case 4: S409 includes: If the grouping manner that can be used by the first terminal device is the first grouping manner and the second grouping manner, and the grouping manner supported by the first access network device for use is the second grouping manner, the first terminal device determines that the first target manner for receiving paging of the first access network device is the second grouping manner.

Case 5: S409 includes: If the grouping manner that can be used by the first terminal device is the first grouping manner and the second grouping manner, and the first access network device supports the first grouping manner and the second grouping manner for use, the first terminal device determines that the first target manner for receiving paging of the first access network device is the grouping manner with the higher priority in the first grouping manner and the second grouping manner. For example, if the priority of the first grouping manner is higher than the priority of the second grouping manner, the first target manner is the first grouping manner.

Case 6: S409 includes: If the grouping manner that can be used by the first terminal device is the first grouping manner, and the grouping manner supported by the first access network device for use does not include the first grouping manner, the first terminal device determines that the first target manner for receiving paging of the first access network device is the non-grouping manner. Alternatively, if the grouping manner that can be used by the first terminal device is the second grouping manner, and the grouping manner supported by the first access network device for use does not include the second grouping manner, the first terminal device determines that the first target manner for receiving paging of the first access network device is the non-grouping manner. Alternatively, if the grouping manner that can be used by the first terminal device is the first grouping manner and the second grouping manner, and the first access network device supports neither the first grouping manner or the second grouping manner, the first terminal device determines that the first target manner for receiving paging of the first access network device is the non-grouping manner.

Case 7: S409 includes: If the first terminal device can use neither the first grouping manner nor the second grouping manner, the first terminal device determines that the first target manner for receiving paging of the first access network device is the non-grouping manner.

S410: The first access network device pages the first terminal device in the first target manner determined in S408, and the first terminal device receives the paging message of the first access network device in the first target manner determined in S409.

Specifically, for descriptions of S410, refer to the descriptions of S305. To avoid repetition, details are not described in this embodiment of this application.

It should be noted that the method 400 may include only S401 and S402. Another step is an optional step. To be specific, after the second access network device generates the third indication information, and sends the third indication information to the first terminal device, the method 400 may alternatively end. In this case, a method for learning whether the first terminal device can use a grouping manner in the RRC inactive state is provided in the method 400, or a method for learning that the first terminal device can use a grouping manner in the RRC inactive state is provided in the method 400, so that the first terminal device receives the paging message in a grouping manner in the RRC inactive state.

It may be understood that there is no any limitation on a sequence of S401, S402, S403, and S404, and S401, S402, and S403 may be performed before, after, or at the same time as S404. There is no any limitation on a sequence of S406, S408, and S407. S406 and S408 may be performed before, after, or at the same time as S407. There is no any limitation on a sequence of S408 and S409 or S403, and S408 may be performed before, after, or at the same time as S409 or S403.

It may also be understood that S403 and S409 may be one step. In this case, S403 and S409 may be combined and performed after S407.

In the method 400, when the first terminal device enters the RRC inactive state from the RRC connected state within the coverage area of the second access network device, the second access network device can indicate whether the first terminal device can use a grouping manner in the RRC inactive state, or indicate a specific grouping manner that can be used. In this way, the first terminal device can determine, based on the grouping manner supported by the first terminal device and the third indication information, the grouping manner that can be used by the first terminal device. The first access network device determines, based on the grouping manner supported by the first access network device, the grouping capability information and/or the first group number of the first terminal device that are/is received from the second access network device, and the grouping manner that is supported by the first terminal device and that is indicated by the grouping capability information of the first terminal device, the first target manner for paging the first terminal device. The first access network device may broadcast the grouping manner supported by the first access network device for use. The first terminal device may determine, based on the grouping manner supported by the first access network device for use and the grouping manner that can be used by the first terminal device, the first target manner for receiving paging of the first access network device. The first access network device determines, based on the grouping manner supported by the first access network device for use and the grouping capability information of the first terminal device, the first target manner for paging the first terminal device. In this way, the first target manner in which the first access network device pages the first terminal device can be consistent with the first target manner in which the first terminal device receives paging, to reduce power consumption.

Figure 5:
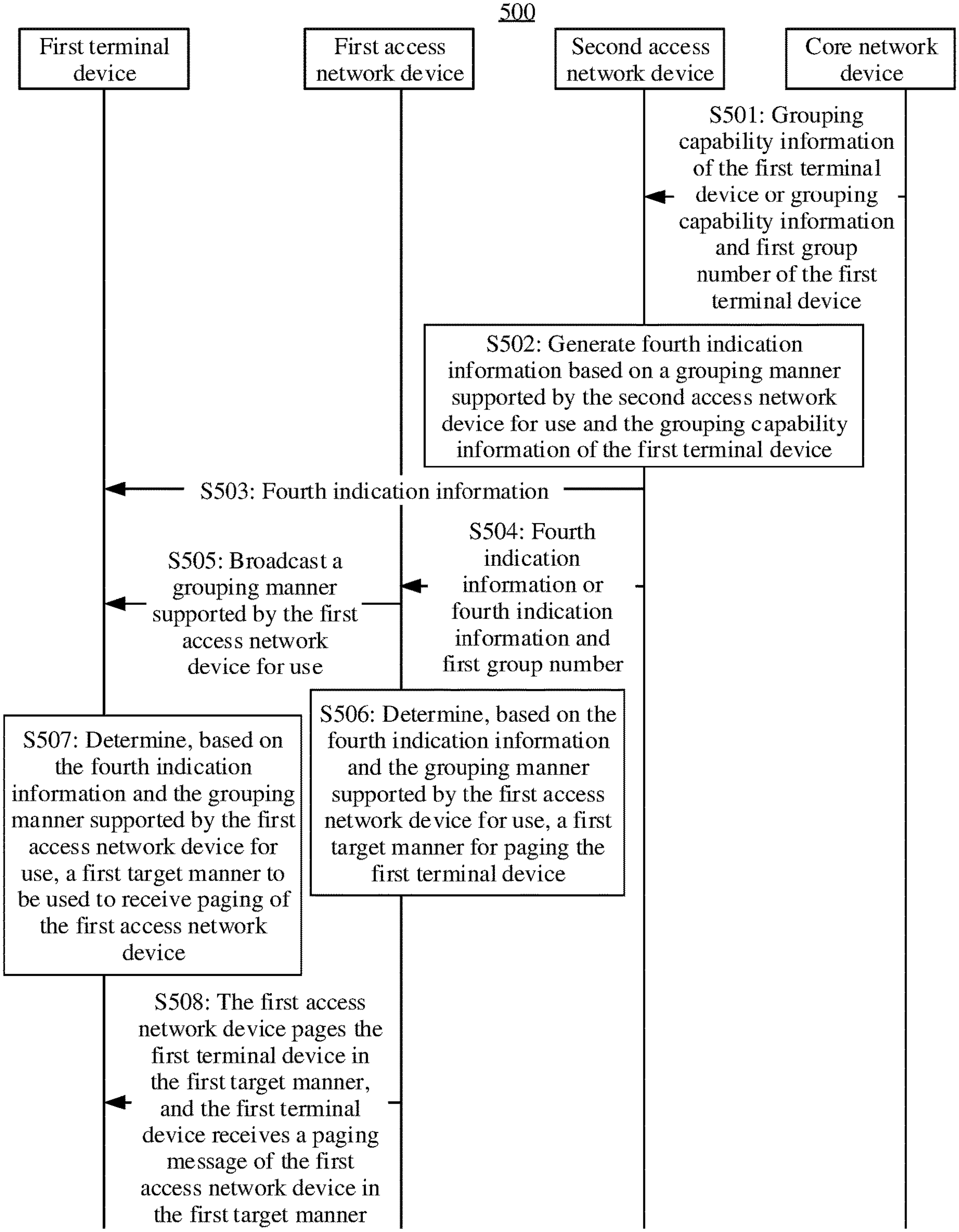
FIG. 5 is a schematic diagram of still another paging method according to an embodiment of this application.

With reference to FIG. 5, the following describes a paging method 500 provided in an embodiment of this application. The method 500 includes the following steps.

S501: A core network device sends grouping capability information of a first terminal device to a second access network device, and the second access network device receives the grouping capability information of the first terminal device sent by the core network device. Alternatively, a core network device sends, to a second access network device, grouping capability information of a first terminal device and a first group number allocated by the core network device to the first terminal device, and the second access network device receives the grouping capability information and the first group number of the first terminal device that are sent by the core network device.

Optionally, the core network device may send the grouping capability information of the first terminal device to the second access network device by using core network assistance information for RRC Inactive IE (Core Network Assistance Information for RRC INACTIVE IE), or may send, to the second access network device by using core network assistance information for RRC Inactive IE (Core Network Assistance Information for RRC INACTIVE IE), the grouping capability information of the first terminal device and the first group number allocated by the core network device to the first terminal device.

S502: The second access network device generates fourth indication information based on a grouping manner supported by the second access network device for use and the grouping capability information of the first terminal device, where the fourth indication information indicates whether the first terminal device can use a grouping manner in an RRC inactive state.

Optionally, the fourth indication information specifically indicates that the first terminal device can use a first grouping manner and/or a second grouping manner in the RRC inactive state. In other words, in a possible implementation, the fourth indication information may indicate that the first terminal device can use a grouping manner or cannot use a grouping manner in the RRC inactive state. In another possible implementation, the fourth indication information may indicate that a grouping manner that can be used by the first terminal device in the RRC inactive state is specifically the first grouping manner and/or the second grouping manner. Optionally, if the second access network device does not send the fourth indication information, it is considered by default that the second access network device implicitly indicates that the first terminal device cannot use a grouping manner in the RRC inactive state. Optionally, if the second access network device sends the fourth indication information, but the fourth indication information indicates neither the first grouping manner nor the second grouping manner, it is determined that the first terminal device cannot use a grouping manner in the RRC inactive state.

It may be understood that, for the first grouping manner and the second grouping manner in the method 500, refer to the descriptions of the first grouping manner and the second grouping manner in the method 300. To avoid repetition, details are not described in this embodiment of this application.

When the fourth indication information specifically indicates that the first terminal device can use the first grouping manner and/or the second grouping manner in the RRC inactive state, the following describes S502 based on different cases.

Case 1: S502 includes: If the second access network device supports the second grouping manner for use, and the grouping capability information of the first terminal device indicates that the first terminal device supports the second grouping manner, or supports the first grouping manner and the second grouping manner, the generated fourth indication information specifically indicates that the first terminal device can use the second grouping manner in the RRC inactive state.

In an alternative manner of Case 1, if the second access network device supports the second grouping manner for use or supports the second grouping manner and the first grouping manner for use, and the grouping capability information of the first terminal device indicates that the first terminal device supports the second grouping manner, the generated fourth indication information specifically indicates that the first terminal device can use the second grouping manner in the RRC inactive state.

Case 2: S502 includes: If the second access network device supports the first grouping manner for use, and the grouping capability information of the first terminal device indicates that the first terminal device supports the first grouping manner, or supports the first grouping manner and the second grouping manner, the generated fourth indication information specifically indicates that the first terminal device can use the first grouping manner in the RRC inactive state.

In an alternative manner of Case 2, if the second access network device supports the first grouping manner for use or supports the second grouping manner and the first grouping manner for use, and the grouping capability information of the first terminal device indicates that the first terminal device supports the first grouping manner, the generated fourth indication information specifically indicates that the first terminal device can use the first grouping manner in the RRC inactive state.

Case 3: If the second access network device supports the first grouping manner and the second grouping manner for use, and the grouping capability information of the first terminal device indicates that the first terminal device supports the first grouping manner and the second grouping manner, the generated fourth indication information specifically indicates that the first terminal device can use the first grouping manner and the second grouping manner in the RRC inactive state.

Case 4: If the grouping manner supported by the second access network device for use is inconsistent with a grouping manner that is supported by the first terminal device and that is indicated by the grouping capability information of the first terminal device, the generated fourth indication information specifically indicates that the first terminal device cannot use a grouping manner in the RRC inactive state.

S503: The second access network device sends the fourth indication information to the first terminal device, and the first terminal device receives the fourth indication information from the second access network device.

Optionally, in S503, the first terminal device is in an RRC connected state. When the first terminal device has no data transmission requirement within a preset time period, the second access network device may carry the fourth indication information in an RRC release message. After receiving the RRC release message, the first terminal device enters the RRC inactive state from the RRC connected state.

S504: The second access network device sends the fourth indication information to a first access network device, or send the fourth indication information and the first group number.

If the second access network device receives the first group number from the core network device in S501, the second access network device may send the first group number in S504.

Optionally, S504 includes: The second access network device may send the fourth indication information to the first access network device by using a paging message between the access network devices, or send the fourth indication information and the first group number.

S505: The first access network device broadcasts the grouping manner supported by the first access network device for use, and the first terminal device obtains the grouping manner supported by the first access network device for use.

Specifically, the first terminal device is within a coverage area of the second access network device when being in the RRC connected state. When the first terminal device enters the RRC inactive state from the RRC connected state, the first terminal device is within a coverage area of the first access network device. Therefore, the first terminal device can obtain the grouping manner supported by the first access network device for use.

Optionally, for that the first access network device determines the grouping manner supported by the first access network device for use in S505, refer to Case 1 to Case 5 that are described in S302.

In an alternative manner of S505, the first access network device broadcasts whether the first access network device supports a grouping manner for use. The first terminal device obtains whether the first access network device supports a grouping manner for use. It may be understood that, if a grouping manner is supported for use, it indicates that both the first grouping manner and the second grouping manner are supported; or if no grouping manner is supported for use, it indicates that both the first grouping manner and the second grouping manner are not supported.

S506: The first access network device determines, based on the fourth indication information in S504 and the grouping manner supported by the first access network device for use in S505, a first target manner for paging the first terminal device.

After determining the grouping manner supported by the first access network device for use, the first access network device may perform S506. The following describes S506 based on different cases.

Case 1: If the grouping manner supported by the first access network device for use includes the first grouping manner, and the fourth indication information indicates that the first terminal device can use the first grouping manner in the RRC inactive state, the first access network device determines that the first target manner for paging the first terminal device is the first grouping manner.

Optionally, that the grouping manner supported by the first access network device for use includes the first grouping manner may be understood as that the grouping manner supported by the first access network device is the first grouping manner or the first grouping manner and the second grouping manner.

Optionally, Case 1 may alternatively be replaced with the following: If the grouping manner supported by the first access network device for use is the first grouping manner, and the fourth indication information specifically indicates that the first terminal device can use the first grouping manner and the second grouping manner in the RRC inactive state, the first access network device determines that the first target manner for paging the first terminal device is the first grouping manner.

Case 2: If the grouping manner supported by the first access network device for use includes the second grouping manner, and the fourth indication information indicates that the first terminal device can use the second grouping manner in the RRC inactive state, it is determined that the first target manner for paging the first terminal device is the second grouping manner.

Optionally, that the grouping manner supported by the first access network device for use includes the second grouping manner may be understood as that the grouping manner supported by the first access network device is the second grouping manner or the first grouping manner and the second grouping manner.

Optionally, Case 2 may alternatively be replaced with the following: If the grouping manner supported by the first access network device for use is the second grouping manner, and the fourth indication information indicates that the first terminal device can use the first grouping manner and the second grouping manner in the RRC inactive state, it is determined that the first target manner for paging the first terminal device is the second grouping manner.

Case 3: If the grouping manner supported for use by the first access network device is the first grouping manner, and the fourth indication information indicates that the first terminal device can use the second grouping manner but cannot use the first grouping manner in the RRC inactive state, it is determined that the first target manner for paging the first terminal device is a non-grouping manner. To be specific, no grouping paging mechanism is used, and a non-grouping paging manner is used.

Case 4: If the grouping manner supported by the first access network device for use is the second grouping manner, and the fourth indication information indicates that the first terminal device can use the first grouping manner but cannot use the second grouping manner in the RRC inactive state, it is determined that the first target manner for paging the first terminal device is a non-grouping manner.

Case 5: If the grouping manner supported by the first access network device for use is the first grouping manner and the second grouping manner, and the fourth indication information indicates that the first terminal device can use the first grouping manner and the second grouping manner in the RRC inactive state, the first access network device determines the first target manner based on a priority of the first grouping manner and a priority of the second grouping manner.

Optionally, that the first access network device determines the first target manner based on a priority of the first grouping manner and a priority of the second grouping manner includes: if the priority of the first grouping manner is higher than the priority of the second grouping manner, determining the first grouping manner as the first target manner. Optionally, that the priority of the first grouping manner is higher than the priority of the second grouping manner may be stipulated in a protocol. Optionally, the first access network device may determine that the priority of the first grouping manner is higher than the priority of the second grouping manner. Optionally, the first access network device may broadcast that the priority of the first grouping manner is higher than the priority of the second grouping manner. Certainly, the priority of the second grouping manner may alternatively be higher than the priority of the first grouping manner. In this case, the first access network device determines the second grouping manner as the first target manner.

Case 6: If the first access network device supports no grouping manner for use, that is, supports neither the first grouping manner nor the second grouping manner, the first access network device determines that the first target manner for paging the first terminal device is a non-grouping manner. To be specific, no grouping paging mechanism is used to page the first terminal device.

Case 7: If the fourth indication information indicates that the first terminal device cannot use a grouping manner in the RRC inactive state, that is, the first terminal device can use neither the first grouping manner nor the second grouping manner, regardless of whether the first access network device supports the first grouping manner and/or the second grouping manner, the first access network device determines that the first target manner for paging the first terminal device is a non-grouping manner. To be specific, no grouping paging mechanism is used to page the first terminal device.

S507: The first terminal device receives, based on the fourth indication information in S503 and the grouping manner that is supported by the first access network device for use and that is obtained in S505, a first target manner for receiving paging of the first access network device.

After obtaining the grouping manner supported by the first access network device for use, the first terminal device may perform S507. The following describes S506 based on different cases.

Case 1: If the grouping manner supported by the first access network device for use includes the first grouping manner, and the fourth indication information indicates that the first terminal device can use the first grouping manner in the RRC inactive state, the first terminal device determines that the first target manner to be used by the first terminal device to receive paging of the first access network device is the first grouping manner.

Optionally, that the grouping manner supported by the first access network device for use includes the first grouping manner may be understood as that the grouping manner supported by the first access network device is the first grouping manner or the first grouping manner and the second grouping manner.

Optionally, Case 1 may alternatively be replaced with the following: If the grouping manner supported by the first access network device for use is the first grouping manner, and the fourth indication information indicates that the first terminal device can use the first grouping manner and the second grouping manner in the RRC inactive state, the first terminal device determines that the first target manner to be used by the first terminal device to receive paging of the first access network device is the first grouping manner.

Case 1 corresponds to Case 1 in S506. In other words, the first access network device and the first terminal device determine, by using a same policy, that both the first target manners are the first grouping manner. In this way, the first target manner in which the first access network device pages the first terminal device is the same as the first target manner in which the first terminal device determines to receive paging of the first terminal device.

Case 2: If the grouping manner supported by the first access network device for use includes the second grouping manner, and the fourth indication information indicates that the first terminal device can use the second grouping manner in the RRC inactive state, the first terminal device determines that the first target manner to be used by the first terminal device to receive paging of the first access network device is the second grouping manner.

Optionally, that the grouping manner supported by the first access network device for use includes the second grouping manner may be understood as that the grouping manner supported by the first access network device is the second grouping manner or the first grouping manner and the second grouping manner.

Optionally, Case 2 may alternatively be replaced with the following: If the grouping manner supported by the first access network device for use is the second grouping manner, and the fourth indication information indicates that the first terminal device can use the first grouping manner and the second grouping manner in the RRC inactive state, the first terminal device determines that the first target manner to be used by the first terminal device to receive paging of the first access network device is the second grouping manner.

Case 2 corresponds to Case 2 in S506. In other words, the first access network device and the first terminal device determine, by using a same policy, that both the first target manners are the second grouping manner. In this way, the first target manner in which the first access network device pages the first terminal device is the same as the first target manner in which the first terminal device determines to receive paging of the first terminal device.

Case 3: If the grouping manner supported by the first access network device for use is the first grouping manner, and the fourth indication information indicates that the first terminal device can use the second grouping manner but cannot use the first grouping manner in the RRC inactive state, the first terminal device determines that the first target manner to be used by the first terminal device to receive paging of the first access network device is the non-grouping manner.

Case 3 corresponds to Case 3 in S506. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

Case 4: If the grouping manner supported by the first access network device for use is the second grouping manner, and the fourth indication information indicates that the first terminal device can use the first grouping manner but cannot use the second grouping manner in the RRC inactive state, the first terminal device determines that the first target manner to be used by the first terminal device to receive paging of the first access network device is the non-grouping manner.

Case 4 corresponds to Case 4 in S506. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

Case 5: If the grouping manner supported by the first access network device for use is the first grouping manner and the second grouping manner, and the fourth indication information indicates that the first terminal device can use the first grouping manner and the second grouping manner in the RRC inactive state, the first terminal device determines, based on the priority of the first grouping manner and the priority of the second grouping manner, the first target manner for receiving paging of the first access network device.

Optionally, that the first terminal device determines, based on the priority of the first grouping manner and the priority of the second grouping manner, the first target manner for receiving paging of the first access network device includes: if the priority of the first grouping manner is higher than the priority of the second grouping manner, determining the first grouping manner as the first target manner. Optionally, that the priority of the first grouping manner is higher than the priority of the second grouping manner may be stipulated in the protocol. Optionally, the first access network device may broadcast that the priority of the first grouping manner is higher than the priority of the second grouping manner. Certainly, the priority of the second grouping manner may alternatively be higher than the priority of the first grouping manner. In this case, the first terminal device determines the second grouping manner as the first target manner.

Case 5 corresponds to Case 5 in S506. In other words, the first access network device and the first terminal device determine, by using a same policy, that both the first target manners are the first grouping manner. In this way, the first target manner in which the first access network device pages the first terminal device is the same as the first target manner in which the first terminal device determines to receive paging of the first terminal device.

Case 6: If the first access network device supports no grouping manner for use, that is, supports neither the first grouping manner nor the second grouping manner, the first terminal device determines that the first target manner to be used by the first terminal device to receive paging of the first access network device is the non-grouping manner.

Case 6 corresponds to Case 6 in S506. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

Case 7: If the fourth indication information indicates that the first terminal device cannot use a grouping manner in the RRC inactive state, that is, the first terminal device supports neither the first grouping manner nor the second grouping manner, the first terminal device determines that the first target manner to be used by the first terminal device to receive paging of the first access network device is the non-grouping manner.

Case 7 corresponds to Case 7 in S506. In other words, the first access network device and the first terminal device determine, by using a same policy, that both the first target manners are the non-grouping manner. In this way, the first target manner in which the first access network device pages the first terminal device is the same as the first target manner in which the first terminal device determines to receive paging of the first terminal device.

S508: The first access network device pages the first terminal device in the first target manner determined in S506, and the first terminal device receives the paging message of the first access network device in the first target manner determined in S507.

Specifically, for descriptions of S508, refer to the descriptions of S305. To avoid repetition, details are not described in this embodiment of this application.

It should be noted that the method 500 may include only S502, S503 and S504. Another step is an optional step. To be specific, after the second access network device generates the fourth indication information, and sends the fourth indication information to the first terminal device and the first access network device, the method 500 may alternatively end. In this case, a method for learning whether the first terminal device can use a grouping manner in the RRC inactive state is provided in the method 500, or a method for learning that the first terminal device can use a grouping manner in the RRC inactive state is provided in the method 500, so that the first terminal device receives the paging message in the RRC inactive state based on the fourth indication information.

It may be understood that there is no any limitation on a sequence of S503, S504, and S505, and S503 and S504 may be performed before, after, or at the same time as S505. There is no any limitation on a sequence of S506 and S507, and S506 may be performed before, after, or at the same time as S507.

In the method 500, the second access network device can determine, based on the grouping manner that is supported by the first terminal device and that is indicated by the grouping capability information of the first terminal device and the grouping manner supported by the second access network device for use, whether the first terminal device can use a grouping manner in the RRC inactive state, or indicate a specific grouping manner that can be used, and send the fourth indication information to the first terminal device and the first access network device, where the fourth indication information indicates whether the first terminal device can use a grouping manner in the RRC inactive state, or indicate the grouping manner that can be used by the first terminal device in the RRC inactive state. When the first terminal device enters the RRC inactive state from the RRC connected state within the coverage area of the second access network device, the first terminal device can determine, based on the grouping manner supported by the first terminal device and the fourth indication information, the first target manner for receiving paging of the first access network device. The first access network device determines, based on the grouping manner supported by the first access network device or use and the fourth indication information, the first target manner for paging the first terminal device. In this way, the first target manner in which the first access network device pages the first terminal device can be consistent with the first target manner in which the first terminal device receives paging, to reduce power consumption.

It should be noted that, in embodiments of this application, that a device "supports" a grouping manner is an inherent capability of the device. A grouping manner determined by the first terminal device based on the "supported" grouping manner and the third indication information is referred to as the grouping manner "that can be used". In the method 300, the method 400, and the method 500, a grouping manner determined by the first access network device based on the "supported" grouping manner and the first indication information is referred to as the grouping manner "that is supported for use". The first target manner in the method 300, the method 400, and the method 500 is a paging manner really "used" in a paging process.

Figure 6:
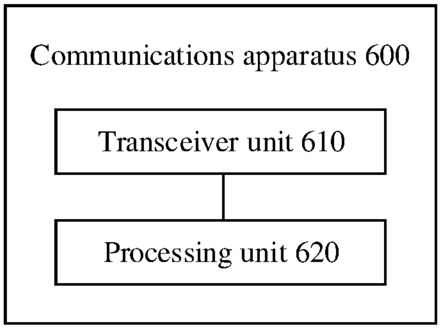
FIG. 6 is a schematic block diagram of a communications apparatus for paging according to an embodiment of this application.
Figure 7:
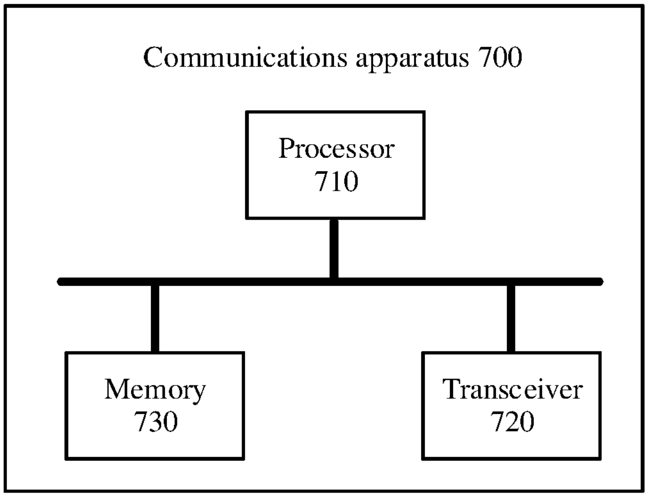
FIG. 7 is a schematic block diagram of another communications apparatus for paging according to an embodiment of this application.

With reference to FIG. 2 to FIG. 5, the foregoing describes in detail the paging method provided in embodiments of this application. With reference to FIG. 6 and FIG. 7, the following describes in detail a communications apparatus for paging provided in embodiments of this application.

FIG. 6 is a schematic block diagram of a communications apparatus for paging according to an embodiment of this application. As shown in FIG. 6, the communications apparatus 600 may include a transceiver unit 610 and a processing unit 620.

In a possible implementation, the communications apparatus 600 may correspond to the first access network device in the foregoing method embodiments, for example, may be the first access network device or a chip configured in the first access network device. The communications apparatus 600 is configured to perform the steps or procedures corresponding to the first access network device in the foregoing methods.

The transceiver unit 610 is configured to obtain grouping capability information of a first terminal device. The processing unit 620 is configured to determine, based on a grouping manner supported by the communications apparatus 600 for use and the grouping capability information of the first terminal device, a first target manner for paging the first terminal device. The processing unit 620 is configured to control, based on the first target manner, the transceiver unit 610 to page the first terminal device.

Optionally, the grouping capability information indicates whether the first terminal device supports a grouping manner, or the grouping capability information indicates that the first terminal device supports a first grouping manner and/or a second grouping manner. The first grouping manner is a grouping manner controlled by a core network device, and the second grouping manner is a grouping manner controlled by an access network device.

Optionally, the first target manner is the first grouping manner, the second grouping manner, or a non-grouping manner.

Optionally, the transceiver unit 610 is further configured to: receive first indication information sent by the core network device, where the first indication information indicates whether the core network device supports the first grouping manner for use; and determine, based on whether the core network device supports the first grouping manner for use indicated by the first indication information and a grouping manner supported by the apparatus 600, the grouping manner supported by the apparatus 600 for use.

Optionally, the processing unit 620 is specifically configured to:

if the first indication information indicates that the core network device supports the first grouping manner for use, and the grouping manner supported by the apparatus 600 includes the first grouping manner, determine that the grouping manner supported by the apparatus 600 for use is the first grouping manner; or if the first indication information indicates that the core network device supports the first grouping manner for use, and the apparatus 600 supports the second grouping manner but does not support the first grouping manner, determine that the grouping manner supported by the apparatus 600 for use is the second grouping manner; or if the first indication information indicates that the core network device does not support the first grouping manner for use, and the grouping manner supported by the apparatus 600 includes the second grouping manner, determine that the grouping manner supported by the apparatus 600 for use is the second grouping manner; or if the first indication information indicates that the core network device supports the first grouping manner for use, and the grouping manner supported by the apparatus 600 is the first grouping manner and the second grouping manner, determine that the grouping manner supported by the apparatus 600 for use is the first grouping manner and the second grouping manner; or if the apparatus 600 supports neither the first grouping manner nor the second grouping manner, determine that the apparatus 600 supports no grouping manner for use.

Optionally, if the grouping manner supported by the apparatus 600 for use is the first grouping manner or the first grouping manner and the second grouping manner, the transceiver unit 610 is further configured to indicate, to the core network device, that the grouping manner supported by the apparatus 600 for use is the first grouping manner.

Optionally, if the grouping manner supported by the apparatus 600 for use is the first grouping manner and the second grouping manner, the processing unit 620 specifically controls the transceiver unit 610 to indicate, to a terminal device in a target group, that a terminal device that supports the first target manner in the target group is to receive a paging message. The target group is a group to which the first terminal device belongs.

Optionally, the processing unit 620 is specifically configured to control the transceiver unit 610 to indicate, to the terminal device in the target group by using a wake-up signal or downlink control information DCI, that a terminal device whose target manner is the first target manner in the target group is to receive the paging message. The wake-up signal is used to wake up the first terminal device.

Optionally, the processing unit 620 is specifically configured to control the transceiver unit 610 to indicate, to the terminal device in the target group by using second indication information included in the wake-up signal or the DCI, that the terminal device whose target manner is the first target manner in the target group is to receive the paging message. The wake-up signal or the DCI includes a target group number corresponding to the first target manner. The target group number corresponding to the first target manner is used to page the first terminal device.

Optionally, the processing unit 620 is specifically configured to control the transceiver unit 610 to indicate, to the terminal device in the target group by including a target group number corresponding to the first target manner in a target field in the wake-up signal or the DCI, that the terminal device whose target manner is the first target manner in the target group is to receive the paging message. The target group number corresponding to the first target manner is used to page the first terminal device.

The target field is a first field or a second field. The first field is a field corresponding to the first grouping manner. The second field is a field corresponding to the second grouping manner. The first target manner is the first grouping manner or the second grouping manner.

Optionally, the processing unit 620 is specifically configured to control the transceiver unit 610 to indicate, to the terminal device in the target group by using the wake-up signal sent at a target resource location, that the terminal device whose target manner is the first target manner in the target group is to receive the paging message. The target resource location is a first resource location or a second resource location. The first resource location is a resource location corresponding to the first grouping manner. The second resource location is a resource location corresponding to the second grouping manner. The first target manner is the first grouping manner or the second grouping manner.

Optionally, the processing unit 620 is specifically configured to control the transceiver unit 610 to indicate, to the terminal device in the target group by scrambling the wake-up signal by using a target radio network temporary identifier, that the terminal device whose target manner is the first target manner in the target group is to receive the paging message, and a terminal device that does not support the first target manner in the target group is not to receive the paging message.

The target radio network temporary identifier is a first radio network temporary identifier or a second radio network temporary identifier. The first radio network temporary identifier is a radio network temporary identifier corresponding to the first grouping manner. The second radio network temporary identifier is a radio network temporary identifier corresponding to the second grouping manner. The first target manner is the first grouping manner or the second grouping manner.

Optionally, if the grouping manner supported by the apparatus 600 for use is the first grouping manner and the second grouping manner, the processing unit 620 is specifically configured to control the transceiver unit 610 to page the first terminal device by using a target group number corresponding to the first target manner.

The target group number falls within a first group number range or a second group number range. The first group number range is a group number range corresponding to the first grouping manner. The second group number range is a group number range corresponding to the second grouping manner. There is no intersection between the first group number range and the second group number range. The first target manner is the first grouping manner or the second grouping manner.

Optionally, the transceiver unit 610 is further configured to receive a first group number of the first terminal device from the core network device. The first group number is a group number corresponding to the first grouping manner.

If the first target manner is the first grouping manner, the processing unit 620 is specifically configured to control the transceiver unit 610 to page the first terminal device based on the first group number corresponding to the first grouping manner.

Optionally, the processing unit 620 is specifically configured to:

if the grouping manner supported by the apparatus 600 for use includes the first grouping manner, and the grouping capability information of the first terminal device indicates that the first terminal device supports the first grouping manner, determine that the first target manner for paging the first terminal device is the first grouping manner; or if the grouping manner supported by the apparatus 600 for use includes the second grouping manner, and the grouping capability information of the first terminal device indicates that the first terminal device supports the second grouping manner, determine that the first target manner for paging the first terminal device is the second grouping manner; or if the grouping manner supported by the apparatus 600 for use is the first grouping manner, and the grouping capability information of the first terminal device indicates that the first terminal device supports the second grouping manner but does not support the first grouping manner, determine that the first target manner for paging the first terminal device is the non-grouping manner; or if the grouping manner supported by the apparatus 600 for use is the second grouping manner, and the grouping capability information of the first terminal device indicates that the first terminal device supports the first grouping manner but does not support the second grouping manner, determine that the first target manner for paging the first terminal device is the non-grouping manner; or if the grouping manner supported by the apparatus 600 for use is the first grouping manner and the second grouping manner, and the grouping capability information of the first terminal device indicates that the first terminal device supports the first grouping manner and the second grouping manner, determine the first target manner based on a priority of the first grouping manner and a priority of the second grouping manner.

Optionally, the processing unit 620 is specifically configured to: determine the first grouping manner whose priority is higher than that of the second grouping manner as the first target manner.

Optionally, the transceiver unit 610 is further configured to receive the grouping capability information of the first terminal device from a second access network device or the core network device. The second access network device is an access network device that releases the first terminal device into a radio resource control RRC inactive state. The apparatus 600 is an access network device that belongs to a same notification area NA as the second access network device.

Optionally, the transceiver unit 610 is further configured to receive the first group number of the first terminal device from the second access network device. The first group number is a group number corresponding to the first grouping manner. The second access network device is the access network device that releases the first terminal device into the radio resource control RRC inactive state. The apparatus 600 is the access network device that belongs to the same notification area NA as the second access network device.

In a possible implementation, the communications apparatus 600 may correspond to the first terminal device in the foregoing method embodiments, for example, may be the first terminal device or a chip configured in the first terminal device. The communications apparatus 600 is configured to perform the steps or procedures corresponding to the first terminal device in the foregoing methods.

The transceiver unit 610 is configured to obtain a grouping manner supported by a first access network device for use. The processing unit 620 is configured to determine, based on the grouping manner supported by the first access network device for use and a grouping manner supported by the apparatus 600, a first target manner for receiving paging of the first access network device. The processing unit 620 is configured to control, based on the first target manner, the transceiver unit 610 to receive a paging message of the first access network device.

Optionally, the first target manner is a first grouping manner, a second grouping manner, or a non-grouping manner. The first grouping manner is a grouping manner controlled by a core network device, and the second grouping manner is a grouping manner controlled by an access network device.

Optionally, the processing unit 620 is configured to control the transceiver unit 610 to learn, from the first access network device, that the apparatus 600 is to receive the paging message.

Optionally, the processing unit 620 is specifically configured to control the transceiver unit 610 to determine, by receiving a wake-up signal or downlink control information DCI from the first access network device, that the apparatus 600 is to receive the paging message. The wake-up signal is used to wake up the apparatus 600.

Optionally, the processing unit 620 is specifically configured to control the transceiver unit 610 to determine, by using second indication information included in the wake-up signal or the DCI received from the first access network device, that the apparatus 600 is to receive the paging message. The wake-up signal or the DCI includes a target group number corresponding to the first target manner. The target group number corresponding to the first target manner is used to receive the paging message of the first access network device.

Optionally, the processing unit 620 is specifically configured to control the transceiver unit 610 to determine, by using a target group number corresponding to the first target manner and carried in a target field included in the wake-up signal or the DCI, that the apparatus 600 is to receive the paging message. The target group number corresponding to the first target manner is used to receive the paging message of the first access network device.

The target field is a first field or a second field. The first field is a field corresponding to the first grouping manner. The second field is a field corresponding to the second grouping manner. The first target manner is the first grouping manner or the second grouping manner.

Optionally, the processing unit 620 is specifically configured to control the transceiver unit 610 to determine, by receiving the wake-up signal from the first access network device at a target resource location, that the apparatus 600 is to receive the paging message.

The target resource location is a first resource location or a second resource location. The first resource location is a resource location corresponding to the first grouping manner. The second resource location is a resource location corresponding to the second grouping manner. The first target manner is the first grouping manner or the second grouping manner.

Optionally, the processing unit 620 is specifically configured to control the transceiver unit 610 to determine, if the wake-up signal received from the first access network device is scrambled by using a target radio network temporary identifier, that the apparatus boo is to receive the paging message.

The target radio network temporary identifier is a first radio network temporary identifier or a second radio network temporary identifier. The first radio network temporary identifier is a radio network temporary identifier corresponding to the first grouping manner. The second radio network temporary identifier is a radio network temporary identifier corresponding to the second grouping manner. The first target manner is the first grouping manner or the second grouping manner.

Optionally, the processing unit 620 is specifically configured to control the transceiver unit 610 to receive the paging message of the first access network device based on a target group number corresponding to the first target manner.

The target group number falls within a first group number range or a second group number range. The first group number range is a group number range corresponding to the first grouping manner. The second group number range is a group number range corresponding to the second grouping manner. There is no intersection between the first group number range and the second group number range. The first target manner is the first grouping manner or the second grouping manner.

Optionally, the processing unit 620 is specifically configured to:

if the grouping manner supported by the first access network device for use includes the first grouping manner, and the apparatus 600 can use the first grouping manner, determine that the first target manner to be used by the apparatus 600 to receive paging of the first access network device is the first grouping manner; or if the grouping manner supported by the first access network device for use includes the second grouping manner, and the apparatus 600 can use the second grouping manner, determine that the first target manner to be used by the apparatus 600 to receive paging of the first access network device is the second grouping manner; or if the grouping manner supported by the first access network device for use is the first grouping manner, and the apparatus 600 can use the second grouping manner but cannot use the first grouping manner, determine that the first target manner to be used by the apparatus 600 to receive paging of the first access network device is the non-grouping manner; or if the grouping manner supported by the first access network device for use is the second grouping manner, and the apparatus 600 can use the first grouping manner but cannot use the second grouping manner, determine that the first target manner to be used by the apparatus 600 to receive paging of the first access network device is the non-grouping manner; or if the grouping manner supported by the first access network device for use is the first grouping manner and the second grouping manner, and the apparatus 600 can use the first grouping manner and the second grouping manner, determine the first target manner based on a priority of the first grouping manner and a priority of the second grouping manner.

A grouping manner that can be used by the apparatus 600 is determined based on the grouping manner supported by the apparatus 600.

Optionally, the processing unit 620 is specifically configured to: determine the first grouping manner whose priority is higher than that of the second grouping manner as the first target manner.

Optionally, the transceiver unit 610 is further configured to receive third indication information from a second access network device. The third indication information indicates whether the apparatus 600 can use a grouping manner in a radio resource control RRC inactive state.

Optionally, the transceiver unit 610 is further configured to if the third indication information indicates that the apparatus 600 cannot use the grouping manner in the RRC inactive state, determine not to obtain the grouping manner supported by the first access network device for use.

Optionally, the processing unit 620 is specifically configured to control the transceiver unit 610 to obtain, if the third indication information indicates that the apparatus 600 can use a grouping manner in the RRC inactive state, the grouping manner supported by the first access network device for use.

Optionally, the transceiver unit 610 is specifically configured to receive an RRC release message from the second access network device. The RRC release message includes the third indication information, and the RRC release message is used to release the apparatus 600 from an RRC connected state to the RRC inactive state.

Optionally, the transceiver unit 610 is specifically configured to receive a broadcast system message from the second access network device. The system message includes the third indication information.

Optionally, the third indication information specifically indicates that the apparatus 600 can use the first grouping manner and/or the second grouping manner in the RRC inactive state. The processing unit 620 is further configured to:

if the apparatus 600 supports the first grouping manner, or supports the first grouping manner and the second grouping manner, and the third indication information indicates that the apparatus 600 can use the first grouping manner in the RRC inactive state, determine that the apparatus 600 can use the first grouping manner; or if the apparatus 600 supports the second grouping manner, or supports the first grouping manner and the second grouping manner, and the third indication information indicates that the apparatus 600 can use the second grouping manner in the RRC inactive state, determine that the apparatus 600 can use the second grouping manner; or if the apparatus 600 supports the first grouping manner and the second grouping manner, and the third indication information indicates that the apparatus 600 can use the first grouping manner and the second grouping manner in the RRC inactive state, determine that the apparatus 600 can use the first grouping manner and the second grouping manner.

In a possible implementation, the communications apparatus 600 may correspond to the second access network device in the foregoing method embodiments, for example, may be the second access network device or a chip configured in the second access network device. The communications apparatus 600 is configured to perform the steps or procedures corresponding to the second access network device in the foregoing methods.

The processing unit 620 is configured to generate third indication information based on a grouping manner supported by the communications apparatus 600 for use. The third indication information indicates whether a first terminal device can use a grouping manner in a radio resource control RRC inactive state. The transceiver unit 610 is configured to send the third indication information to the first terminal device.

Optionally, the transceiver unit 610 is specifically configured to send an RRC release message to the first terminal device in an RRC connected state. The RRC release message includes the third indication information.

Optionally, the transceiver unit 610 is specifically configured to broadcast a system message. The system message includes the third indication information.

Optionally, the third indication information specifically indicates that the first terminal device can use the first grouping manner and/or the second grouping manner in the RRC inactive state.

The second grouping manner is a grouping manner controlled by an access network device, and the first grouping manner is a grouping manner controlled by a core network device.

Optionally, the processing unit 620 is specifically configured to:

if the apparatus 600 supports the second grouping manner for use, the generated third indication information specifically indicates that the first terminal device can use the second grouping manner in the RRC inactive state; or if the apparatus 600 supports the first grouping manner for use, or supports the first grouping manner and the second grouping manner, the generated third indication information specifically indicates that the first terminal device can use the first grouping manner and the second grouping manner in the RRC inactive state.

Optionally, the transceiver unit 610 is further configured to receive grouping capability information of the first terminal device from the core network device. The grouping capability information of the first terminal device indicates a grouping manner supported by the first terminal device.

The processing unit 620 is further configured to determine, based on the grouping manner supported by the apparatus 600 for use, whether to send the grouping capability information of the first terminal device to a first access network device. The first access network device is an access network device that belongs to a same notification area NA as the apparatus 600.

Optionally, the processing unit 620 is specifically configured to:

if the grouping manner supported by the apparatus 600 for use is the first grouping manner and/or the second grouping manner, determine to send the grouping capability information of the first terminal device to the first access network device. The transceiver unit 610 is configured to send the grouping capability information of the first terminal device to the first access network device.

Optionally, the processing unit 620 is specifically configured to: if the apparatus 600 supports no grouping manner for use, determine not to send the grouping capability information of the first terminal device to the first access network device. The first grouping manner is the grouping manner controlled by the core network device, and the second grouping manner is the grouping manner controlled by the access network device.

Optionally, the transceiver unit 610 is further configured to receive a first group number of the first terminal device from the core network device. The first group number is a group number corresponding to the first grouping manner. The processing unit 620 is further configured to determine, based on the grouping manner supported by the apparatus 600 for use, whether to send the first group number of the first terminal device to the first access network device.

Optionally, the processing unit 620 is further configured to control the transceiver unit 610 to send, if the grouping manner supported by the apparatus 600 for use includes the first grouping manner, the first group number of the first terminal device to the first access network device.

In a possible implementation, the communications apparatus 600 may correspond to the core network device in the foregoing method embodiments, for example, may be the core network device or a chip configured in the core network device. The communications apparatus 600 is configured to perform the steps or procedures corresponding to the core network device in the foregoing methods.

The transceiver unit 610 is configured to send first indication information to a first access network device. The first indication information indicates whether the core network device supports a first grouping manner. The first grouping manner is a manner in which the core network device groups a plurality of terminal devices.

It should be understood that the communications apparatus 600 herein is presented in a form of a functional unit. The term "unit" herein may be an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the communications apparatus 600 may be specifically the first access network device in the foregoing embodiments, and may be configured to perform the procedures and/or the steps corresponding to the first access network device in the foregoing method embodiments. Alternatively, the communications apparatus 600 may be specifically the first terminal device in the foregoing embodiments, to perform the procedures and/or the steps corresponding to the first terminal device in the foregoing method embodiments. Alternatively, the communications apparatus 600 may be specifically the second access network device in the foregoing embodiments, to perform the procedures and/or the steps corresponding to the second access network device in the foregoing method embodiments. Alternatively, the communications apparatus 600 may be specifically the core network device in the foregoing embodiments, and may be configured to perform the procedures and/or the steps corresponding to the core network device in the foregoing method embodiments. To avoid repetition, details are not described herein again.

The communications apparatus 600 in each of the foregoing solutions has a function of implementing a corresponding step performed by the first access network device in the foregoing method. Alternatively, the communications apparatus 600 in each of the foregoing solutions has a function of implementing a corresponding step performed by the first terminal device in the foregoing method. Alternatively, the communications apparatus 600 in each of the foregoing solutions has a function of implementing a corresponding step performed by the second access network device in the foregoing method. Alternatively, the communications apparatus 600 in each of the foregoing solution has a function of implementing a corresponding step performed by the core network device in the foregoing method. The function may be implemented by hardware, or may be implemented by hardware executing corresponding software. The hardware or software includes one or more modules corresponding to the foregoing function. For example, the communications unit may be replaced with a transceiver (for example, a sending unit in the communications unit may be replaced with a transmitter, and a transceiver unit in the communications unit may be replaced with a receiver), and another unit, for example, the processing unit may be replaced with a processor, to separately perform sending/receiving operations and processing-related operations in the method embodiments.

In addition, the communications unit may alternatively be a transceiver circuit (which may include, for example, a receiving circuit and a transmitter circuit), and the processing unit may be a processing circuit. In this embodiment of this application, the communications apparatus in FIG. 6 may be a terminal device or a network device in the foregoing embodiment, or may be a chip or a chip system, for example, a system on chip (system on chip, SoC). The communications unit may be an input/output circuit or a communications interface. The processing unit is a processor, a microprocessor, or an integrated circuit integrated on the chip. This is not limited herein.

FIG. 7 shows a communications apparatus 700 according to an embodiment of this application. The communications apparatus 700 includes a processor 710 and a transceiver 720. The processor 710 and the transceiver 720 communicate with each other through an internal connection path, and the processor 710 is configured to execute instructions, to control the transceiver 720 to send a signal and/or receive a signal.

Optionally, the communications apparatus 700 may further include a memory 730. The memory 730 communicates with the processor 710 and the transceiver 720 through an internal connection path. The memory 730 is configured to store the instructions, and the processor 710 may execute the instructions stored in the memory 730. In a possible implementation, the communications apparatus 700 is configured to implement the procedures and steps corresponding to the first access network device in the foregoing method embodiments. In a possible implementation, the communications apparatus 700 is configured to implement the procedures and steps corresponding to the first terminal device in the foregoing method embodiments. In a possible implementation, the communications apparatus 700 is configured to implement the procedures and steps corresponding to the second access network device in the foregoing method embodiments. In a possible implementation, the communications apparatus 700 is configured to implement the procedures and steps corresponding to the core network device in the foregoing method embodiments.

It should be understood that the communications apparatus 700 may be specifically the first access network device, the first terminal device, the second access network device, or the core network device in the foregoing embodiments, or may be a chip or a chip system. Correspondingly, the transceiver 720 may be a transceiver circuit of the chip. This is not limited herein. Specifically, the communications apparatus 700 may be configured to perform the steps and/or the procedures corresponding to the first access network device, the first terminal device, the second access network device, or the core network device in the foregoing method embodiments. Optionally, the memory 730 may include a read-only memory and a random access memory, and provide the instruction and data for the processor. A part of the memory may further include a non-volatile random access memory. For example, the memory may further store information of a device type. The processor 710 may be configured to execute the instructions stored in the memory. In addition, when the processor 710 executes the instructions stored in the memory, the processor 710 is configured to perform the steps and/or procedures corresponding to the first access network device, the first terminal device, the second access network device, or the core network device in the foregoing method embodiments.

In an implementation process, steps in the foregoing methods may be implemented by using a hardware integrated logic circuit in the processor, or by using instructions in a form of software. The steps in the methods disclosed with reference to embodiments of this application may be directly performed by a hardware processor, or may be performed by a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in this embodiment of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly executed and accomplished by a hardware decoding processor, or may be executed and accomplished by using a combination of hardware and software modules in a decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads the information in the memory and completes the steps in the foregoing methods in combination with the hardware of the processor.

It may be understood that the memory in this embodiment of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory in the systems and the methods described in this specification includes but is not limited to these and any memory of another appropriate type.

According to the method provided in embodiments of this application, this application further provides a computer program product. The computer program product includes computer program code. When the computer program code is run on a computer, the computer is enabled to perform the steps or procedures performed by the first access network device, the first terminal device, the second access network device, or the core network device in the foregoing method embodiments.

According to the method provided in embodiments of this application, this application further provides a computer-readable storage medium. The computer-readable storage medium stores program code. When the program code is run on a computer, the computer is enabled to perform the steps or procedures performed by the first access network device, the first terminal device, the second access network device, or the core network device in the foregoing method embodiments.

According to the method provided in embodiments of this application, this application further provides a communications system. The communications system includes at least two of the first access network device, the first terminal device, the second access network device, or the core network device.

The foregoing communications apparatus embodiments corresponds to the foregoing the method embodiments. A corresponding module or unit performs a corresponding step. For example, a communications unit (a transceiver) performs a receiving step or a sending step in the method embodiments, and a processing unit (a processor) may perform another step other than the sending step and the receiving step. A function of a specific unit may be based on a corresponding method embodiment. There may be one or more processors.

In this application, an “indication” may include a direct indication and an indirect indication, or may include an explicit indication and an implicit indication. Information indicated by using a piece of information is referred to as to-be-indicated information. In a specific implementation process, the to-be-indicated information may be indicated in a plurality of manners, for example, but not limited to, a manner of directly indicating the to-be-indicated information. For example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and another part of the to-be-indicated information is known or pre-agreed on. For example, specific information may alternatively be indicated by using an arrangement sequence of a plurality of pieces of information that is pre-agreed on (for example, stipulated in a protocol), to reduce indication overheads to some extent.

In embodiments of this application, the terms and English abbreviations are all examples given for ease of description, and should not constitute any limitation on this application. This application does not exclude a possibility of defining another term that can implement a same or similar function in an existing or future protocol.

It should be understood that “and/or” in this specification describes an association relationship between associated objects, and indicates that three relationships may exist. For example, A and/or B may indicate the following three cases: Only A exists, both A and B exist, and only B exists, where A and B may be singular or plural. The character “/” generally indicates an “or” relationship between associated objects.

A person of ordinary skill in the art may be aware that, illustrative logical blocks (illustrative logical blocks) and steps (steps) that are described with reference to embodiments disclosed in this specification may be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, communications apparatus, and unit, refer to a corresponding process in the foregoing method embodiments, and details are not described herein again.

In the several embodiments provided in this application, it should be understood that the disclosed system, communications apparatus, and method may be implemented in other manners. For example, the described communications apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented through some communications interfaces. The indirect couplings or communications connections between the communications apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

In the foregoing embodiments, all or some of the functions of the functional units may be implemented by software, hardware, firmware, or any combination thereof. When software is used to implement the embodiments, all or a part of embodiments may be implemented in a form of a computer program product. The computer program product includes one or more computer instructions (programs). When the computer program instructions (programs) are loaded and executed on a computer, the procedure or functions according to embodiments of this application are all or partially generated. The computer may be a general-purpose computer, a dedicated computer, a computer network, or another programmable communications apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

obtaining a grouping manner supported by a first access network device, wherein the grouping manner supported by the first access network device comprises at least one of a first grouping manner or a second grouping manner;

determining, based on the grouping manner supported by the first access network device and a grouping manner supported by a first terminal device, a first manner to be used by the first terminal device to receive paging of the first access network device, wherein the grouping manner supported by the first terminal device comprises at least one of the first grouping manner or the second grouping manner, the first manner is selected by the first terminal device based on the grouping manner supported by the first access network device and the grouping manner supported by the first terminal device, and the first manner is the first grouping manner, the second grouping manner, or a non-grouping manner; and receiving a paging message of the first access network device in the first manner, wherein the first grouping manner is a grouping manner controlled by a core network device, and wherein the second grouping manner is a grouping manner based on an identifier of a terminal device.

2. The method of claim 1, wherein obtaining the grouping manner supported by the first access network device comprises:

receiving a system message broadcast by the first access network device; and obtaining the grouping manner supported by the first access network device.

3. The method of claim 1, wherein receiving the paging message of the first access network device in the first manner comprises receiving the paging message of the first access network device based on a first group number in the first manner;

wherein the first group number falls within a first group number range or a second group number range, wherein the first group number range is a group number range corresponding to the first grouping manner, wherein the second group number range is a group number range corresponding to the second grouping manner, there being no intersection between the first group number range and the second group number range, and wherein the first manner is the first grouping manner or the second grouping manner.

4. The method of claim 1, wherein receiving the paging message of the first access network device in the first manner comprises receiving the paging message of the first access network device based on a first group number in the first manner, wherein a value of the first group number range is less than a value of the second group number range, and wherein the first group number falls within the second group number range, and the first group number is a sum of a quantity of groups supported by the first grouping manner and a value obtained by performing a modulo operation according to the identifier of the first terminal device.

5. The method of claim 1, wherein the method further comprises learning, from the first access network device, that the first terminal device is to receive the paging message.

6. The method of claim 5, wherein learning that the first terminal device is to receive the paging message comprises determining, by receiving a wake-up signal or downlink control information (DCI) from the first access network device, that the first terminal device is to receive the paging message, wherein the wake-up signal is used to wake up the first terminal device.

7. The method of claim 6, wherein determining that the first terminal device is to receive the paging message comprises determining, by using second indication information comprised in the wake-up signal or the DCI received from the first access network device, that the first terminal device is to receive the paging message, wherein the wake-up signal or the DCI comprises a first group number corresponding to the first manner, and the first group number corresponding to the first manner is used to receive the paging message of the first access network device.

8. The method of claim 6, wherein the first manner is the first grouping manner, the second grouping manner, or a non-grouping manner and wherein determining the first manner to be used by the first terminal device to receive paging of the first access network device comprises:

determining that the first manner to be used by the first terminal device to receive paging of the first access network device is the first grouping manner when the grouping manner supported by the first access network device for use comprises the first grouping manner and the first grouping manner can be used by the first terminal device;

determining that the first manner to be used by the first terminal device to receive paging of the first access network device is the second grouping manner when the grouping manner supported by the first access network device for use comprises the second grouping manner and the second grouping manner can be used by the first terminal device;

determining that the first manner to be used by the first terminal device to receive paging of the first access network device is the non-grouping manner when the grouping manner supported by the first access network device for use is the first grouping manner and the second grouping manner can be used by the first terminal device but the first grouping manner cannot be used by the first terminal device;

determining that the first manner to be used by the first terminal device to receive paging of the first access network device is the non-grouping manner when the grouping manner supported by the first access network device for use is the second grouping manner, and the first grouping manner can be used by the first terminal device but the second grouping manner cannot be used by the first terminal device; and determining the first manner based on a priority of the first grouping manner and a priority of the second grouping manner when the grouping manner supported by the first access network device for use is the first grouping manner and the second grouping manner, and the first grouping manner and the second grouping manner can be used by the first terminal device, wherein a grouping manner that can be used by the first terminal device is determined based on the grouping manner supported by the first terminal device.

9. The method of claim 8, wherein determining the first manner based on a priority of the first grouping manner and a priority of the second grouping manner comprises determining the first grouping manner whose priority is higher than that of the second grouping manner as the first manner.

10. The method of claim 1, further comprising transmitting, by the first terminal device, grouping capability information of the first terminal device to the first access network device, wherein the grouping capability information of the first terminal device indicates the grouping manner supported by the first terminal device.

11. A communications apparatus comprising:

one or more processors; and at least one non-transitory memory storing instructions, that when executed by the one or more processors, cause the one or more processors to perform operations comprising:

obtaining a grouping manner supported by a first access network device, wherein the grouping manner supported by the first access network device comprises at least one of a first grouping manner or a second grouping manner;

determining, based on the grouping manner supported by the first access network device and a grouping manner supported by a first terminal device, a first manner to be used by the first terminal device to receive paging of the first access network device, wherein the grouping manner supported by the first terminal device comprises at least one of the first grouping manner or the second grouping manner, the first manner is selected by the first terminal device based on the grouping manner supported by the first access network device and the grouping manner supported by the first terminal device, and the first manner is the first grouping manner, the second grouping manner, or a non-grouping manner; and receiving a paging message of the first access network device in the first manner, wherein the first grouping manner is a grouping manner controlled by a core network device, and wherein the second grouping manner is a grouping manner based on an identifier of a terminal device.

12. The communications apparatus of claim 11, wherein obtaining the grouping manner supported by the first access network device comprises:

receiving a system message broadcast by the first access network device; and obtaining the grouping manner supported by the first access network device.

13. The communications apparatus of claim 11, wherein receiving the paging message of the first access network device in the first manner comprises:

receiving the paging message of the first access network device based on a first group number in the first manner;

wherein the first group number falls within a first group number range or a second group number range, wherein the first group number range is a group number range corresponding to the first grouping manner, wherein the second group number range is a group number range corresponding to the second grouping manner, there being no intersection between the first group number range and the second group number range, and wherein the first manner is the first grouping manner or the second grouping manner.

14. The communications apparatus of claim 11, wherein receiving the paging message of the first access network device in the first manner comprises receiving the paging message of the first access network device based on a first group number in the first manner, wherein a value of the first group number range is less than a value of the second group number range, and wherein the first group number falls within the second group number range, and the first group number is a sum of a quantity of groups supported by the first grouping manner and a value obtained by performing a modulo operation according to the identifier of the first terminal device.

15. The communications apparatus of claim 11, wherein the operations further comprise:

transmitting grouping capability information of the first terminal device to the first access network device, wherein the grouping capability information of the first terminal device indicates the grouping manner supported by the first terminal device.

16. A non-transitory computer-readable storage medium, wherein the non-transitory computer-readable storage medium stores a program or instructions used to implement operations comprising:

obtaining a grouping manner supported by a first access network device, wherein the grouping manner supported by the first access network device comprises at least one of a first grouping manner or a second grouping manner;

determining, based on the grouping manner supported by the first access network device and a grouping manner supported by a first terminal device, a first manner to be used by the first terminal device to receive paging of the first access network device, wherein the grouping manner supported by the first terminal device comprises at least one of the first grouping manner or the second grouping manner, the first manner is selected by the first terminal device based on the grouping manner supported by the first access network device and the grouping manner supported by the first terminal device, and the first manner is the first grouping manner, the second grouping manner, or a non-grouping manner; and receiving a paging message of the first access network device in the first manner, wherein the first grouping manner is a grouping manner controlled by a core network device, and wherein the second grouping manner is a grouping manner based on an identifier of a terminal device.

17. The non-transitory computer-readable storage medium of claim 16, wherein the first manner is the first grouping manner, the second grouping manner, or a non-grouping manner.

18. The non-transitory computer-readable storage medium of claim 16, wherein obtaining the grouping manner supported by the first access network device comprises:

receiving a system message broadcast by the first access network device; and obtaining the grouping manner supported by the first access network device.

19. The non-transitory computer-readable storage medium of claim 16, wherein receiving the paging message of the first access network device in the first manner comprises:

receiving the paging message of the first access network device based on a first group number in the first manner;

wherein the first group number falls within a first group number range or a second group number range, wherein the first group number range is a group number range corresponding to the first grouping manner, wherein the second group number range is a group number range corresponding to the second grouping manner, there being no intersection between the first group number range and the second group number range, and wherein the first manner is the first grouping manner or the second grouping manner.

20. The non-transitory computer-readable storage medium of claim 19, wherein receiving the paging message of the first access network device in the first manner comprises receiving the paging message of the first access network device based on a first group number in the first manner, wherein a value of the first group number range is less than a value of the second group number range, and wherein the first group number falls within the second group number range, and the first group number is a sum of a quantity of groups supported by the first grouping manner and a value obtained by performing a modulo operation according to the identifier of the first terminal device.

* * * * *